United States Patent
Yang et al.

(10) Patent No.: US 12,418,778 B2
(45) Date of Patent: Sep. 16, 2025

(54) MISBEHAVIOR DETECTION USING DATA CONSISTENCY CHECKS FOR COLLECTIVE PERCEPTION MESSAGES

(71) Applicant: Intel Corporation, Santa Clara, CA (US)

(72) Inventors: Liuyang Yang, Vancouver, WA (US); Ignacio J. Alvarez, Portland, OR (US); Xiruo Liu, Portland, OR (US); Kathiravetpillai Sivanesan, Portland, OR (US); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 18/550,061

(22) PCT Filed: May 5, 2022

(86) PCT No.: PCT/US2022/027928
§ 371 (c)(1),
(2) Date: Sep. 11, 2023

(87) PCT Pub. No.: WO2022/235973
PCT Pub. Date: Nov. 10, 2022

(65) Prior Publication Data
US 2024/0323657 A1    Sep. 26, 2024

Related U.S. Application Data

(60) Provisional application No. 63/185,756, filed on May 7, 2021.

(51) Int. Cl.
*H04W 4/38* (2018.01)
*G06Q 50/40* (2024.01)
*H04W 4/40* (2018.01)

(52) U.S. Cl.
CPC .............. *H04W 4/38* (2018.02); *H04W 4/40* (2018.02); *G06Q 50/40* (2024.01)

(58) Field of Classification Search
CPC .......... H04W 4/38; H04W 4/40; G06Q 50/40; G06Q 2220/00; G06Q 10/063; G06Q 50/26
See application file for complete search history.

(56) References Cited

U.S. PATENT DOCUMENTS 10,743,331 B2 *  8/2020  Tonshal ................ H04W 72/51
2016/0140842 A1  5/2016  Park et al.
(Continued)

OTHER PUBLICATIONS

International Search Report and Written Opinion mailed Aug. 26, 2022 for International Patent Application No. PCT/US2022/027928, 9 pages.

(Continued)

*Primary Examiner* — Daryl C Pope
(74) *Attorney, Agent, or Firm* — Schwegman Lundberg & Woessner, P.A.

(57) ABSTRACT

The present disclosure is related to vehicle-to-everything (V2X) and Intelligent Transport System (ITS) communications technologies, and in particular, to misbehavior detection and misbehavior reporting services for Collective Perception Messages (CPMs). The misbehavior detection mechanisms include one or more data consistency checks, including a multi-step systematic data consistency check within individual CPMs, across multiple CPMs from the same transmitter, and across multiple CPMs from different transmitters. Potential misbehaviors are reported to a misbehavior authority in one or more misbehavior reports.

20 Claims, 18 Drawing Sheets

(56) References Cited

U.S. PATENT DOCUMENTS

| | | | |
|---|---|---|---|
| 2019/0068639 A1 | 2/2019 | Alexander et al. | |
| 2020/0382320 A1 | 12/2020 | Ogawa et al. | |
| 2021/0020032 A1 | 1/2021 | Tijink | |
| 2021/0067967 A1 | 3/2021 | Arzelier et al. | |
| 2022/0014923 A1* | 1/2022 | Banjade | G01S 5/02213 |

OTHER PUBLICATIONS

"Intelligent Transport Systems (ITS);p Vehicular Communications; Basic Set of Applications; Analysis of the Collective Perception Service (CPS); Release 2", ETSI TR 103 562 V2.1.1 (Dec. 2019), 119 pages.

"Intelligent Transport Systems (ITS); Security; Pre-standardization study on Misbehaviour Detection; Release 2", ETSI TR 103 460 V2.1.1 (Oct. 2020), 35 pages.

"Taxonomy and Definitions for Terms Related to Cooperative Driving Automation for On-Road Motor Vehicles", SAE International, Surface Vehicle Information Report, J3216™ (May 2020), 20 pages.

Kamel et al., "A Misbehavior Authority System for Sybil Attack Detection in C-ITS", IEEE 10th Annual Ubiquitous Computing, Electronics & Mobile Communication Conference—IEEE UEMCON 2019, (Oct. 15, 2019), 8 pages.

Lonc et al., "Cooperative ITS Security Standards: Implementation, assessment and next challenges", Virtual ITS European Congress, Lisbonne (virtual), Portugal (Jan. 20, 2021), 13 pages.

Mahmoudi et al., "Towards a Reliable Machine Learning Based Global Misbehavior Detection in C-ITS: Model Evaluation Approach", International Workshop on Vehicular Adhoc Networks for Smart Cities (IWVSC'2019) (Nov. 7, 2019), 14 pages.

"OpenLR™—White Paper: An open standard for encoding, transmitting and decoding location references in digital maps", Version 1.5, revision 2, TomTom International B.V. (Jan. 19, 2012), 156 pages.

Yu et al., "A Driving Behavior Planning and Trajectory Generation Method for Autonomous Electric Bus", Future Internet, vol. 10, No. 6, p. 51 (Jun. 10, 2018), 14 pages.

* cited by examiner

MISBEHAVIOR DETECTION USING DATA CONSISTENCY CHECKS FOR COLLECTIVE PERCEPTION MESSAGES

RELATED APPLICATIONS

The present application is a national stage entry under 35 U.S.C. § 371 of Int'l App. No. PCT/US2022/027928 filed May 2, 2022, which claims priority under 35 U.S.C. § 119(e) to U.S. Provisional App. No. 63/185,756 filed on May 7, 2021, the contents of each of which are hereby incorporated by reference in their entireties.

TECHNICAL FIELD

The present disclosure is generally related to vehicle-to-everything (V2X) and Intelligent Transport System (ITS) communications, edge computing, network communication, communication system implementations, and in particular, to techniques for detecting misbehavior in Collective Perception Messages (CPMs).

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS. Cooperative ITS (C-ITS) have been developed to enable an increase in traffic safety and efficiency, and to reduce emissions and fuel consumption. The initial focus of C-ITS was on road traffic safety and especially on vehicle safety.

C-ITS includes, inter alia, Collective Perception Service (CPS). CPS supports ITS applications in the road and traffic safety domain by facilitating information sharing among ITS stations. CPS reduces the ambient uncertainty of an ITS-S about its current environment, as other ITS-Ss contribute to context information. By reducing ambient uncertainty, it improves efficiency and safety of the ITS.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

1. Misbehavior Detection

Figure 1:
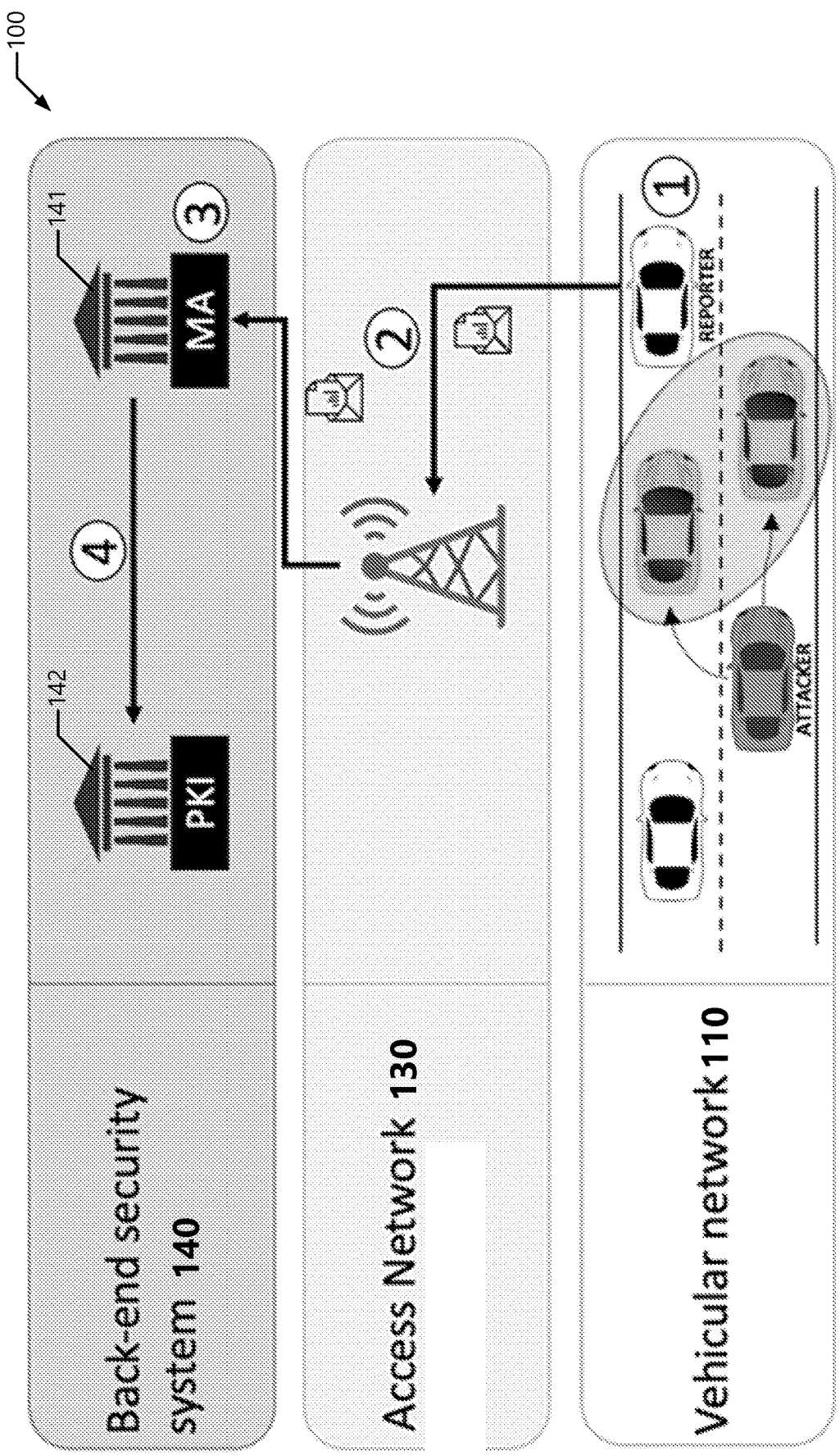
FIG. 1 depicts a misbehavior detection process overview.

V2X enables information sharing between vehicles, traffic participants including pedestrians, cyclists, and roadside units (RSUs) in the proximity through V2X messages. Authenticity and integrity of messages exchanged over V2X is guaranteed by security means including digital signatures. The main purpose of a public key infrastructure (PKI) in a C-ITS trust system (also referred to as Cooperative-ITS Credential Management System (CCMS)) is to provide a certificate management system that supports secure distribution, use and revocation of certificates to ITS stations (ITS-Ss). Revocation of trust credentials may be needed, under different situations, for example, when the CCMS detects a malicious ITS-S and decides to evict it from the network; and/or during the ITS-S life-cycle management, the certificates issued to an ITS-S will be revoked at the ITS-S end of life (e.g., the ITS station is decommissioned or the ITS-S failed and is replaced by a spare part).

Misbehavior detection and reporting is a main issue in a CCMS and has not been specified in detail in the first pre-deployment phases because algorithms for misbehavior detection applicable in an ad-hoc network (e.g., local detection on vehicles and roadside stations) as well as in a PKI are not sufficiently defined and seem to be not trivial. Denigration of benign ITS stations cannot be circumvented (e.g., risk of false positive). Additionally, misbehavior detection requires a network connection to the PKI backend server. It cannot be assumed that a constant communication link is always available. As there are no real-time requirements on the transmission of Misbehavior Reports (MRs), ITS stations may buffer information on detected misbehaviors or suspicious messages, and submit them to the PKI server, i.e. to a misbehavior evaluation entity also called a Misbehavior Authority (MA) (see e.g., MA 141 of FIG. 1 and/or MA 220 of FIG. 2), when there is a communication link available.

However, an adversary may compromise a vehicle's OBU or steal credentials from a legitimate vehicle to craft and distribute V2X messages containing fake information. The misbehavior, defined as the willful or inadvertent transmission of incorrect data within the V2X network, may be caused by malfunctioning components or malicious attacks. Such incorrect data, when transmitted with valid security credentials such as verifiable digital signatures, may cause the receiving vehicle to make wrong or unsafe decisions on the road. This is a threat that must be addressed properly before V2X can be safely mass-deployed. As a consequence, V2X nodes, such as vehicles 1210 and RSUs 1230, must perform misbehavior detection (MD) to verify the correctness of the incoming V2X messages and identify potentially misbehaving transmitters.

Examples of V2X/ITS messages that have been standardized include the Basic Safety Messages (BSM) in the US, Cooperative Awareness Messages (CAM), and Decentralized Environment Notification Messages (DENMs). Both BSM and CAM only broadcast the existence and current kinematic state information of ego vehicles. More recently, the industry has started to define other more advanced messages such as Collective Perception Messages (CPMs). Additionally, with the introduction of CPMs in addition to BSMs, CAMs, DENMs, and other ITS/V2X messages, a V2X receiver (Rx) may have a lot more messages to process, and a lot more attack surface to cover. The present disclosure provides methodologies and technologies for V2X nodes (e.g., ITS stations) to detect misbehavior when CPMs are deployed and present in the network MD mechanisms for relatively simple (non-complex) messages such as BSMs, CAMs, and DENMs are discussed in ETSI TR 103 460 V2.1.1 (2020-10) ("[TR103460]"). MD for these relatively simple messages involves consistency checks, which use relations between packets from multiple participants to determine the trustworthiness of newly received data. These consistency checks include checking the alignment of the attributes with the context of a particular scenario, checking the alignment of attributes between consequent messages, verifying current kinematic attributes (location) based on other kinematic attributes reported in the past or present (e.g., speed and previous location), and the like. Standards bodies, such as ETSI, have started to define a standard specification toward misbehavior reporting service. Aspects of misbehavior detection will be standardized in ETSI TS 103 759 (the latest draft being ETSI TS 103 759 v0.0.8 (2022-03)) ("[TS103759]"), which has not yet been published. Initially, [TS103759] will include misbehavior detection for CAMs and DENMs. However, there is a significant research gap in misbehavior detection of CPMs. Aspects of CPS are discussed in [TR103562] and [TS103324].

So far, the effort of applying consistency checks have been largely limited to checking single or multiple BSMs, CAMs, and DENMs. The MD mechanisms discussed herein extend consistency checks to CPMs with various semantic formats. Proposed consistency check techniques leverage fusion algorithms in processing CPMs to improve the safety of self-driving cars, where messages that are inconsistent outliers are filtered out or diluted in the fusion process, and the Rx may not even realize their existence, without explicit MD. The MD mechanisms discussed herein use a different consistency check wherein potential inconsistencies are explicitly looked for and called out when identified since potential inconsistencies represent potential security threats. This aspect is typically absent in existing solutions.

The MD mechanisms discussed herein are based on a principle of data consistency, and include a multi-step systematic check within a single CPM, across multiple CPMs from the same node (e.g., V2X transmitter (Tx) or Rx, an ITS-S, and the like), and/or multiple CPMs from different nodes are presented as a suite of local MD mechanisms. The CPM MD mechanisms discussed herein can be defined by relevant standards and/or specifications such as ETSI standards, 3GPP standards, and/or the like.

1.1. Misbehavior Detection and Reporting Service Architecture

FIG. 1 depicts a misbehavior management system (MMS) 100 including a vehicular network 110, an access network 130, and a back-end security system 140 (also referred to as "a C-ITS trust system 140" or "CCMS 140"). The vehicular network 110 includes a set of vehicles, which may be the same or similar to the vehicles 1210 of FIG. 12; the access network 130 includes one or more network access nodes (NANs) (e.g., RSUs, base stations, access points, and the like), each of which may be the same or similar to the NAN 1230 of FIG. 12; and the CCMS 140 includes public key infrastructure (PKI) 142 and a Misbehavior Authority (MA) 141.

The MA 141 and/or the PKI 142 are part of the CCMS 140, and in some implementations, the MA 141 is part of the PKI 142. In addition to the MA 141, and although not shown by FIG. 1, the CCMS 140 and/or the PKI 142 includes a root certification authority (root CA), an enrollment authority (EA), and an authorization authority (AA). The root CA is the ultimate root of trust for all certificates and/or certification authorities within a hierarchy, and in some examples provides an enrolment authority (EA) and authorization authority (AA) with proof that it may issue enrolment credentials and/or authorization tickets. The root CA stores its security certificates information and the trusts list information (e.g., CRL, CTL, and the like) in a local repository.

The CCMS 140 may allow operation of one or multiple instances of the root CA and/or the other authorities (e.g., EA and AA). Different trust model options can be considered for the ITS security management system architecture (see e.g., *C-ITS Platform, WG5: Security & Certification, Annex 1: Trust models for Cooperative—Intelligent Transport System (C-ITS)*, version 1.1, annex to C-ITS Platform Final Report, European Commission (January 2016). This may include possible options such as: single root CA, cross-certification, bridge CA, and/or certificate trust list. The EA is a security management entity responsible for the life cycle management (LCM) of enrolment credentials, authenticating ITS-Ss, granting access to ITS communications. The AA is a security management entity responsible for issuing and monitoring the use of authorization tickets. The AA provides an ITS-S with authoritative proof that it may use specific ITS services.

The EA requests authorization tickets (ATs) on behalf of the ITS-S by communicating with the AA (e.g., butterfly AT provisioning and/or the like). In some implementations, the CCMS 140 and/or the PKI 142 also includes a distribution center, which distribute the trusts list information to various PKI participants. In particular, the distribution center can provide updated trust information used for performing the validation process to control that received information is coming from a legitimate and authorized ITS-S or a PKI CA by publishing the CTL and CRL.

The MA 141 is a security management entity responsible for processing misbehavior reports, investigating potentially misbehaving ITS-Ss, and taking a reaction or remediation accordingly in relation with the ITS-S device operator or manufacturer (see e.g., [TR103460] and [TS102940]). The MA 141 is capable of detecting misbehavior types and revoking misbehaving ITS-Ss to exclude them from the C-ITS trust domain in order to no longer consider their messages when received by other entities.

The misbehavior reporting process is divided into four steps including (1) local detection, (2) reporting, (3) global misbehavior detection, and (4) reaction. Local detection (1) involves one or more ITS-S entities running/executing local (e.g., on ITS-S) misbehavior detection services (MDS) (see e.g., MDS 210 of FIG. 2, MD 1310 of FIG. 13, and the like). MDSs include a set of basic misbehavior checks to detect incoming suspicious messages from neighbor ITS-Ss in the proximity of an ego ITS-S (e.g., within some predefined or predetermined distance). Reporting (2) takes place after local detection. Here, the ego ITS-S will have the possibility to signal or indicate the misbehavior by sending a misbehavior reporting (MR) message to the MA. Global MD (3) involves the MA collecting and analyzing the received MR messages. Using the evidence in the reports, the MA is able to recreate the local events and verify the validity of the report, if possible. The MA then proceeds to analyze the collected MR messages and classifies the reported ITS-S as faulty, malicious, or genuine and/or determines a probability for these classifications. Other classification systems are possible in other implementations. The MA identifies the type and/or severity of the reported misbehavior, and determines a suitable reaction required to protect the system and/or traffic participants. A reaction (4) is triggered accordingly (e.g., ITS-S revocation at the PKI). The global MD/decision at the level of the MA and the reaction may be discussed elsewhere.

Figure 2:
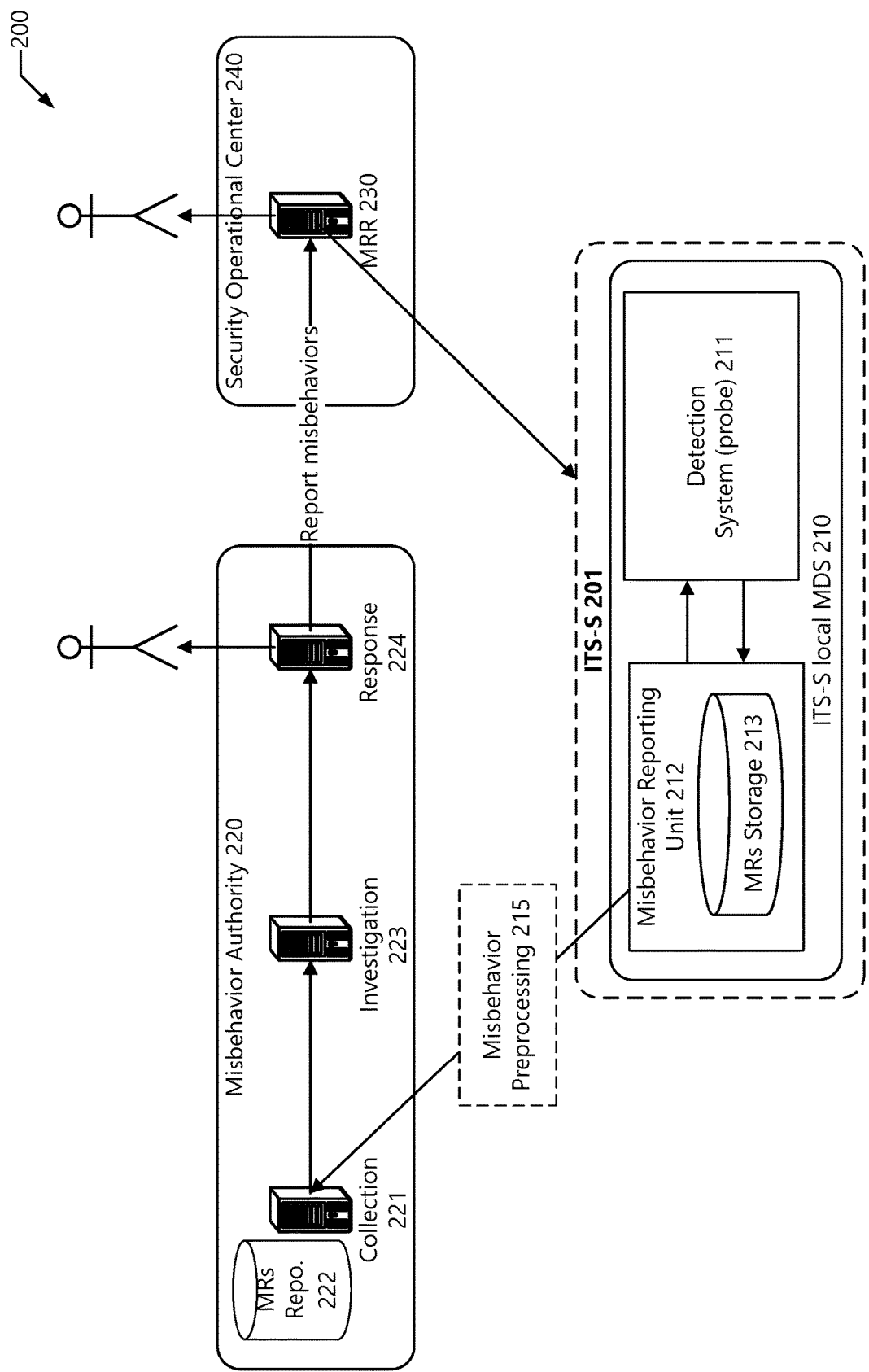
FIG. 2 depicts an example misbehavior detection management (MDM) system.

FIG. 2 shows an example misbehavior detection management (MDM) system architecture 200, which is used for carrying out misbehavior reporting. In this example, the MDM 200 operates as global misbehavior management system (MMS) architecture that acts on various misbehavior reports provided by one or more ITS-Ss, and as such, the MDM 200 can also be referred to as "MMS 200" or the like. The MMS 200 includes a local misbehavior detection service (MDS) 210, which is local to an individual ITS-S 201, and a backend security system (or backend subsystems) referred to as a misbehavior reporting service (MRS). In other implementations, the MRS is part of the ITS-S local MDS 210 and/or part of the security entity in the ITS-S (see e.g., [EN302665], and ETSI TS 102 940 v1.3.1 (2018-04) and/or ETSI TS 102 940 v2.1.1 (2021-07) (collectively "[TS102940]")). The backend security system/MRS includes a misbehavior authority (MA) subsystem 220 and misbehavior response and remediation (MRR) subsystem 230. The MA 220 may be the same or similar to the MA 141 in FIG. 1, the MD 1310 of FIG. 13, and/or the like. In the MDM 200, the MDS 210 detects potential misbehaviors, creates/generates MRs, and sends the MRs to the MRS. Based on this and other information, the MRS determines what has actually occurred, and what, if any, response and remediation actions to take. FIG. 2 also includes a functional component for misbehavior preprocessing (MP) 215. The MP component 215 may act on the MRs before they are passed to the MA 220.

The MDS 210 (also referred to as an "ITS-S local MD component 210" or the like) is the functionality on the ITS-S responsible for detecting misbehavior, generating misbehavior reports, and sending them to the backend subsystem(s). It may also react locally to the detected misbehavior, for example, by informing other applications (apps) on the ITS-S about the misbehavior. The ITS-S is assumed to check its/their outgoing messages to avoid sending messages that will be classified as misbehavior, and it is not assumed that all observed instances of misbehavior lead to the generation or upload of an MR. How an ITS-S decides whether to generate an MR based on observed misbehavior can be implementation specific.

In an MMS 200, the ITS-S 201/MDS 210 detects misbehavior happening in its vicinity. Local misbehavior reporting mechanisms in the MDS 210 include a detection system (probe) 211, which is a component of the MDS 210 responsible for analyzing incoming data and detecting any potential misbehaviors. The subject of misbehavior may include the ego ITS-S, a neighbor ITS-S, or some other node in the network. In some implementations, the MDS 210 ensures that the outgoing messages are correct and compliant with a standard (e.g., plausible and consistent). The MDS 210 also includes a misbehavior reporting unit (MRU) 212, which is a component of the MDS 210 responsible for generating and storing MRs of misbehaviors detected by the detection component 211, and transmitting the generated MRs to the MA 220. The MRU 212 also includes an MR storage 213 that stores generated MRs. The MR storage 213 may also act as a context storage (also referred to as "context storage 213"), which is a component of the MDS 210 responsible for storing context information (e.g., information that is relatively long-lived and/or may otherwise be relevant to more than one misbehavior report). In some implementations, the MDS 210 can include a local misbehavior reaction element that is responsible for any reactions to the detected misbehavior that does not involve communicating a report to the backend MMS and/or MA 220. Additionally or alternatively, the MDS 210 can include a local misbehavior remediation element that is responsible for any remediatory actions to the detected misbehaviors (e.g., software updates, rolling back software updates, disabling and/or enabling certain features of the ITS-S or the system in which the ITS-S operates, implementing stricter controls and/or policies on the ITS-S or the system in which the ITS-S operates, sending/broadcasting misbehavior indications to other neighbor ITS-S and/or other nodes, and/or the like).

The MDM system 200 can also include the MP component 215 that acts on the MRs before they are passed to the MA 220. MP can include, for example, means for improving the privacy of the reporters and/or improving the quality of the information received by the MA 220 by collecting context information about the communication. Specific pre-processing activities can be implementation specific. The MP component 215 may include any combination of the following sub-components: a value-added aggregation component that aggregates reports based on certain parameters/features; a diagnostic on reporter component that performs diagnostics on the reporter to establish the reliability of information in its reports; a shuffling without inspection component that shuffles reports from multiple reporters to improve reporter's privacy; a context storage component that stores context information so that reporters can refer to it rather than having to directly include it in their reports; and proprietary information management (PIM) component that enables routing and processing of proprietary information (e.g., information that is relevant to the diagnosis of misbehavior but should not be revealed directly to the MA 220). None of these are required for the baseline operation of the system but a full system deployment may contain any or all of such components. Some of these functionalities may require a pre-existing trust relationship between the reporting ITS-S and the relevant functional entity.

The MA component 220 is responsible for processing misbehavior reports, investigating on potentially misbehaving ITS-S and taking a reaction accordingly in relation with the ITS-S device operator or manufacturer (see e.g., [TR103460]). The MA 220 has the capability to detect misbehavior types and to revoke misbehaving ITS-S to exclude them from the C-ITS trust domain in order to no longer consider their messages when received by other entities. The MA component 220 includes a collection component 221, an MR repository 222, an investigation component 223, and an analysis/response component 224. Each of the components 221, 222, 223, and 224 can include one or more servers, storage devices, and/or other suitable hardware and software elements such as any of those discussed herein. Multiple instances of the MA 220 may exist in the MDM system 200. FIG. 2 also shows the information flow from ITS-S to the MA 220, and from the MA 220 component to the remediation component 230. The MA 220 is part of the PKI and requires its own certificate signed by a root CA (RCA) and is able to communicate securely with other entities of the system, for example, using an off-line communication with the RCA to request a MA certificate; with ITS-Ss to receive MRs and analyze them; and/or with the Enrolment Authority (EA) and Authorization Authority (AA) to get information about an ITS-S and trigger a reaction.

The collection component 221 that receives MRs and other information, possibly after preprocessing by the MP component 215, and stores the MRs in an MR repository 222. The collection component 221 collects the MRs generated by an MDS (or probe) 211 embedded in the ITS-S. This activity includes validating the structure of MRs, filtering the received MRs (e.g., depending on time period, geographic areas, and the like), correlating the received reports, and storing them in a local database/repository 222.

The investigation component 223 that uses the MRs to make a determination as to what response actions (e.g., revocation of a certificate and/or the like) should be taken within the PKI. In some implementations, the investigation component 223 assesses the accuracy and reliability of detected misbehavior events, analyzes the misbehavior events and/or the accuracy/reliability assessment to identify different misbehavior patterns, and then decides whether a reported ITS-S is misbehaving, faulty, or genuine. In various implementations, AI/ML techniques can be used by the MA 220 (or the investigation component 223) to classify and/or otherwise analyze the data in the received MRs and the misbehavior event types. The AI/ML techniques used for this purpose may be any of those discussed in Mahmoudi et al., *Towards a Reliable Machine Learning Based Global Misbehavior Detection in C-ITS: Model Evaluation Approach*, International Workshop on Vehicular Adhoc Networks for Smart Cities (IWVSC '2019), Paris, France (November 2019); and Kamel et al., *A Misbehavior Authority System for Sybil Attack Detection in C-ITS*, IEEE 10th Annual Ubiquitous Computing, Electronics & Mobile Communication Conference (IEEE UEMCON 2019), New York, United States (October 2019), the contents of each of which are hereby incorporated by reference in their entireties; and/or any other AI/ML techniques such as those discussed herein.

The response component 224 that generates a suitable reports that indicate the misbehaviors and provides those responses to individual users and/or a remediation component 230. Following the qualification of the investigated misbehavior events by the investigation component 223, the MA 220 includes the response component 224 to take or make an appropriate response. The response to misbehaving ITS-S may be of different levels such as, for example, no action, sending an alert to the user or to the ITS station's manufacturer or device operator 240, initiate the revocation process (e.g., blocking the ITS-S Enrolment Credential), and/or the like. The MA 220 informs the manufacturer or device operator 240 on every investigated situation classified as a malicious or faulty to understand scope of the detected misbehaviors and take further correction/remediation actions if necessary.

Additionally or alternatively, the MA component 220 performs global MD. The global MD may be considered as containing any combination of the following components: a collection component 221, a misbehavior investigation component 223, and a misbehavior analysis (response) component 224. The collection component 221 obtains misbehavior reports from the local MD component 210 and/or the MP component 215. The misbehavior investigation component 223 determines which ITS-S(s) was (or were) at fault in reported misbehavior incidents. This may involve making queries to other parts of the system (e.g., for pseudonym linkage and/or the like). Operationally, this may be a single system or may be separated into multiple subcomponents, for example, for different apps or for different ITS-S types. The misbehavior analysis (response) component 224 determines the facts on the ground for reported misbehavior incidents, and the severity of the misbehavior. To analyses the reports along with the outcome of the investigation from the above sub-component. The misbehavior analysis may be carried out before and/or after the investigation.

The MRR component 230 is responsible for implementing any other remediation activity. In this example, the MRR component 230 is within a Security Operational Center (SOC) 240. In some implementations, the SOC 240 is an SOC of a manufacturer (e.g., OEM) or device operator. In some implementations, the MRR component 230 and/or the SOC 240 are part of the MA 220. In any implementation, an interface between MA 220 and the manufacturer's Security Operational Center (SOC) 240 may be needed for cases where the detection and response system does not run in a fully automated way. The MRR component 230 can include any combination of the following sub-components: a software update component that enforces software updates; a certificate revocation list (CRL) component that generates, stores, and distributes CRLs; an in-person remediation component that implements remediation by taking physical action at the misbehaving ITS-S's location (e.g., using actuators in the ITS-S or sending individuals or other devices to the misbehaving ITS-S); a denylist component that generates, stores, and distributes denylists (also referred to as Internal Block Lists (IBL) or the like)—these are distinguished from CRLs in that denylists are distributed to CAs and used to determine which ITS-S should not receive certificates, while CRLs are distributed also to ITS-Ss and are used to make trust decisions on incoming app messages); and/or additional or alternative remediation components. Additionally or alternatively, the remediation provided by the MRR component 230 can include provisioning or otherwise providing a suitable configuration or policy (or configuration or policy updates) to the ego ITS-S 201 to change or adjust how the ego ITS-S 201 interacts with the misbehaving ITS-S or other elements in its environment.

Figure 12:
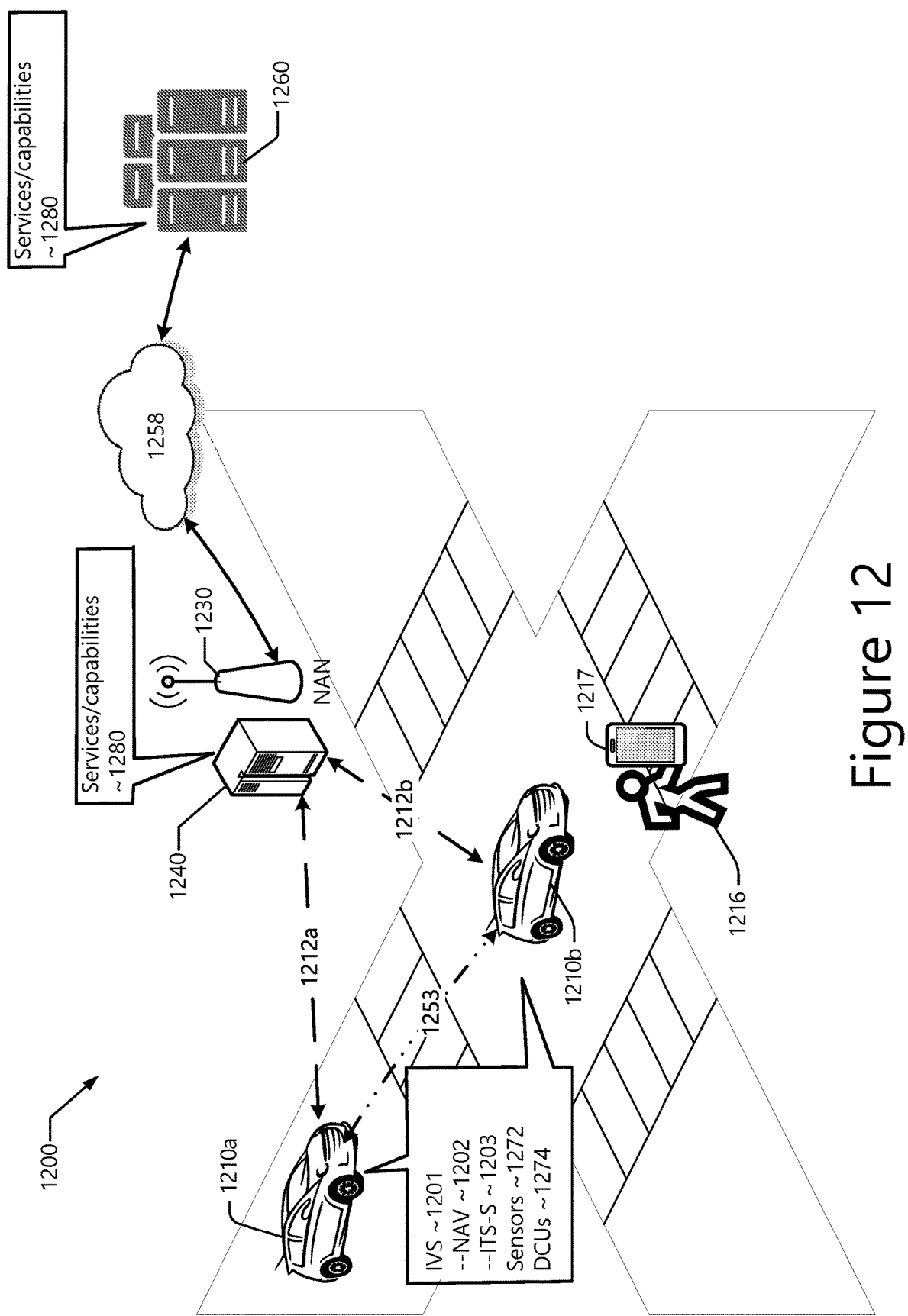
FIG. 12 illustrates an operative Intelligent Transport System (ITS) environment and/or arrangement.
Figure 16:
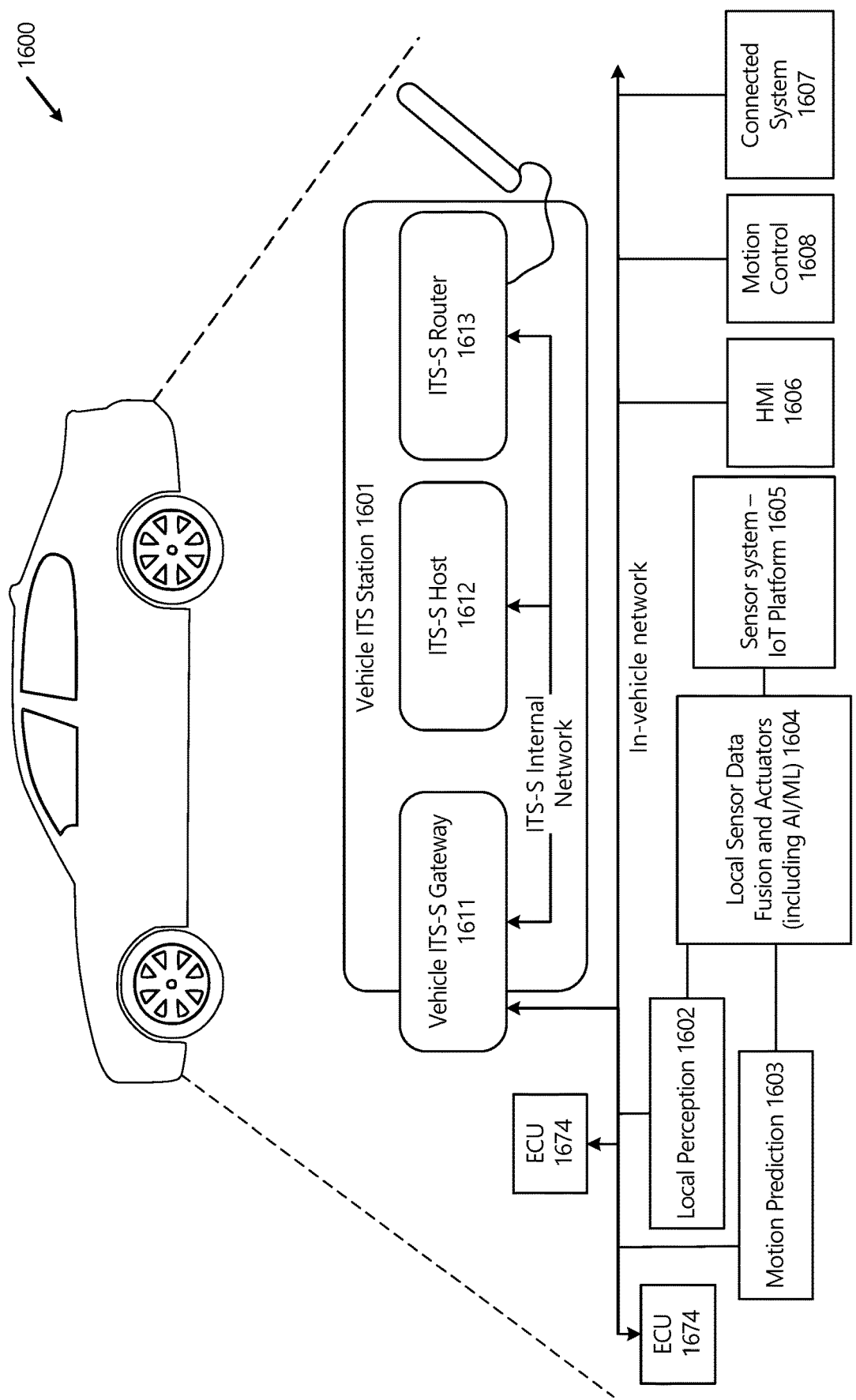
FIG. 16 depicts a vehicle station.

In some implementations, the ego ITS-S 201 is a vehicle ITS-S (e.g., vehicle ITS-S 1210 in FIG. 12, vehicle ITS-S 1601 in FIG. 16, or the like). The vehicle ITS-S (V-ITS-S) 201 can be a terrestrial vehicle (e.g., motorized or electric driving vehicles), watercraft (e.g., boats, ships, unmanned underwater vehicles (UUV) or underwater drones such as remotely operated underwater vehicles (ROUVs) and autonomous underwater vehicles (AUVs), and the like), or aircraft (e.g., drones, unmanned aerial vehicles (UAVs), satellites, and/or the like). In these implementations, the MRs (or remediations) can be used to change or adjust driving or operational behaviors of the vehicle ITS-S (V-ITS-S) 201. For example, when the ego ITS-S 201 is an autonomous driving vehicle (ADV), the configuration or policy from the MRR 230 may instruct the ego ITS-S 201 to increase a security buffer or trust zone around the ego ITS-S 201, which may trigger the ego ITS-S 201 to take evasive actions/maneuvers when misbehaving ITS-Ss enter the security buffer or trust zone (see e.g., ['895]). This is because less trustworthy neighboring ITS-Ss and/or less trustworthy data means the ego ITS-S 201 needs to be more cautious to avoid accidents and/or other adverse outcomes. Additionally or alternatively, when the ego ITS-S 201 is an ADV and the MA 220 and/or MRR 230 determines that the other ITS-S is not misbehaving (or the local MDS determines that data from another ITS-S is not inconsistent), the configuration or policy may instruct the ego ITS-S 201 that it can be less cautious around the other ITS-S and/or can relax safety mechanisms (e.g., Responsibility-Sensitive Safety (RSS) parameters and/or the like) to allow for more aggressive driving. In examples where the ego ITS-S 201 is implemented in a connected vehicle, the following distance and speed parameters can be relaxed for relevant ITS apps. Additionally or alternatively, for trusted data and/or trusted neighboring ITS-Ss, security buffers and/or trust zones surrounding the ego ITS-S 201 can be reduced such that the trusted neighboring ITS-Ss can move closer to the ego ITS-S 201 without triggering evasive maneuvers. Additionally or alternatively, for trusted data and/or trusted neighboring ITS-Ss, the configuration or policy may allow the ego ITS-S 201 to increase traffic throughput from the trusted neighboring ITS-Ss (e.g., through a direct connection or sidelink connection, or a relay connection through a network access node (NAN)). Additionally or alternatively, for trusted data and/or trusted neighboring ITS-Ss, the configuration or policy may allow the ego ITS-S 201 to rely on, or otherwise use, data from the trusted neighboring ITS-Ss such as, for example, streaming sensor data from the trusted neighboring ITS-Ss, and/or using perceived object data in CPMs received from the trusted neighboring ITS-Ss for generating a layered costmap (which may be used to supplement local/onboard sensor data), and/or the like.

In some implementations, the ego ITS-S 201 is a personal ITS-S (e.g., personal ITS-S 1701 in FIG. 17 or the like) or VRU ITS-S (e.g., VRU ITS-S 1217 in FIG. 12 or the like). In these implementations, the ego ITS-S 201 may be a personal ITS-S (P-ITS-S) or VRU ITS-S implemented (or communicatively coupled to) a motorcycle, scooter, cyclist performance monitor/computer and/or other like devices. In these implementations, the ego ITS-S 201 may perform in a same or similar manner as discussed previously when the ego ITS-S 201 is a V-ITS-S. Additionally or alternatively, the ego ITS-S 201 can be used in robots, drones, or industrial equipment in industrial settings, smart city environments, and/or the like. Additionally or alternatively, the ego ITS-S 201 can be implemented as autonomous sensors and/or IoT devices in a wireless sensors network (WSN), IoT network, and/or the like.

Figure 18:
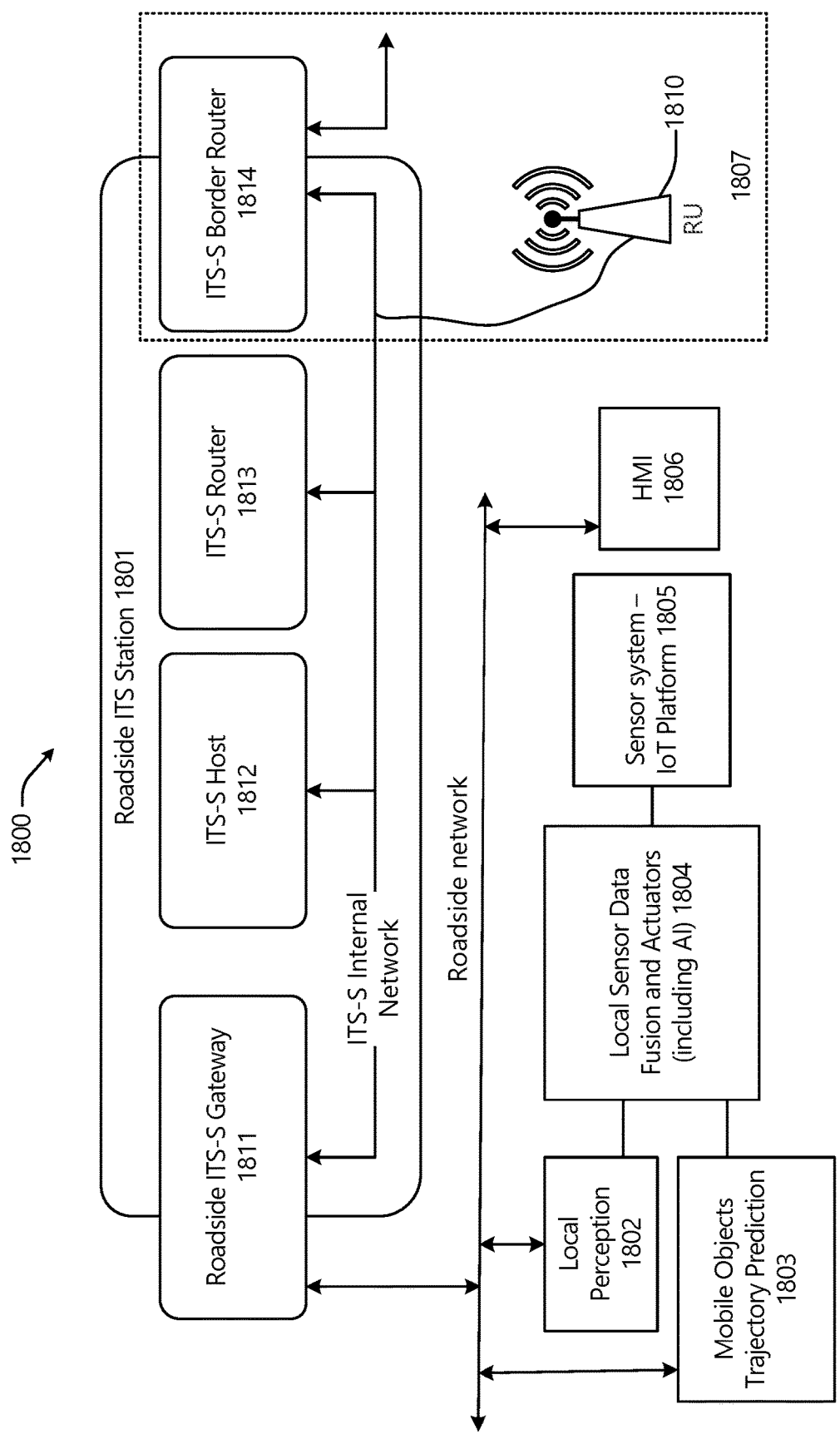
FIG. 18 depicts a roadside infrastructure node.

In some implementations, the ego ITS-S 201 is a roadside ITS-S (e.g., NAN 1230 in FIG. 12, roadside ITS-S 1801 in FIG. 18, or the like). In these implementations, the MRs (or remediations) can be used to change or adjust operational parameters of the roadside ITS-S(R-ITS-S) 201. For example, in these implementations, the R-ITS-S 201 can receive some or all ITS messages from ITS-Ss in its coverage area, and act as a relay or otherwise handle message passing between ITS-Ss in the coverage area. In this example, the R-ITS-S 201 can provide security services by policing traffic for the ITS network based on the MR messages and/or remediations from the MRR 230. Here, the R-ITS-S 201 can throttle or prevent ITS messages from a misbehaving ITS-S from being conveyed to other ITS-Ss in its coverage area and/or throttle or prevent ITS messages from being sent to the misbehaving ITS-S from the other ITS-Ss.

1.1.1. Local Misbehavior Detection Services (MDS)

1.1.1.1. Misbehavior Detection

Figure 3:
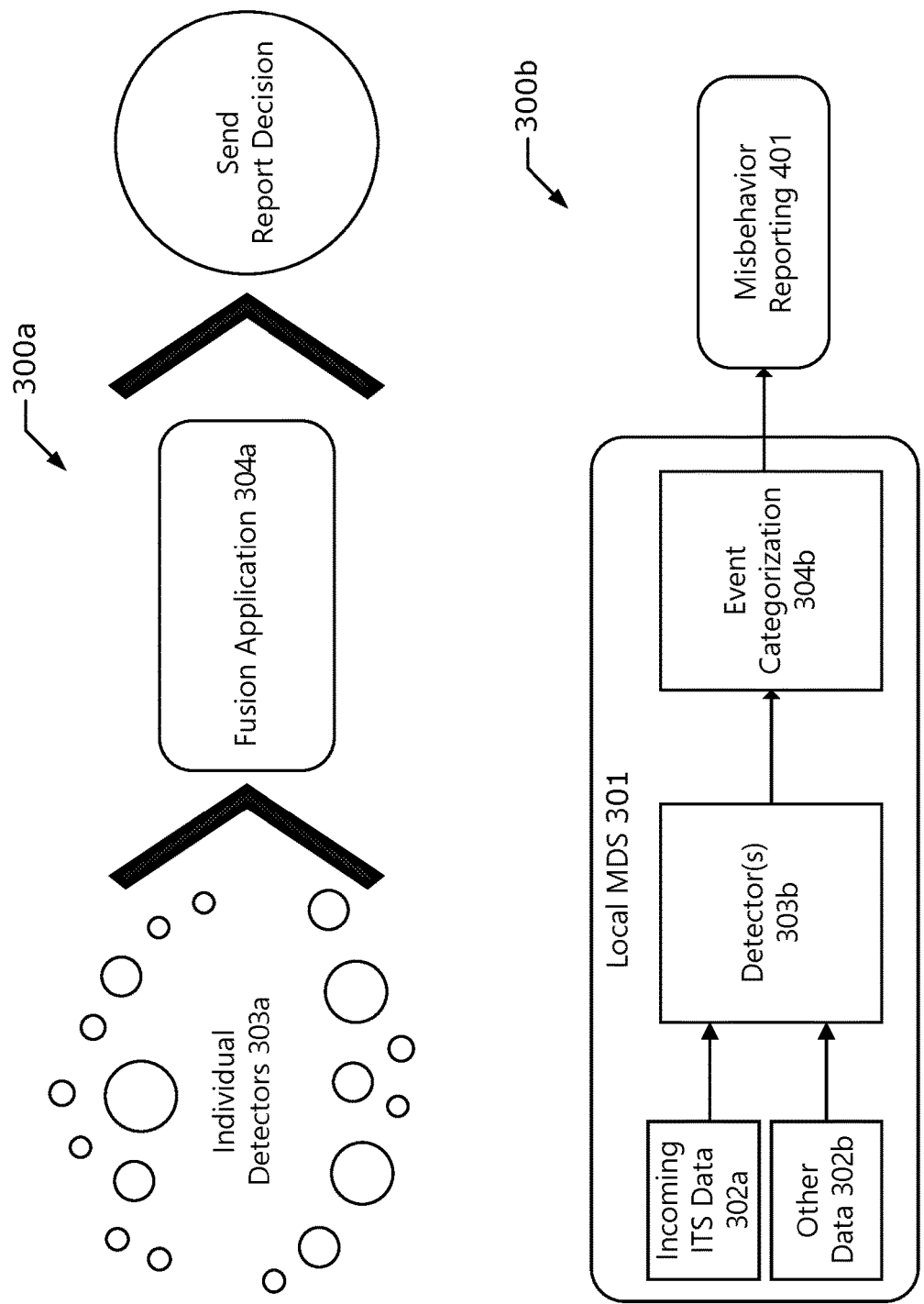
FIG. 3 depicts example local misbehavior detection services (MDSs).
Figure 17:
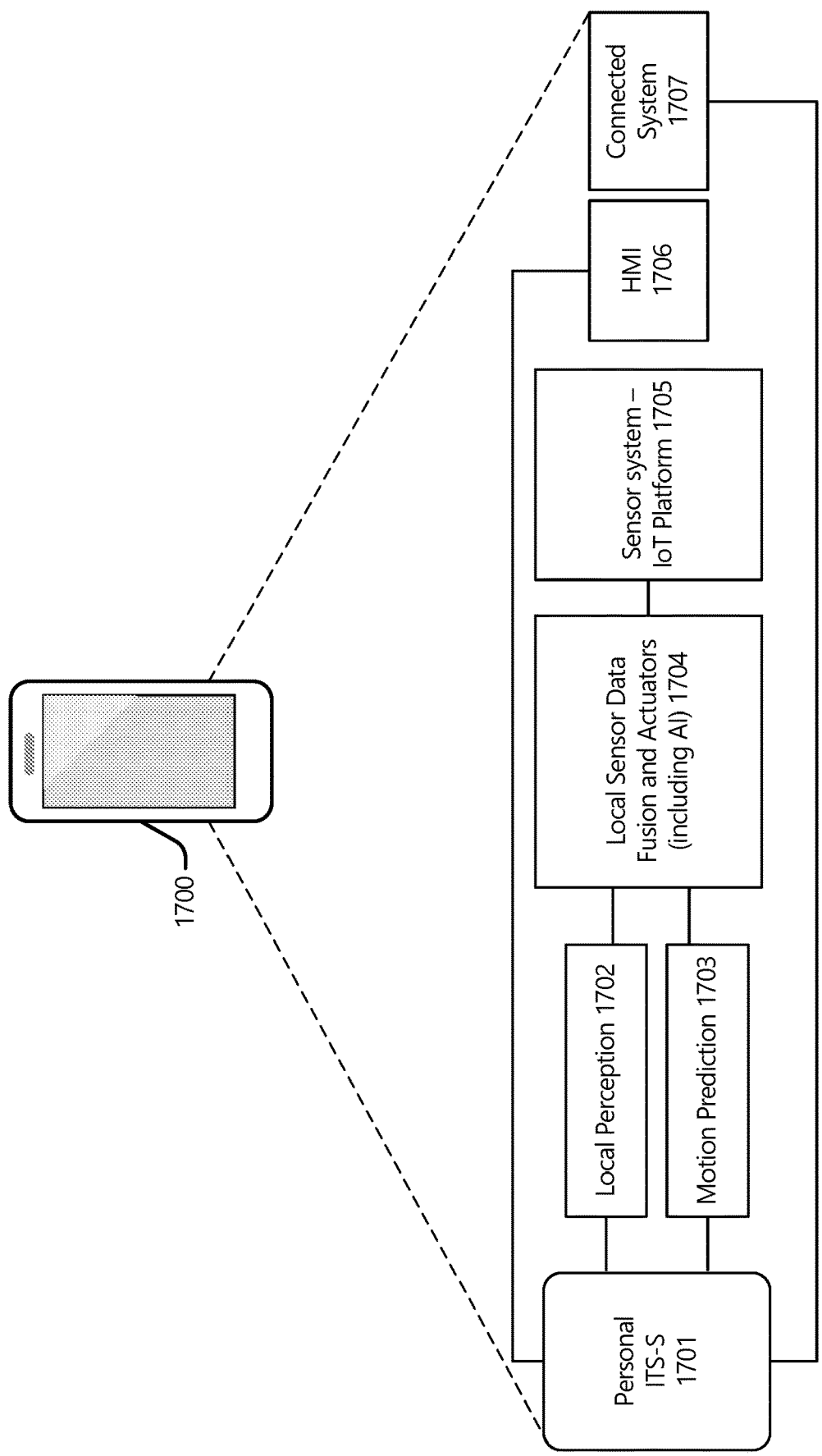
FIG. 17 depicts a personal station.

FIG. 3 shows example local misbehavior detection logic 300a that can be implemented by the MDS 210. The local detection logic operates as follows: The MDS 210 runs a plausibility and/or consistency check on each received message (e.g., ITS/V2X messages). The results are transmitted to a local misbehavior detection app 304a (e.g., data fusion app 304a) installed in each ITS-S that decides whether to send a report to the MA 220 or not. In the ITS-S, the local detection process is split in two phases: the misbehavior detection mechanisms (often referred to as "misbehavior detectors 303a", "detectors 303a", or the like) and the advanced misbehavior detection app (often referred to as a "fusion app 304a" or the like). The detectors 303a may be part of the detection system 211, and the fusion app 304a may operate one or more suitable fusion algorithms (such as those discussed herein) and/or may be the same or similar as the local device sensor fusion and actuator apps 1604, 1704, and 1804 discussed infra w.r.t. FIGS. 16, 17, and 18. The MD mechanisms are designed to identify abnormal, suspicious, and/or malicious behavior based on received V2X/ITS messages or other types of messages, and may be classified in four different categories as shown by Table 1.

Figure 4:
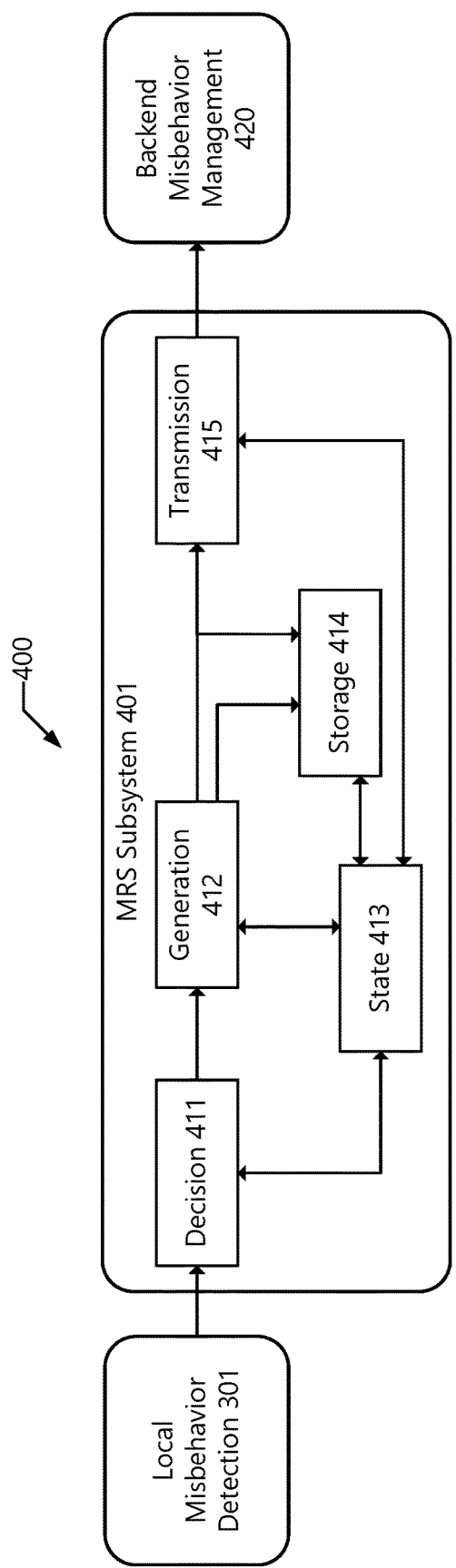
FIG. 4 depicts an example misbehavior reporting service (MRS).

FIG. 3 also shows an example local MDS functional architecture 300b. The MDS functional architecture 300b includes a local MDS 301, which may correspond to the MDS 210 of FIG. 2, the MD 1310 of FIG. 13, or the like. The MDS 301 includes one or more detectors 303b (which may be the same or similar as the individual detectors 303a) and an event categorization unit 304b (which may be the same or similar as the fusion app 304a). The detectors 303b obtain incoming ITS-S data 302a and other data 302b from other subsystems of the ITS-S and/or from neighboring nodes/systems. The incoming ITS data 302a includes any incoming ITS messages (e.g., BSMs, CAMs, DENMs, CPMs, and/or the like), and the other data 302b includes any information other than incoming ITS messages such as, for example, sensor data, actuator data, positioning/GNSS data of ego vehicle and/or neighbor vehicles, map and/or LDM data, mobility prediction data, ego vehicle data such as the data listed in Table 4 and Table 5, and/or the like. The detectors 303b identify incoming ITS messages that are in some way inconsistent with the ITS-S's perception of ground truth or are otherwise impairing the correct operation of the V2X system. The event categorization unit 304b aggregates the outputs of the individual detectors 303b along with data from other sources to determine whether an incoming ITS message is suspicious (e.g., inconsistent and/or implausible) or not, and reports the potential misbehaviors (e.g., inconsistent and/or implausible events and the like) to the misbehavior reporting subsystem 401, which is discussed infra w.r.t. FIG. 4. The event categorization unit 304b can include one or more different categorization algorithms for processing different types of input data and/or detection data. In some implementations, the event categorization unit 304b classifies the aggregated data according to the categories in Table 1.

TABLE 1

Categories of misbehavior detection mechanisms

| MD Mechanism | Category | Schemes/Types |
|---|---|---|
| Message-based | Data Plausibility | Compare data with expected values |
|  | Data Consistency | Location proximity |
|  |  | Data trust-based event/object validation |
|  |  | Data trust-based with information quality |
|  | Environmental | Probability of event based on existing environmental conditions |
| Node-based | Behavioral | Analysis of node behavior |
|  | Trust-based | Trust values assigned to nodes |
|  |  | Consensus-based validation |
|  |  | Reputation systems |

In Table 1, the environmental-based validation includes local MD mechanisms determining the likelihood or probability of information in an ITS message based on existing environmental conditions. This validation method is specific to individual events and/or event types, and is strongly linked to a specific application. Data plausibility validation techniques involve comparing data included in ITS messages with expected values for the type of data being conveyed (e.g., a reported position being inconsistent with a maximum plausible range, reported speed value being inconsistent with a plausible speed or plausible range of speeds, a reported adverse event/warning being sent by a node outside a plausible proximity of the event, reported acceleration inconsistent with detected braking behavior, and/or the like).

The data consistency category includes detection mechanisms that search for contradiction in data using redundancy of information. These mechanisms usually look at several messages generated by the same ITS-S and/or attempt to resolve conflicting information coming from several ITS-Ss (e.g., collecting the validation of several ITS-Ss on a reported traffic event or the like). This category includes at least (but is not limited to) the following misbehavior reporting schemes as shown by Table 1.

Location proximity schemes involve verifying the location of the ITS-S for one or more ITS messages. This can include checking that the sending ITS-S is within a line of sight (LoS) of the reported event or perceived object. In these implementations, the Rx node checks the consistency of the detected event (e.g., eventPosition in DENM, reference position in messageSegmentInfo of a CPM, or the like) or object location (e.g., kinematic attitude state of an object in a perceived object container of a CPM, or the like) with a location or position of the ITS-S contained in the transmitted ITS message (e.g., reporting ITS-S).

Data trust-based validation mechanisms involve ITS-Ss agreeing cryptographically on a reported event or perceived object to guarantee its validity. The trustworthiness of traffic event data and/or perceived objects is evaluated based on the data received and collected from one or multiple ITS-Ss (e.g., vehicles, RSUs, VRUs, and/or the like). Such detection schemes perform cooperatively and/or may use a centralized approach via communication with a back-end server (see e.g., servers 1260 of FIG. 12). Additionally or alternatively, the data trust mechanisms can be based on growth-code and/or z-smallest signature (see e.g., clause 5.1.3 of [TR103460]). Additionally or alternatively, the data trust-based validation mechanisms can include some or all of the trust mechanisms discussed in U.S. Pat. No. 11,038,895 filed on 28 Sep. 2018 ("['895]"), the contents of which are hereby incorporated by reference in its entirety. Data trust combined with traffic data quality includes evaluating data trust based on the data received in ITS messages from multiple sources and combined with the quality of the reported data (informationQuality). The Rx node may infer the correctness of received data from the number of stations vouching for the validity of the data based on the value of the informationQuality parameter set in the reported message, or using some other parameter in the message.

Behavioral-based validation detection mechanisms are based on the fact that an ITS-S signaling a specific traffic event or perceived object should behave in a certain manner. These checks are based on the behavior of the reporting ITS-S with respect to a specific warning or specific type of perceived object. Behavioral-based validation detection mechanisms can also include verifying whether the reporting ITS-S is within the LoS of the signaled traffic event and/or perceived object, checking the consistency of the detected event/object location with the location of the reporting ITS-S, and then verifying the behavior of the reporting ITS-S with respect to this specific event/perceived object.

The trust-based validation detection mechanisms try to evaluate the trustworthiness of the nodes in the C-ITS network (node trust evaluation). These node-centric approaches can involve assigning trust values to different nodes and/or assigning different nodes to different trust levels or trust zones (see e.g., ['895]). Additional or alternatively, these trust-based validation detection mechanisms can be cooperative trust-based (CTB) validation detection mechanisms. For example, CTB approaches can include assigning nodes to different trust levels and using some data-centric trust inputs to compute a consensus shared among several nodes to prove the trustworthiness of respective nodes. Different categories of CTBs can be used such as, for example, voting and consensus mechanisms and reputation systems (see e.g., clause 5.1.4 of [TR103460]). The voting and consensus mechanisms allow the entities to cooperatively evaluate the behavior of an ITS-S. Trust-based detection can occur either locally with cooperation between the neighbor ITS-Ss (e.g., cooperative detection scope) or with the support of infrastructure nodes (e.g., global detection scope). These mechanisms often rely on the combination of various data-centric misbehavior detection techniques to update the trust of nodes in the C-ITS network. For instance, many proposed schemes may also use the support of RSUs or of back-end servers.

Consensus-based validation involves validating a certain event or perceived object based on a general agreement between neighboring ITS-Ss. This mechanism is generally used by mobile applications providing traffic event warning services, but can also be used for perceived objects and/or costmap grid/cell values as discussed infra.

The detectors 303a, 303b identify ITS data that are inconsistent with the ego ITS-S's perception of ground truth or are otherwise impairing the correct operation of the system. The detectors 303a, 303b can be connected among themselves in serial, parallel, and/or some combination of both (e.g., two or more detectors may be run in parallel and then their outputs could be fed into the another detector). An implementation may also support different kinds of internal detector architectures and/or arrangements. For example, the observations discussed herein could be implemented by a series of individual detectors 303a, 303b that take in a limited amount of information and apply specific conditions to make a determination of misbehavior. Additionally or alternatively, individual detectors 303a, 303b can be implemented by one or more AI/ML approaches, which will use a relatively large set of input information and be capable of outputting multiple observations.

In some examples, the detection mechanisms (e.g., one or more detectors 303a, 303b) can include false beacon information detection mechanisms, false warning detection mechanisms, and/or node trust evaluation mechanisms. The false beacon information detection mechanisms can include physical layer detection, data-centric detection, AI/ML based detection (e.g., K-Nearest Neighbor (kNN), support vector machine (SVM), multi-layer perceptron (MLP), long short-term memory (LTSM), and/or any other AI/ML mechanisms such as those discussed herein), neighbor list exchange, additional information exchange, path history detection mechanisms, and NAN (e.g., RSU) pseudonym linkability (see e.g., [TR103460]). Additionally or alternatively, the false beacon information detection mechanisms or the path history detection mechanisms can include any of the network provenance techniques discussed in U.S. Pat. No. 11,019,183 filed on 7 Jul. 2018, the contents of which are hereby incorporated by reference in its entirety. The false warning detection mechanisms can include data-centric detection and voting-based detection (see e.g., [TR103460]). The node trust evaluation mechanisms can include reputation-based methods, cooperative trust establishment, data-centric trust evaluation, and local pseudonym linking (see e.g., [TR103460]). Additionally or alternatively, the node trust evaluation mechanisms can include the trust management mechanisms discussed in ['895]. Additionally or alternatively, the detection mechanisms can include plausibility and/or consistency checks on access layer measurements (e.g., RSSI, RSRP, RSRQ, Doppler shift, Angle-of-Arrival, and/or any other suitable measurements such as any of those discussed herein, or combinations thereof), plausibility and/or consistency checks on periodic and/or non-periodic (or asynchronous) broadcast and/or unicast messages (e.g., maximum beaconing frequency; message content verification; motion validation on speed, acceleration, curvature, and/or yaw rate; proximity plausibility; map based plausibility based on the type of road or driving conditions such as road geography or arrangement, environmental conditions, and the like, and so forth), security level local checks on received messages, misbehavior detection on DENMs signaling traffic events, and/or the like. Any of the aforementioned detection mechanisms can be combined or fused with sensor data from on-board sensors and/or other accessible sensors. Additionally or alternatively, any combination of the aforementioned detection mechanisms (or results of such techniques) can be combined using a suitable mechanisms such as a simple moving average (SMA), cumulative average (CA), weighted moving average (WMA), exponential moving average (EMA), exponentially weighted moving average (EWMA), modified moving average (MMA), running moving average (RMA), smoothed moving average (SMMA), a moving average regression model, and/or some other suitable technique or combination(s) thereof.

1.1.1.2. Misbehavior Reporting Service

The local process in the ITS-S for detecting, assessing, and reporting potential misbehaviors while processing incoming messages (e.g., ITS/V2X messages) is sometimes referred to as local misbehavior detection and reporting service, local MDS, or the like.

FIG. 4 shows a misbehavior reporting service (MRS) functional architecture 400. The MRS functional architecture 400 includes an MRS subsystem 401. The MRS subsystem 401 includes a decision component 411 that receives misbehavior events from the local MDS 301 discussed previously w.r.t. FIG. 3. The decision component 411 stipulates whether or not to generate an MR for a misbehavior event (inconsistency) observed by the local MDS 301.

The generation component 412 creates/generates the misbehavior report, making use of the information provided in the input from the local MDS 301 and/or other information obtained from the state component 413. After report creation, the generation component 412 also decides whether to send the report to storage component 414 for storing the report, and/or to the transmission component 415. The storage component 414 stores MRs provided by the generation component 412, and provides stored MRs to the transmission component 415 for transmission to the backend misbehavior management entity 420, which may correspond to the MA 141 and/or MA 220, and deletes old reports. The transmission component 415 decides whether to send the reports to the backend misbehavior management entity 420 (e.g., MA 141, 220). If multiple reports are available to send, the transmission component 415 decides which ones to send, and in which order.

The state component 413 stores information that is used by other components inside the misbehavior reporting subsystem 401 to carry out their functions. The misbehavior reporting system 401 may have to manage three distinct "budgets": one for report creation (e.g., as there may be competing demands for access to a signing process, or for processor time in general); one for storage (e.g., as the total volume of reports generated may exceed the storage available or allocated for them); and one for report transmission (e.g., as it may not be possible to upload all generated reports due to intermittent connectivity). The state component 413 is the functional entity responsible for managing each of these budgets. The functionality of the MR is discussed in clause 5.2.1 of [TR103460], and the MR requirements are discussed in clause 7.2 of [TR103460], which is hereby incorporated by reference in its entirety.

The MRS 400 and/or the MRS subsystem 401 identifies reporting and reported ITS-S, and includes the reporting ITS-S and the reported ITS-S identities in the MR. To avoid the generation and transmission of false reports, the authenticity of this identification information is protected. The MRS 400 and/or the MRS subsystem 401 provides reliability and proof-based evidence in the MR. The evidence is related to the observations of individual detectors by the local MDS of the reporting ITS-S, so that the MA is able to verify the observations independently. This evidence shall include the original received message and the indication of the relevant individual detectors.

The MRS 400 and/or the MRS subsystem 401 provides efficiency and minimum resource consumption such that MRs do not overload the communication channel. The reporting process should not send repetitive and redundant information about the same misbehavior event. The MRS 400 and/or the MRS subsystem 401 provides flexibility in that the design of the MR is extensible to allow to integrate new individual detectors and new evidence at a later stage without breaking backward compatibility, if need be.

Additionally, the MRS 400 and/or the MRS subsystem 401 includes the following security and privacy requirements. Privacy protection (e.g., the design of the MR is such that the MA is unable to link the short term and the long-term identities of the reported ITS-S and of the reporting ITS-S. The reporting ITS-S shall use its pseudonym certificates or Authorization Tickets (AT) to communicate with the MA); confidentiality (e.g., MRs sent by a reporting ITS-S are encrypted to protect the confidentiality of the information sent to the MA); integrity & authenticity (e.g., MRs sent by an ITS-S are signed with the private key corresponding to the verification public key of the valid AT of the reporting ITS-S to ensure the integrity and authenticity of the data); and non-repudiation (e.g., the MR provides sufficient evidence to allow the MA to verify that the messages reported as suspicious were sent by the reported ITS-S. This evidence at least includes the suspicious messages, which include the associated AT. The AT proves that the reported ITS-S is a trusted ITS-S owning a valid AT with permission levels satisfying the corresponding ITS app requirements).

Figure 5:
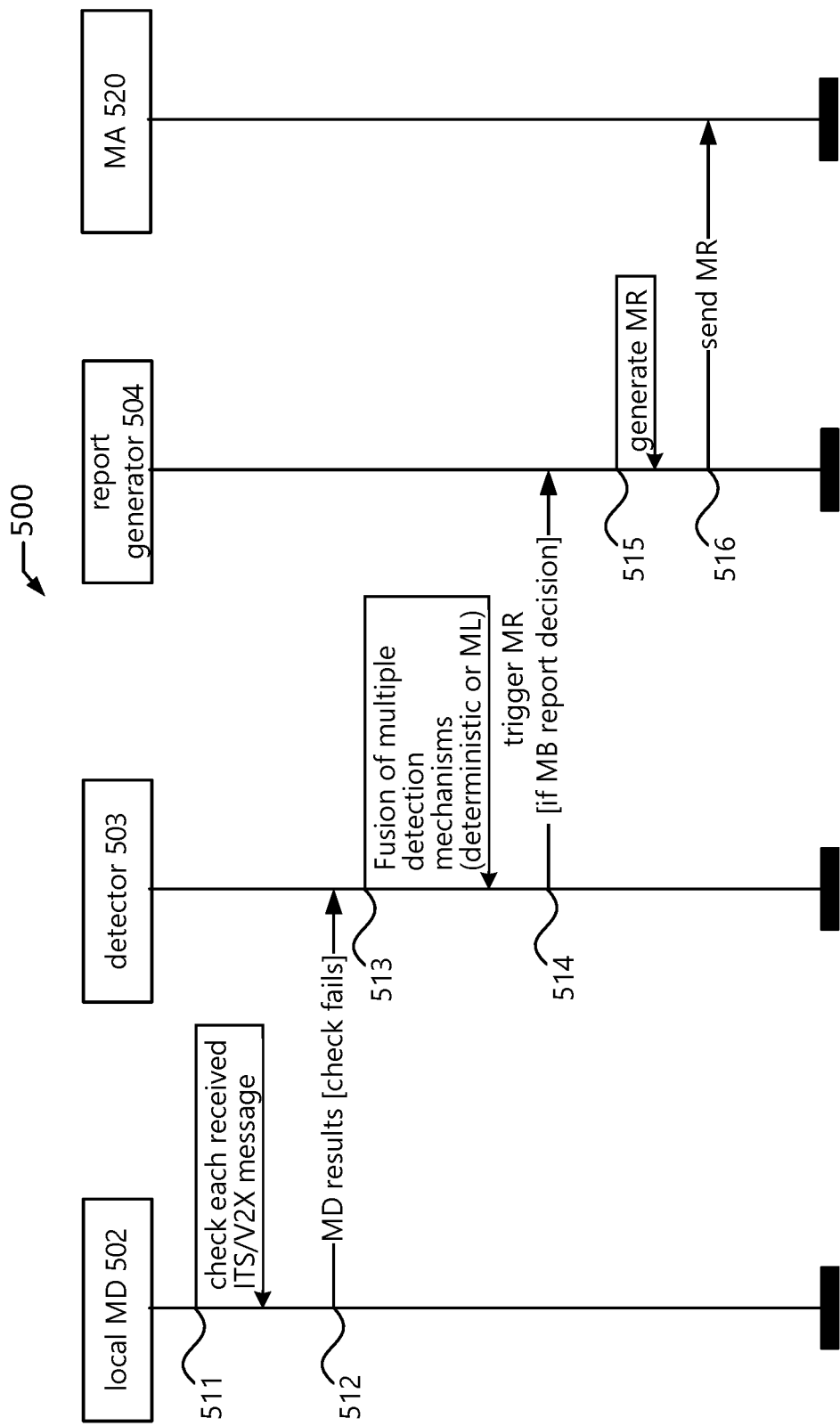
FIG. 5 depicts an example misbehavior detection and reporting procedure.

FIG. 5 depicts an ITS-S local misbehavior detection and reporting process 500, which is performed by an ITS-S (e.g., ITS-S 1203 or VRU ITS-S 1217 of FIG. 12, V-ITS-S 1601 of FIG. 16, P-ITS-S 1701 of FIG. 17, and/or R-ITS-S 1801 of FIG. 18) to detect potentially misbehaving neighbor ITS-Ss. The MD and reporting process 500 is performed by a local MD module 502, a detection app 503, a report generator 504, and an MA 520. The MA 520 may be the same or similar as the MA 141, 220. Additionally or alternatively, the local MD 502 may be the same or similar as the local MD 210, the MD architectures 300a, 300b, MDS 301, and/or MD 1310. Additionally or alternatively, the local MD 502 may be the same or similar as the local MD component 211, and/or the individual detectors 303a and 303b. Additionally or alternatively, the detection app 503 may be the same or similar as the local misbehavior detection (fusion) app 304a, the individual detectors 303b, and/or event categorization unit 304b. Additionally or alternatively, the report generator 504 may be the same or similar as the misbehavior reporting unit 212, the misbehavior reporting component 401, and/or the like.

Operation of the detection and reporting of a misbehaving entity in process 500 is as follows. At operation 511, the ITS-S local MD module 502 runs consistency checks on each received V2X/ITS message using specified MD mechanisms (see e.g., MD mechanisms shown by Table 1, and/or the MD mechanisms and/or the V2X/ITS message detection use cases discussed in [TR103460] and/or as discussed herein). At operation 512, the ITS-S local MD module 502 transmits MD results to the ITS-S advanced MD (fusion) app 503 if the consistency check fails (e.g., the local MD module 502 detects a potential inconsistency). At operation 513, the MD (fusion) app 503 compiles results of the multiple detectors (e.g., individual detectors 303a and 303b). In some implementations, this step of the decision logic is based on the fusion of multiple factors (e.g., results of the basic checks, the node trust estimation, and/or the like) and/or can combine multiple detection techniques or algorithms, including various deterministic techniques and/or various AI/ML techniques such as any of those discussed herein. At operation 514, the MD (fusion) app 503 determines to trigger (or not) the transmission of a report or indication of the potential misbehavior to the report generator 504. The report or indication of the potential misbehavior is based on an outcome (results) of the fusion of the multiple detection techniques.

At operation 515, the report generator 504 generates an MR based on the received report or indication of the potential misbehavior, and sends the MR to the MA 520 at operation 516.

1.2. Misbehavior Reporting Dissemination Protocol

The misbehavior reporting protocol functionalities and requirements are discussed in clause 7 of [TR103460]. As discussed previously w.r.t FIG. 5, at least in some implementations the reporting process begins as soon as an ITS-S detects an implausibility (potential inconsistency), and the fusion app decides to report it. The ITS-S then collects the evidence required to prove and recreate a misbehavior on the global level. After collecting sufficient evidence, an MR is created and sent to the MA 141, 220, 520. In some implementations, the reporting is not a real time process, and an MR is sent to the MA 220, 520 when connectivity is available via a suitable communication interface. In these implementations, the MA 141, 220, 520 performs data analysis on the MR to investigate whether a misbehavior has occurred or not, and the ITS-S does not wait for a decision response about the reported ITS-S from the MA 141, 220, 520.

In some implementations, two entities are involved in the MRS: the first entity is a reporting ITS-S, which is the ITS-S that initiates the MRS and the second entity is the MA 141, 220, 520. The reporting ITS-S is part of the security entity in the ITS-S (see e.g., security entity 1306 of FIG. 13, and ETSI EN 302 665 V1.1.1 (2010-09) ("[EN302665]")). The roles of these entities are detailed in Table 2.

TABLE 2

Functional element roles

| Functional element | Role |
| --- | --- |
| Reporting ITS-S | The ITS-S which initiates the misbehavior reporting service for transmitting a MR message to the Misbehavior Authority certified by its own Root CA. |
| ITS-S Roadside (Gateway) | ITS-S Roadside Gateway receives broadcast messages from mobile ITS-S and relays MR message to the MA. |
| Misbehavior Authority (MA) | MA is responsible for processing misbehavior reports, investigating on potentially misbehaving ITS-S and taking a reaction accordingly in relation with the ITS-S device operator or car manufacturer. MA has the capability to detect misused certificates and misbehaving stations and to revoke misbehaving stations privileges to send messages that are trusted by other ITS-Stations. |

To send an MR to the MA 141, 220, 520, the ITS-S has to set up a communication with the MA 141, 220, 520. The ITS-S may use different communication types for the reporting of a misbehaving entity such as, for example, W-V2X (e.g., ITS-G5), C-V2X (e.g., 3GPP 3G, 4G/LTE, 5G/NR, WiMAX, and/or the like), and/or using some other RAT such as any of those discussed herein.

Figure 6:
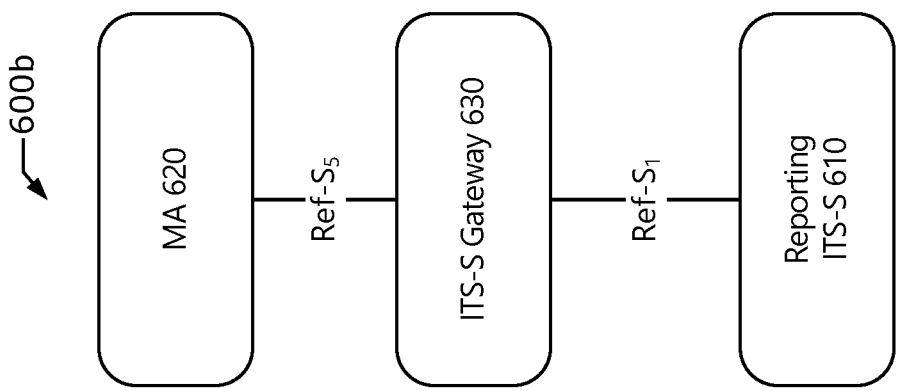
FIG. 6 depicts options for communication with a misbehavior authority.
Figure 6:
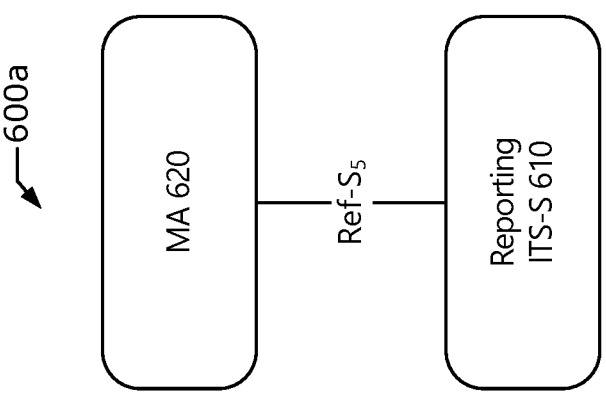

FIG. 6 present two possible options for communication with an MA 620 (which may be the same or similar as MA 141, 220, 520). A first option 600a involves communication between a reporting ITS-S 610 and the MA 620 over a reference point $S_5$ (Ref-$S_5$). In this example, Ref-$S_5$ may include a cellular network connection (e.g., LTE or NR Uu interface, PC5 interface, and/or the like). A second option 600b involves communication between the reporter ITS-S 610 and an ITS-S gateway (GW) 630 over a reference point $S_1$ (Ref-$S_1$), and communication between the ITS-S GW 630 and the MA 620 over Ref-$S_5$. In some examples, the ITS-S GW 630 may be the same or similar as the ITS-S GW 1611 or ITS-S GW 1811 of FIGS. 16 and 18. Additionally or alternatively, the ITS-S GW 630 may be a remote unit (RU) or remote radio head (e.g., RU 1810 of FIG. 18) and/or a roadside ITS-S/RSU (e.g., RSU 1230 and/or R-ITS-S 1801 of FIGS. 12 and 18). Additionally or alternatively, the ITS-S GW 630 may be some other type of base station or access point such as any of those discussed herein.

In this example, Ref-$S_1$ may include a short-range wireless access network connection (e.g., WLAN (e.g., WiFi and/or the like), a W-V2X connection (e.g., V2I, ITS-G5, DSRC, and/or the like)), and/or some other RAT interface such as any of those discussed herein; and Ref-S$_5$ may be a cellular network connection as in option 600*a*. Additionally or alternatively, some other RAT may be used for Ref-S$_5$. This functional model extends the ITS communication security model specified in [TS102940] with different communication paths. It introduces functional entities as defined in Table 2 and specifies the communication paths needed to support the ITS-S communication via a cellular network (option 600*a*) or via an WLAN/W-V2X access network to the ITS (option 600*b*).

In option 600*a*, the ITS-S 610 transmits the MR message directly to the MA 620 via cellular network (Ref-S$_5$). In option 600*b*, the ITS-S 610 has the capabilities to transmit MR message through the short-range wireless communication interface (Ref-S$_1$). For ITS-G5 scenarios, a communication bandwidth should be made available to the reporting ITS-S on an allocated G5 channel for security management purpose (e.g., CCH, SCH1, and/or SCH2). In some examples, the model specified in [TS102940] is refined by considering one ITS-S 610 sending an MR message over Ref-S$_1$, one R-ITS-S 630 for relaying the MR message to the recipient MA 620 via the infrastructure network over Ref-S$_5$.

1.3. Misbehavior Detection for CPMs

The present disclosure provides systems, methodologies, and algorithms for nodes (e.g., V2X Tx/Rx, ITS-Ss, and the like) to detect misbehavior when CPMs are deployed and present in the network. In particular, consistency checks are applied to CPMs as discussed infra. Using the principle of data consistency, a multi-step systematic check within a single CPM, across multiple CPMs from the same V2X node, or multiple CPMs from different nodes are presented as a suite of local misbehavior detection algorithms.

Figure 11:
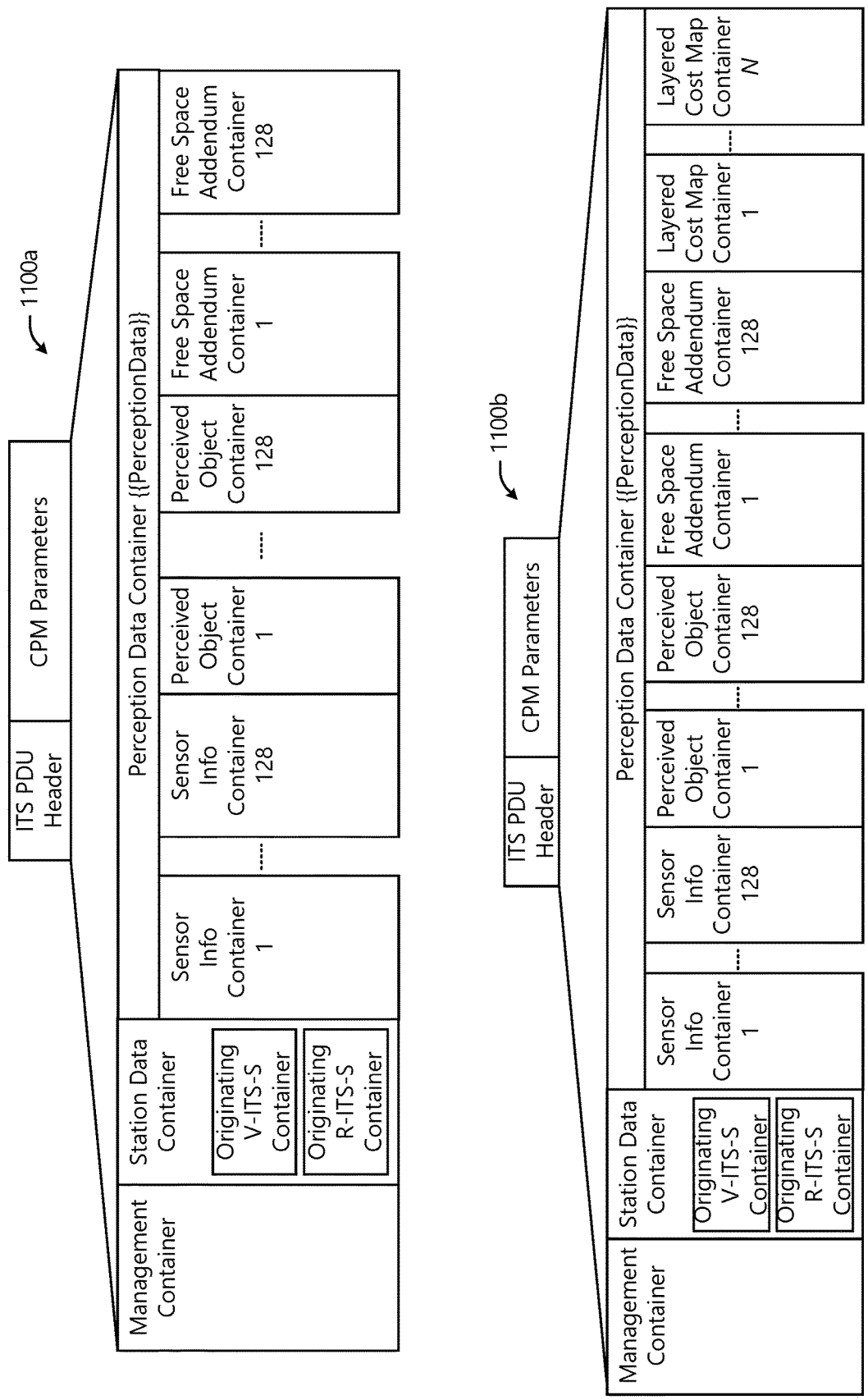
FIG. 11 illustrates example CPM formats and/or structures.

As discussed in more detail infra w.r.t. FIG. 11, perception data can be represented by an Object List with Free Space (OLFS) that carries a list of sensor information container objects (e.g., in the sensor information container(s) in CPM 1100*a*, 1100*b* in FIG. 11) indicating information of the Tx's sensors (e.g., sensors of the sender of the CPM 1100*a*, 1100*b*), a list of perceived objects (e.g., in the perceived object container(s) in CPM 1100*a*, 1100*b* in FIG. 11) including each object's state (e.g., position, speed, heading, acceleration, object size, and the like), and one or more Free Space Addendum Containers indicating free space in a sensor FoV or the like. The Free Space Addendum Containers may specify a list of polygons that are being perceived as free drivable space by the ITS-S, and/or specify free space confidence indications to compute resulting free space by applying a ray-tracing algorithm. Additionally or alternatively, the sensor information container(s) may be used to provide information about a particular sensor's capabilities to provide confirmed measurements about detected free space (e.g., in the FreeSpaceConfidence DE). The following data consistency checks can be applied locally at a Tx or Rx node to detect misbehavior related to CPMs. Here, the Tx or Rx node can be a vehicle system (e.g., a vehicle onboard unit (OBU), in-vehicle systems (IVS) 1201, ITS-S 1203, V-ITS-S 1601, and/or the like), a network access node (NAN) (e.g., a base station, access point (AP), Roadside Unit (RSU), NAN 1230, R-ITS-S 1801, and/or the like), a robotic system (e.g., robot 801 in FIG. 8), and/or a mobile device (e.g., VRU system/ITS-S 1217, P-ITS-S 1701, and IoT device, autonomous sensor, and/or the like).

Figure 7:
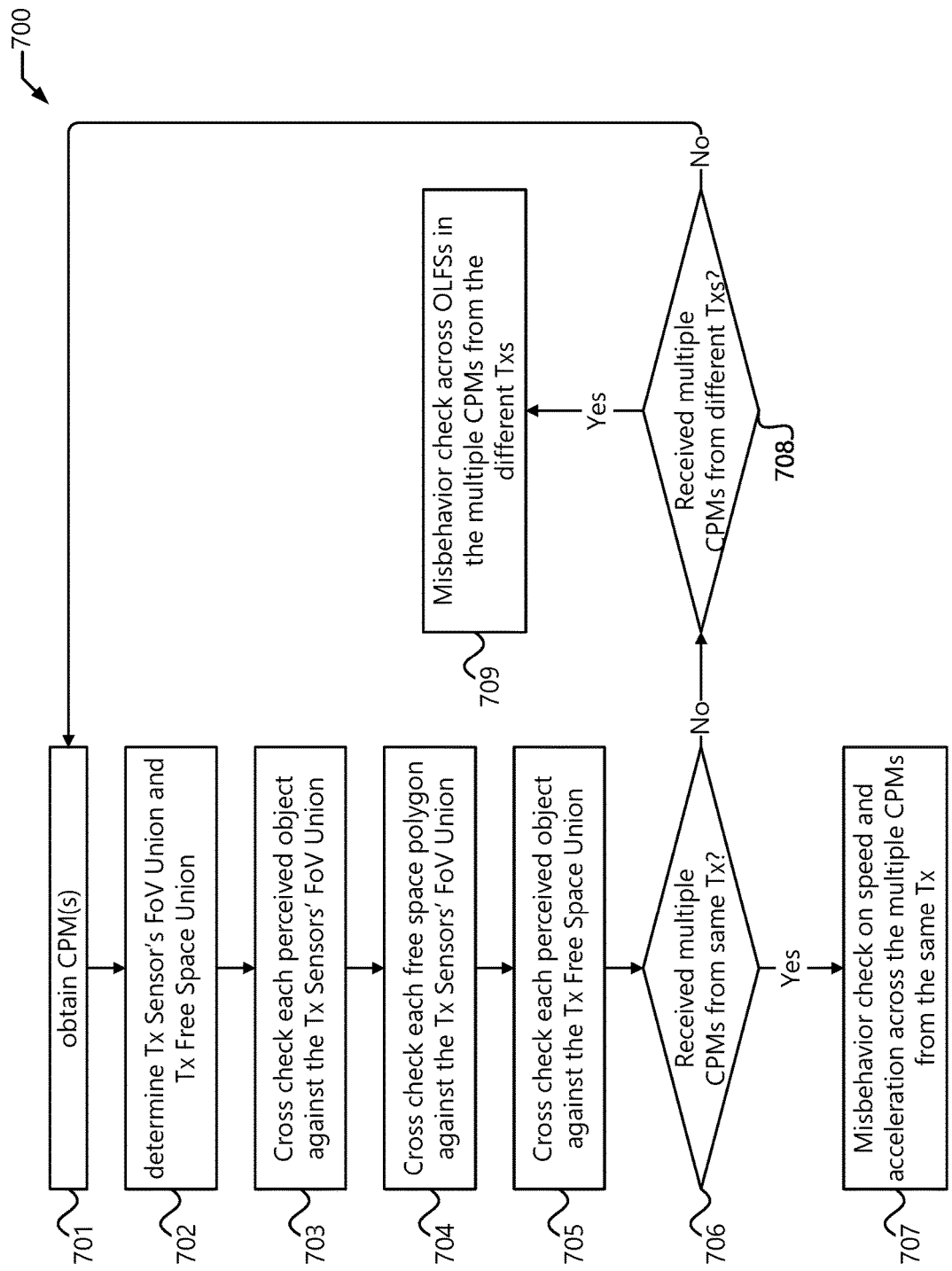
FIG. 7 depicts a Collective Perception Message (CPM) misbehavior detection process.

FIG. 7 shows an example CPM misbehavior detection process 700, which may be performed by a suitable MDS of an ego ITS-S (e.g., MDS 210, detection system (probe) 211, local MDS 301, one or more detectors 303, fusion app 304*a*, event categorization component 304*b*, MRS subsystem 401, local MD module 502, detection app 503, reporting ITS-S 610, MD 1310, and/or some other computing device or element discussed herein).

Process 700 begins at operation 701, where the local MDS obtains one or more CPM(s) (e.g., CPM 1100*a*, 1100*b*). Next, the MDS performs, for each received CPM 1100*a*, 1100*b*, a misbehavior check within an individual CPM 1100*a*, 1100*b*, which includes operations 702-705. At operation 702, the MDS determines a Tx sensors' Field of View (FoV) union and a Tx free space (TxFS) union. For MD within individual CPMs 1100*a*, 1100*b*, the following parameters are defined for each received CPM 1100*a*, 1100*b* and/or at each Tx node: Tx Sensors' FoV (TxS-FoV) union and TxFS union. The TxS-FoV is a union or other suitable combination of the FoVs of all sensors indicated by the sensor information containers in the received CPM 1100*a*, 1100*b*, with some margin of errors added depending on the accuracy of the sensors. The TxFS union is a union or other suitable combination of all the free space indicated by the free space containers with some margin of errors added depending on the accuracy of the sensors. The free space union may be a union or other combination of all the free space polygons indicated by the free space containers, or a union or other combination of the free space confidence indications indicated by the free space containers, which is/are used to compute a resulting union/combination free space polygon by applying a suitable ray-tracing algorithm or the like. The TxS-FoV union and TxFS union may be produced by the fusion app 304*a* and/or event categorization component 304*b* using any suitable data fusion technique and/or AI/ML techniques, such as any of those discussed herein.

At operation 703, the MDS performs a cross check on each perceived object (e.g., in the perceived object container in the CPM 1100*a*, 1100*b*) against the TxS-FoV union. Here, if each perceived object is inside the TxS-FoV union, then the MDS does not declare an inconsistency. Otherwise, the MDS declares an inconsistency within the single CPM 1100*a*, 1100*b* which should be reported as a misbehavior.

At operation 704, the MDS performs a cross check on each free space polygon against the TxS-FoV union. Here, if each free space polygon is inside the TxS-FoV union, then the MDS does not declare an inconsistency. Otherwise, the MDS declares an inconsistency within the single CPM 1100*a*, 1100*b* which should be reported as a misbehavior.

At operation 705, the MDS performs a cross check on each perceived object against the TxFS union. Here, if an object is outside of the TxFS union, then the MDS does not declare an inconsistency. Otherwise, the MDS declares an inconsistency within the single CPM 1100*a*, 1100*b* which should be reported as a misbehavior.

Additionally or alternatively, the cross checks in operations 703, 704, and 705 can include any of the consistency checks, plausibility checks, and/or other data validation detection techniques/schemes discussed herein.

Additionally or alternatively, the MDS performs, for each received CPM 1100*a*, 1100*b*, a misbehavior check for multiple CPMs 1100*a*, 1100*b* obtained from the same Tx, which includes operations 706-707. At operation 706, the MDS determines whether multiple CPMs 1100*a*, 1100*b* were received from the same Tx (e.g., by checking the ITS-S identifier (ID) of the originating ITS-S in the ITS PDU header of the multiple CPMs 1100*a*, 1100*b*). If the MDS determines that multiple CPMs 1100*a*, 1100*b* were not received from the same Tx (e.g., either multiple CPMs 1100a, 1100b received from different Txs, or only CPM 1100a, 1100b being received), then the MDS proceeds to perform a misbehavior check for multiple CPMs 1100a, 1100b from different Txs (e.g., operations 708-709). If the MDS determines that multiple CPMs 1100a, 1100b were received from the same Tx, then the MDS proceeds to operation 707 to perform the misbehavior check on the speed and/or acceleration data across the multiple CPMs 1100a, 1100b.

Similar to the consistency check across multiple BSMs, CAMs, and/or DENMs from the same Tx that can verify the speed and/or acceleration from the change of position and/or speed over time, the MDS performs a consistency check on the speed and acceleration of the same perceived object (e.g., having the same objectID) by the same Tx (e.g., as indicated by the ITS-S ID in the ITS PDU header of the CPM 1100a, 1100b), which can be checked and/or compared with one another over some predetermined amount of time (e.g., using the kinematic state and attitude description for the objectID). In some implementations, if the speed and/or acceleration over time is outside some suitable standard deviation for the corresponding change in position and/or speed over time, then the MDS does declares an inconsistency which should be reported as misbehavior. Otherwise, the MDS does not declare an inconsistency.

Additionally or alternatively, the MDS performs, for each received CPM 1100a, 1100b, a misbehavior check for multiple CPMs 1100a, 1100b obtained from the multiple, different Txs, which includes operations 708-709. At operation 708, the MDS determines whether multiple CPMs 1100a, 1100b were received from the different Txs (e.g., by checking the ITS-S ID of the originating ITS-S in the ITS PDU header of the multiple CPMs 1100a, 1100b). If the MDS determines that multiple CPMs 1100a, 1100b were not received from different Txs, then the MDS proceeds to back to operation 701 to obtain additional CPMs 1100a, 1100b. If the MDS determines that multiple CPMs 1100a, 1100b were received from the different Txs, then the MDS proceeds to operation 709 to perform the misbehavior check on the Object List with Free Space (OLFS) data across the multiple CPMs 1100a, 1100b from different Txs.

The misbehavior (consistency) check across multiple CPMs 1100a, 1100b with OLFS includes two different misbehavior checks. A first OLFS misbehavior (consistency) check involves checking/verifying an Rx sensors' FoV (RxS-FoV) union and Rx sensor-based environmental map ("RxS-map") at the Rx (MDS) at each time instance when a new CPM 1100a, 1100b is received. The RxS-FoV union is the union of the FoV of all local/onboard sensors (or other accessible sensors) with some margin of error(s) added depending on the accuracy of the sensors. This reflects the total FoV for the Rx.

The RxS-map is a 2D occupancy grid or costmap. In some implementations, the generated RxS-map is generated solely based on sensor data from the ego ITS-S's onboard sensors. In these implementations, a grid in the occupancy map/costmap is labeled as "occupied" if an object is perceived by the Rx sensors as being located/positioned at a location/position corresponding to that grid, labeled as "free" if the location/position of the grid is within the RxS-FoV union but no object or obstacle is perceived at that location/position (e.g., the grid is unoccupied), or labeled as "unknown" if the location/position of the grid is outside of RxS-FoV union or if the location/position of the grid is behind an object or otherwise obstructed from the RxS-FoV union. Because the RxS-map is generated only based on local/onboard sensors, it is reasonable for the RxS-map to be considered trustworthy.

Each new perceived object in OLFS is then cross checked against the RxS-map. Here, an inconsistency is detected/declared and a potential misbehavior is reported when a location/position of a perceived object included in the newly received CPM is in a grid of the RxS-map indicated as "Free". This means that the Rx's sensors detected a free (unoccupied) space in the RxS-FoV, but another node is reporting that an object is located in that free (unoccupied) space. When such inconsistency is detected, because the RxS-map is considered to be trustworthy, it is reasonable to conclude that the misbehavior is caused by the newly received CPM 1100a, 1100b.

The second OLFS misbehavior (consistency) check involves checking/verifying an Rx CPM-based environmental map ("RxCPM-map"). In some implementations, even if the first OLFS misbehavior (consistency) check passes, the MDS continues to perform the second OLFS misbehavior (consistency) check.

The RxCPM-map is similar to RxS-map, but is based on the onboard/local sensor data and information received from other Tx nodes such as BSMs, CAMs, CPMs, and the like. In some implementations, the RxCPM-map can be, or is based on, the costmap data in the LayeredCostMapContainer of CPM 1100b. In these implementations, the RxCPM-map can include various layers as discussed infra and/or as discussed in [PCTa] and [PCTb]. The RxCPM-map is generated by fusing all available information from the Rx. In some implementations, the RxCPM-map is generated based on the Rx's onboard/local sensor data and sensor data (or perceived objects) received from neighboring ITS-Ss. Here, an object (e.g., a V-ITS-S 1210 or VRU ITS-S 1217) announced by BSM or CAM, or an object in the perceived object list of a CPM 1100a, 1100b would be treated just like an object or obstacle perceived by onboard/local sensors. The free space polygons indicated by some or all of the free space containers can be fused with some or all of the objects/obstacles indicated by received CPMs 1100a, 1100b. In some implementations, a fusion algorithm performed on each grid can be applied iteratively with information from at least two independent data sources. Where more than two data sources are used, data from two sources can be fused, and the fused data can be compared with data from a third data source, and so forth. Other techniques can be used for handling multiple data sources depending on the data fusion technique(s) being used and/or can be implementation specific.

The MDS (or some other subsystem or component of the ITS-S) produces fused outcomes (occupancy grid values) as follows: if the at least two sources are in agreement (e.g., data from the at least two data sources are the same or substantially the same) for a particular grid, then the same label is kept (unchanged) for the grid. If the at least two sources are not in agreement (e.g., each data source indicates different values for an occupancy grid) for a particular grid, then the MDS may produce a fused outcome as follows: if one data source indicates a grid as "free" and the other data source indicates that grid as "unknown" then the fused result should be "free"; and if one data source indicates a grid as "unknown" and the other data source indicates that grid as "occupied", then the fused result should be "occupied". If one data source indicates a grid as "free" and the other data source indicates that grid as "occupied", then the MDS declares an inconsistency for that grid. This may be referred to as object tracking and fusion where each new perceived object is either associated and merged with an existing perceive object or treated as a new separate object. Additionally, a redundancy score can be recorded for each merged object to record the total number of independent observers as a rough measure of a consensus level for that object. The data source occupancy grid values and corresponding fused outcomes are shown by Table 3.

TABLE 3

Costmap Outcomes based on Data Fusion

| $1^{st}$ occupancy map grid value | $2^{nd}$ occupancy map grid value | fused occupancy map grid value (outcome) |
|---|---|---|
| Free | Free | Free |
| Unknown | Unknown | Unknown |
| Occupied | Occupied | Occupied |
| Free | Unknown | Free |
| Unknown | Occupied | Occupied |
| Free | Occupied | Declare Inconsistency |

Where an inconsistency is declared, the inconsistency is treated as a potential misbehavior. This is because the RxCPM-map is generated using information gathered from local/onboard sensors and from remote nodes, and as such, the RxCPM-map is not considered trustworthy. Since the detected inconsistency only indicates a potential misbehavior, it is not conclusive as to whether a misbehavior is caused by the newly received CPM 1100a, 1100b, some other (previously received) CPM 1100a, 1100b, or the local/onboard sensors. Therefore, the inconsistency is reported to a local report determination element (e.g., MRU 212, fusion app 304a, event categorization app 304b, MRS subsystem 401, and/or the like) for a determination as to whether the inconsistency should be reported via an MR message.

Figure 8:
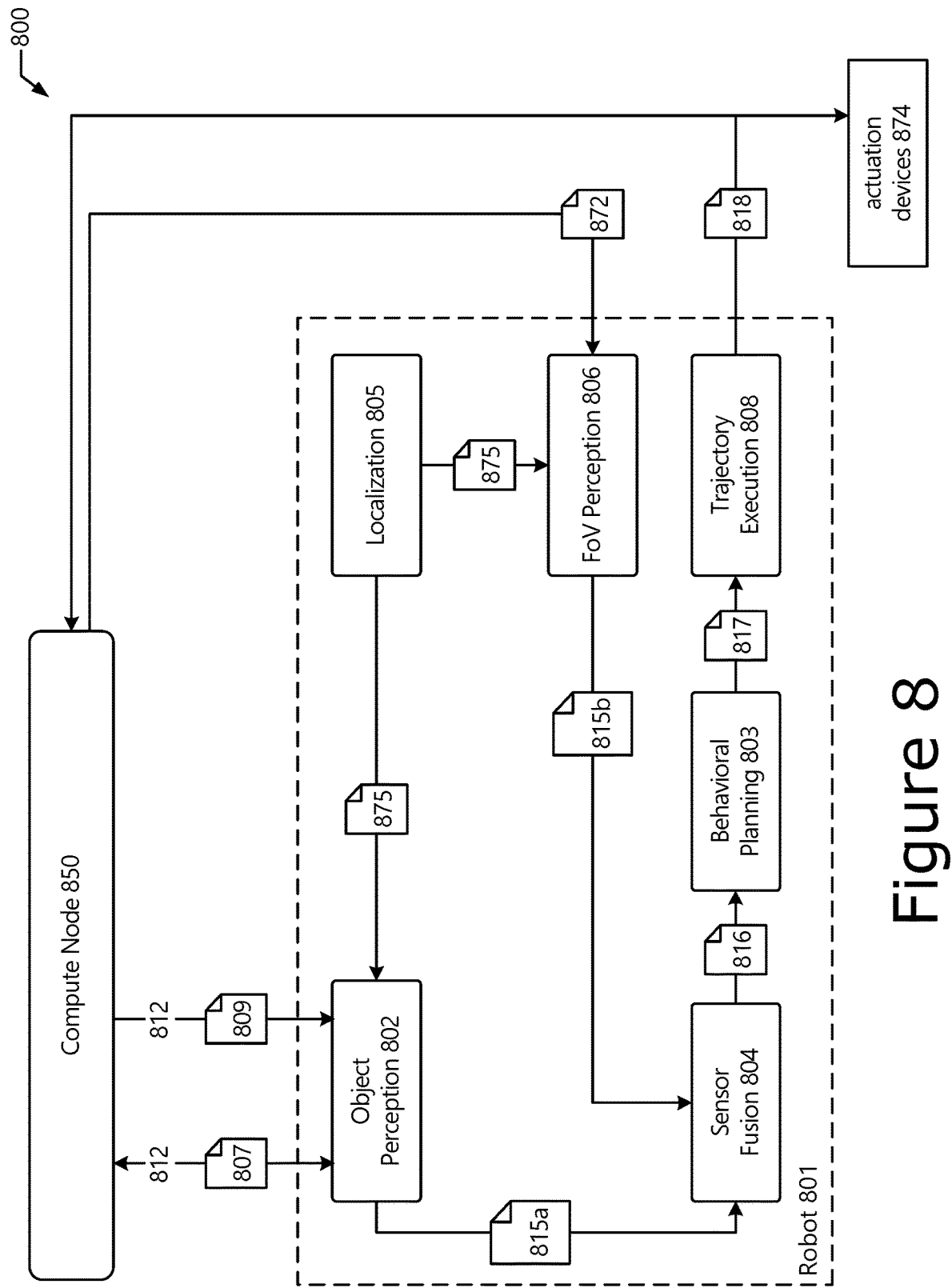
FIG. 8 depicts an component arrangement for CPM MDS.

FIG. 8 illustrates an example robotic system architecture 800, which includes a robot 801 that interacts with a compute node 850. The robot 801 and/or the compute node 850 may be the same or similar to any of the computing devices and/or compute nodes discussed herein including any of the devices or systems discussed infra w.r.t. FIGS. 12-19, or one or more components of such computing systems. As examples, the robot 801 can be a (semi-)autonomous robot, robotic system, (semi-)autonomous vehicle, (semi-)autonomous sensors, IoT device, smart appliance, and/or any other suitable robot or robotic system such as any of those discussed herein. Additionally or alternatively, the compute node 850 can be a robot or robotic system such as any of those discussed herein. In another example, the robot 801 is an ITS-S such as ITS-S 201 or reporting ITS-S 610, and the compute node 850 is another ITS-S such as the ITS-S gateway 630, a roadside ITS-S, a vehicle ITS-S, a personal ITS-S, and/or the like such as those discussed in FIGS. 13, 16, 17, and 18. In another example, the compute node 850 comprises one or more sensors embedded in or otherwise disposed in the robot 801, or one or more sensors accessible by, or otherwise communicatively coupled with the robot 801.

In the example of FIG. 8, the robot 801 includes an object perception unit 802, behavioral planning unit 803, sensor fusion unit 804, localization unit 805, FoV perception unit 806, and trajectory execution unit 808. The compute node 850 communicates with the robot 801 over a suitable communications channel 812, which may be a V2X channel of any of the V2X RATs discussed herein or any other type of RAT channel such as any of those discussed herein. In particular, the compute node 850 may provide environment ground truth data 809 to the object perception unit 802 in the robot 801. In some implementations, the object perception unit 802 may be the same or similar as the local perception and trajectory prediction apps 1602, 1702, and 1802 in FIGS. 16, 17, and 18.

The environment ground truth data 809 may be an environmental model, which is a digital representation of the physical environment around (or surrounding) the robot 801. The environmental model includes, for example, representations of roads, objects including objects to be avoided (e.g., obstacles), and free space (space or areas not including objects). The environmental model may be built from data collected from various data sources such as, for example, sensors (e.g., radar, cameras, LIDAR, ultrasonic sensors, and/or any other suitable sensors such as those discussed herein).

The object perception unit 802 also obtains map data 875 from the localization unit 805. In some implementations, the localization unit 805 may be the same or similar as the local device sensor system and IoT Platform 1605, 1705, and 1805 in FIGS. 16, 17, and 18. Additionally or alternatively, the localization unit 805 may correspond to the PoTi 1322 and/or the LDM 1322. Additionally or alternatively, the localization unit 805 may correspond to the positioning circuitry 1975 of FIG. 19.

The map data 875 may include, for example, one or more static maps, which may be encoded/decoded according to OpenLR™ White Paper, version 1.5, revision 2 (19 Jan. 2012); Intelligent transport systems (ITS)—Location referencing for geographic databases Part 3: Dynamic location references (dynamic profile), ISO 17572-3:2015 (January 2015) (also known as "Agora-C"), and/or some other suitable standard. Additionally or alternatively, the map data 875 may include location information such as, for example, point location information (e.g., position of the robot 801 in a suitable coordinate system such as GNSS coordinates, WGS84 coordinates, and/or the like), segment location information (e.g., position and extent of a particular area or event (e.g., traffic jam or the like)), and/or area location information (e.g., environmental conditions such as weather data and/or the like). Additionally or alternatively, the map data 875 may include any of the data/information discussed in [TR102863] and/or [TS302895]. Additionally, the object perception unit 802 can obtain additional or alternative environment data such as, for example, costmap data, object lists, CPMs, CAMs, BSMs, DENMs, and/or other like information from the compute node 850.

The object perception unit 802 uses the environment ground truth data 809 and the map data 875 to perceive various objects in the environment using any suitable object detection or tracking technique, such as any of those discussed herein. In some implementations, the object perception unit 802 uses the environment ground truth data 809 and the map data 875 to determine or generate the RxS-map and/or the RxCPM-map discussed previously. The perceived objects, the RxS-map, and/or the RxCPM-map is/are provided to the sensor fusion unit 804 in the form of a costmap data and/or an object list 815a.

Additionally, the compute node 850 may provide environmental observations 872 to the FoV perception unit 806 in the robot 801. In some implementations, the FoV perception unit 806 may be the same or similar as the local perception and trajectory prediction apps 1602, 1702, and 1802 in FIGS. 16, 17, and 18.

The environmental observations 872 may include, for example, ground truth data (which may be same or similar to the environment ground truth data 809) and/or data in the form of one or more CPMs, CAMs, BSMs, DENMs, sensor data (e.g., LiDAR, and the like), and/or the like.

The FoV perception unit 806 also obtains map data 875 from the localization unit 805. The FoV perception unit 806 may use the environmental observations 872 and the map data 875 to generate and/or determine objects in an FoV of the ITS-S in which the MDS client 801 is disposed.

Additionally or alternatively, the FoV perception unit 806 generates/determines the TxS-FoV union and/or TxFS union discussed previously. The perceived objects in the FoV, the TxS-FoV union, and/or the TxFS union, is/are provided to the sensor fusion unit 804 in the form of another costmap data and/or an object list 815b.

The sensor fusion unit 804 performs data fusion on the costmaps/object lists 815a and 815b and generates fused data 816. In some implementations, the sensor fusion unit 804 may be the same or similar as the local device sensor fusion apps 1604, 1704, and 1804 in FIGS. 16, 17, and 18. Additionally or alternatively, the sensor fusion unit 804 may be the same or similar as the misbehavior detection app 304a/data fusion app 304a and/or event categorization app 304b. The sensor fusion unit 804 may generate the fused data 816 using any suitable data fusion technique such as any of those discussed herein, and/or combinations thereof.

The sensor fusion unit 804 provides the fused data 816 to the behavioral planning unit 803. In some implementations, the behavioral planning unit 803 may be the same or similar as the motion prediction apps 1603 and 1703 of FIGS. 16 and 17, or mobile objects trajectory prediction app 1803 of FIG. 18. Additionally or alternatively, the behavioral planning unit 803 may be, or may include a suitable MDS such as the MDS 210, MDS 301, MD module 502, and/or MD 1310. The behavioral planning unit 803 uses the fused data 816 and/or other data for behavior planning, which may involve, for example, determining one or more tasks or actions for the robot 801 to perform, a plan (e.g., a sequence of actions or tasks to achieve or maintain one or more goals), and/or a trajectory of the robot 801 (e.g., path, speed, acceleration, orientation, and/or the like) to competently perform the one or more dynamic tasks given a particular environmental situation (e.g., a driving situation when the robot 801 is a (semi-)autonomous vehicle). As examples, the behavioral planning unit 803 can employ one or more planning mechanisms or techniques to carry out the behavioral planning such as artificial potential field (APF), cell decomposition, visibility graph, Voronoi diagram, and probabilistic road maps, probabilistic roadmap method (PRM), rapidly-exploring random tree (RRT), finite state machine (FSM) methods, double-layer FSMs, multi-objective functions (e.g., multi-objective genetic algorithms (MOGA)s, multi-objective evolutionary algorithms (MOEAs), multi-objective memetic algorithms (MOMAs), and/or the like), modified particle swarm optimization (PSO), reinforcement learning techniques, and/or the like.

In some implementations, behavioral planning unit 803 generates a trajectory 817, which is provided to the trajectory execution unit 808. The trajectory 817 can be expressed in various forms such as, for example, polynomial(s), Bezel curve(s), spline curve(s), a series of waypoints, and/or the like. Additionally or alternatively, the behavioral planning unit 803 generates a plan 817 that includes a set of tasks or actions to be performed by the robot 801.

The trajectory execution unit 808 generates actuation commands 818 based on the trajectory/plan 817. In some implementations, the trajectory execution unit 808 may be the same or similar as the motion control element 1608 of FIG. 16. The trajectory execution unit 808 converts, translates, or transforms the trajectory/plan 817 into actuation commands 818 to be executed by one or more actuation devices 874 and/or the compute node 850. The actuation commands 818 may be any suitable data structure (and in any suitable form or format) that includes instructions or commands for executing the tasks or actions of the trajectory/plan 817, and which may be consumable by the actuation devices 874 and/or the compute node 850. In some implementations, the actuations devices 874 may be the same or similar as the actuators 1974 of FIG. 19, and/or the like.

1.4. Misbehavior Reporting Service 1.4.1. Misbehavior Detection for its Messages and Required Evidence Table 4 and Table 5 list examples of individual detectors on CAMs and/or CPMs, and their classification according to Table 7. In Table 4, the level increases as the amount or level of sophistication in the evidence used for detection increases (e.g., level 1 has less evidence, or less sophisticated evidence, then the evidence used for level 5). Table 6 shows examples of the amount and/or types of evidence that should be included in a misbehavior report based on the evidentiary level.

TABLE 4 example ITS message detection issues

| Group | Message Issue — Detail | Level 1 | 2 | 3 | 4 | 5 |
|---|---|---|---|---|---|---|
| General | Beacon frequency too high | | X | | | |
| Reference position | Position outside of own communications coverage area | X | | | | |
| | Change of position inconsistent with speed | | X | | | |
| | Change of position inconsistent with heading | | X | | | |
| | Position not on road | | | x | | |
| | Position overlap with another object | | | X | | |
| | Position inconsistent with relative position (e.g., Lidar, Radar, RSSI, AoA, and/or the like) | | | | X | |
| | Position inconsistent with maximum plausible range | | | | X | |
| | Position inconsistent with fused collective perception and contextual info (e.g., from sensor, CAM, CPM, and/or others) | | | | | X |

TABLE 4-continued example ITS message detection issues

| Group | Detail | 1 | 2 | 3 | 4 | 5 |
|---|---|---|---|---|---|---|
| Heading | Change of heading inconsistent with speed | | X | | | |
| | Change of heading inconsistent with yaw rate | | X | | | |
| | Heading inconsistent with road heading | | | X | | |
| | Heading inconsistent with relative heading | | | | X | |
| | Heading inconsistent with fused collective perception and contextual info (e.g., from sensor, CAM, CPM, and/or others) | | | | | X |
| Speed | Speed value too high (e.g., inconsistent with vehicle type) | X | | | | |
| | Change of speed inconsistent with acceleration | | X | | | |
| | Speed inconsistent with road plausible speed | | | X | | |
| | Speed inconsistent with relative speed (e.g., Doppler) | | | | X | |
| | Speed inconsistent with fused collective perception and contextual info (e.g., from sensor, CAM, CPM, and/or others) | | | | | X |
| Drive direction | Drive direction inconsistent with speed (e.g., driving backwards too fast) | X | | | | |
| | Drive direction inconsistent with position change and heading change | | X | | | |
| | Drive direction inconsistent with road way | | | X | | |
| | Drive direction inconsistent with perceived direction | | | | X | |
| | Driving direction inconsistent with fused collective perception and contextual info (e.g., from sensor, CAM, CPM, and/or others) | | | | | X |
| Vehicle length/width | Length/width change | | X | | | |
| | Vehicle length/width inconsistent with perceived dimensions | | | | X | |
| | Vehicle length/width inconsistent with fused collective perception and contextual info (e.g., from sensor, CAM, CPM, and/or others) | | | | | X |
| Longitudinal acceleration | Acceleration value too high (inconsistent with vehicle type) | X | | | | |
| | Change of acceleration too large (inconsistent with vehicle type) | | X | | | |
| | Acceleration inconsistent with relative acceleration | | | | X | |
| | Acceleration inconsistent with fused collective perception and contextual info (e.g., from sensor, CAM, CPM, and/or others) | | | | | X |
| Curvature | Curve radius too small (e.g., inconsistent with vehicle type) | X | | | | |
| | Change of curvature inconsistent with speed | | X | | | |
| | Change of curvature inconsistent with heading change | | X | | | |
| | Change of curvature inconsistent with yaw rate | | X | | | |
| | Change of curvature inconsistent with road shape | | | X | | |
| | Change of curvature inconsistent with relative curvature | | | | X | |
| Yaw rate | Yaw rate value too high or too low | X | | | | |
| | Change of yaw rate inconsistent with speed | | X | | | |
| | Change of yaw rate inconsistent with curvature | | X | | | |
| | Yaw rate inconsistent with perceived yaw rate | | | | X | |
| | Yaw rate inconsistent with fused collective perception and contextual info (e.g., from sensor, CAM, CPM, and/or others) | | | | | X |

TABLE 5 example ITS message detection issues

| Group | Detail |
|---|---|
| Originating Vehicle container | Inconsistency detected in Originating Vehicle container |
| Originating RSU container | Inconsistency detected in Originating RSU container |
| Sensor Info container | Inconsistency detected in Sensor Info container |
| Perceived Object Container | Inconsistency detected in Perceived Object Container |
| Free Space Addendum Container | Inconsistency detected in Free Space Addendum Container |

TABLE 6

ITS message detection evidence

| Level | Message | Evidence |
|---|---|---|
| Level 1 | The message that triggers the observation | inconsistencies and/or implausible values within the first message, with or without full security information |
| Level 2 | Two or more messages from the same station that triggers the observation | inconsistencies and/or implausible values within the additional message(s), with or without full security information. |
| Level 3 | One or more messages from different stations that trigger the observation | Level 2 evidence with full security information for each additional message, if applicable; reference to local knowledge of the environment and/or digital maps may or may not be provided as evidence. |
| Level 4 | One or more messages from same or different stations and/or same or different message types that trigger the observation | Level 3 evidence + relevant information from local/onboard sensors, radiofrequency (RF) devices, and/or the like |
| Level 5 | Two or more messages from different stations and/or of different message type, that trigger the observation | Level 4 + fused collective perception and/or other contextual info available at the ego ITS-S |

1.4.2. ITS-AID-Specific Report

The MR has the objective of reporting data received from a specific ITS-S. The MR is dedicated to a single ITS app, identified by its ITS-AID value. The ITS-AID value acts as a parameter, determining the set of individual detectors that may be contained as observations in the MR. There is no maximum number of observations that may be reported in a single MR.

In some implementations, the report contains the following elements: the ITS-AID value; a list of the observations of the individual detectors (the set of individual detectors that may be included in the report is selected by the ITS-AID); a list of the received messages involved in the observations (the specification of the individual detectors involved indicate the set of mandatory messages); and/or a list of evidence, besides the received messages, involved in the observations (the specification of the individual detectors involved indicate the set of mandatory evidence). The format of the MR is specified previously and/or in clause 7 of [TS103759].

1.4.3. Reporting of Observations of Individual Detectors

The local MDS 301 (see e.g., clause 4.2.2 of [TS103759]) detects misbehavior by inspection of incoming messages. The MR includes observations of the individual detectors 303a, 303b (e.g., "evidence" of misbehavior per individual detector 303a, 303b). In some implementations, observations from individual detectors 303a, 303b on incoming message(s) are classified as shown by Table 7. Table 8 summarizes guidelines for establishing the specification of the individual detectors 303a, 303b, including the elements to be included in an MR.

TABLE 7

Classification of individual detectors for local MDS

| Class 1 | Class 2 | Class 3 | Class 4 | Class 5 |
|---|---|---|---|---|
| Implausible values within the incoming message. | Inconsistencies of the incoming message with previous messages of the same type emitted from the same station. | Inconsistencies of the incoming message with the knowledge of the local environment of the ego vehicle (e.g., LDM). | Inconsistencies of the incoming message with the on-board sensors' perception. | Inconsistencies of the incoming message with previous messages of other types from the same station or with messages (of the same type or not) emitted by other stations. |

TABLE 8 elements in the MR by individual detector class

| | Class 1 | Class 2 | Class 3 | Class 4 | Class 5 |
|---|---|---|---|---|---|
| ITS-AID | The ITS-AID of the mandatory message. | The ITS-AID of the mandatory messages. | The ITS-AID of the mandatory message. | The ITS-AID of the mandatory message. | The ITS-AID of the most recent mandatory message. |
| Message | The single message that triggers the observation. | Two or more messages of the same type, emitted by the same station, that trigger the observation. | The single message that triggers the observation. | The single message that triggers the observation. | Two or more messages from different stations and/or of different type, that trigger the observation. |

TABLE 8-continued elements in the MR by individual detector class

| | Class 1 | Class 2 | Class 3 | Class 4 | Class 5 |
|---|---|---|---|---|---|
| Evidence | One of: None; level 1 evidence in Table 6; or class 1 in Table 7. | One of: None; level 2 evidence in Table 6; or class 2 in Table 7. | Reference to the local knowledge of the environment may be required. | Reference to the onboard sensors' readings may be required. | One of: None; level 5 evidence in Table 6; or class 5 in Table 7. |

Security-level individual detectors 303a, 303b are considered to belong to class 1. For class 1 individual detectors, the MR includes the message upon which the observation has been made. In general, class 1 individual detectors do not require any mandatory evidence besides the triggering message. For class 2 individual detectors, the MR includes at least two messages of the same type emitted by the same station, upon which the observation has been made. In general, Class 2 individual detectors do not require any mandatory evidence besides the triggering messages. For class 3 individual detectors, the MR includes the message upon which the observation has been made. Class 3 individual detectors may require a reference to the local knowledge of the environment on which the observation is based. For class 4 individual detectors, the MR includes the message upon which the observation has been made. Class 4 individual detectors may require a reference to the on-board sensors' readings on which the observation is based. For class 5 individual detectors, the MR includes at least two messages of different type or two messages of the same type emitted by different stations, upon which the observation has been made. In general, Class 5 individual detectors do not require any mandatory evidence besides the triggering messages.

A single MR may contain several observations of individual detectors. The following rules apply in order to be able to produce a single MR containing multiple observations. The ITS-AID indicated in the report is the ITS-AID of the most recent mandatory message included in the MR report. Individual detectors that cannot be linked to a specific app shall be reported using a special ITS-AID value, which indicates "unknown ITS app". All the observations that are triggered by the same set of mandatory messages may be included in the same MR. For example, any number of observations of Class 1, Class 3 and Class 4 individual detectors on the same message may be included in the same MR. Any number of observations of Class 2 individual detectors on the same pair of consecutive messages may be included in the same MR. The observations that are triggered by a set of multiple mandatory messages and the observations that are triggered by the mandatory message dictating the indication of the ITS-AID (i.e., the most recent mandatory message) may be included in the same MR. For example, an observation of a Class 1 individual detector on a message may be included along with an observation of a Class 5 individual detector triggered by the same message along with an older one.

Examples of individual detectors for CAM and DENM messages are presented in Annex D of [TS103759]. Examples illustrating the generation of the MR from the observations of individual detectors belonging to one or to multiple classes are provided in clause 7.5 of [TS103759].

1.5. Example Misbehavior Report Message Format and Structure 1.5.1. First Example MR Message Format The MR message reports to the MA information about suspicious observed issues that indicate a (potentially intended) misbehavior or an (accidental) malfunctioning of a specific ITS-S. As both, misbehavior and malfunctioning are considered, the ASN.1 type name of the MR message is misbehavior malfunctioning report (Mbmr).

The MR message Mbmr is dedicated to a single type of a ITS message received from a specific ITS-S, for example, an ITS app that is identified by an ITS-Application ID (AID) value. This allows for a unique treatment of app-specific issues and app-agnostic issues.

The MR message is specified in ASN.1 with type and value definitions presented in the following ASN.1 modules:

Its-MbmReport {itu-t (0) identified-organization (4) etsi (0) itsDomain (5) wg1 (1) ts (103759) mbmr (1) version1 (1)};

Its-Mbmr-Misc {itu-t (0) identified-organization (4) etsi (0) itsDomain (5) wg1 (1) ts (103759) mbmrMisc (2) version1 (1)}

Its-MbmrReporter {itu-t (0) identified-organization (4) etsi (0) itsDomain (5) wg1 (1) ts (103759) mbmrReporter (3) version1 (1)}

Its-MbmrAppAgnostic {itu-t (0) identified-organization (4) etsi (0) itsDomain (5) wg1 (1) ts (103759) mbmrAppAgnostic (4) version1 (1)}

Its-MbmrCam {itu-t (0) identified-organization (4) etsi (0) itsDomain (5) wg1 (1) ts (103759) mbmrCam (5) version1 (1)}

Its-MbrDenm {itu-t (0) identified-organization (4) etsi (0) itsDomain (5) wg1 (1) ts (103759) mbmrDenm (6) version1 (1)}

Its-MbrCpm {itu-t (0) identified-organization (4) etsi (0) itsDomain (5) wg1 (1) ts (103759) mbmrCpm (6) version1 (1)} and other general purpose modules, as written in the respective IMPORT clauses of the above listed modules.

These ASN.1 modules used to build a MR message of ASN.1 type Mbmr is as specified in Annex A of [TS103759]. As for all SM-PDUs specified in ETSI TS 102 941 v1.4.1 (2021-01) ("[TS102941]"), ASN.1 data structures shown and described herein using Abstract Syntax Notation 1 (ASN.1) (see e.g., ISO/IEC 8824-1), are encoded using the Canonical Octet Encoding Rules (COER) as defined in Recommendation ITU-T X.696. To get a future-proof set of ASN.1 definitions, the concept of Information Object Classes (IOC) and respective Information Object Sets (IOS) is applied.

1.5.2. Second Example MR Message Format

Figure 9:
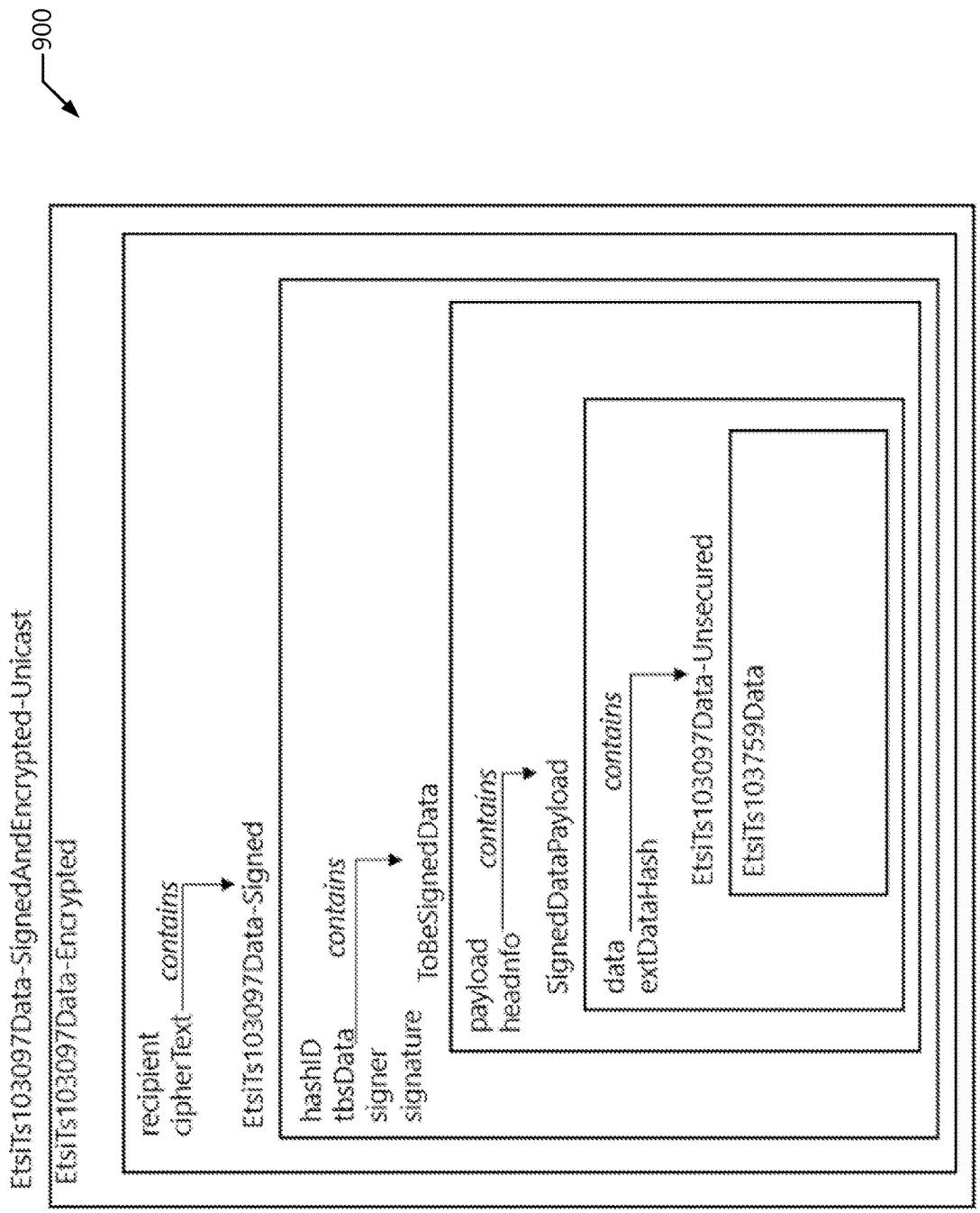

FIG. 9 shows an example misbehavior report format 900. As discussed in more detail infra, the MRS is part of the ITS-S security entity (e.g., security defense sublayer 1363 in FIG. 13) and the MR message flow is shown in the PKI architecture (see e.g., FIGS. 11a and 11b, clause 7.0 in

[TS102940]). The security management message (SM_PDU) for the MR is can follow the message format 900 shown in the FIG. 9.

The outermost data structure EtsiTs103097Data-SignedAndEncrypted-Unicast encapsulates an EtsiTs103759Data structure. Details of the various containers and enclosed data structures are given in clause 7.3 of [TS103759]. To create the MR, the reporting ITS-S follows this process:

(1) An EtsiTs103759Data structure is built, according to clause 7.3 of [TS103759].

(2) An EtsiTs103097Data-Signed structure is built containing: hashId, tbsData, signer and signature: the hashId indicates the hash algorithm to be used as specified in ETSI TS 103 097 v1.4.1 (2020-10) ("[TS103097]"), the contents of which are incorporated by reference in its entirety; in the tbsData: the payload contains the previous EtsiTs103759Data structure; and in the headerInfo: the psid is set to the value of "Misbehavior Reporting Service" as assigned in ETSI TS 102 965 v2.1.1 (2021-11), the contents of which are incorporated by reference in its entirety; the generationTime shall be present and contains the time when the PDU signature was generated; and all other components of the component tbsdata.headerInfo are not used and absent; the signer shall be declared as "digest", containing the HashedId8 of the Authorization Ticket (AT) of the ITS-S reporter; and the signature over the tbsData computed using the private key corresponding to the AT's verification public key of the ITS-S reporter. For the signature to be valid the signing certificate shall conform to the Authorization Ticket profile given in clause 7.2.1 of [TS103097], where the appPermissions field in the AT allows signing misbehavior reports. The app permissions for the reporting ITS-S follows the requirements of clause 8.1 of [TS103759]. In some implementations, the signature in the EtsiTs103097Data-Signed structure is computed using the current valid private key corresponding to the AT's verification public key of the ITS-S reporter. In some implementations, the ToBeSignedData structure is built where the data structures below the ToBeSignedData in FIG. 9 are defined in *IEEE Standard for Wireless Access in Vehicular Environments—Security Services for Applications and Management Messages*, IEEE Std 1609.2-2016, pp. 1-240 (1 Mar. 2016).

An EtsiTs103097Data-Encrypted structure is built, with the component recipients containing one instance of RecipientInfo of choice certRecipInfo, containing: the hashedId8 of the MA certificate in recipientId; and the encrypted data encryption key in encKey; the public key to use for encryption is the encryptionKey found in the MA certificate referenced in recipientId; and the component ciphertext containing the encrypted representation of the EtsiTs103097Data-Signed structure. In some implementations, the EtsiTs103097Data-Encrypted structure is encrypted with ECIES using the public encryption key of the MA.

An EtsiTs103759Data-SignedAndEncrypted-Unicast structure is built. This structure is the SPDU defined in [TS103097] used to send a signed and encrypted EtsiTs103759Data to the MA and shall contain the previous EtsiTs103097Data-Encrypt e d structure.

Figure 10:
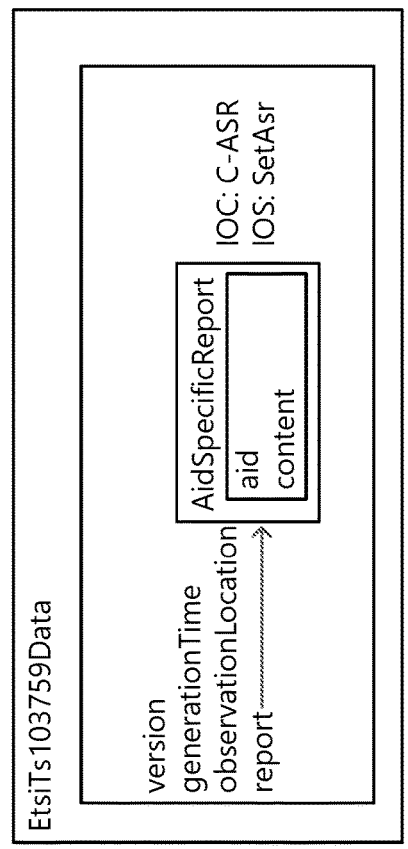
FIGS. 9 and 10 depict examples misbehavior report message formats and/or structures.

FIG. 10 shows an example misbehavior reporting message 1000, which includes an EtsiTs103759Data structure. The misbehavior reporting message 1000 is specified in Abstract Syntax Notation 1 (ASN.1). The EtsiTs103759 ASN.1 module is identified by the Object Identifier {itu-t(0) identified-organization(4) etsi(0) itsDomain(5) wg5(5) ts(103759) general(1) core(1) major-version-1(1) minor-version-1 (1)}. An associated SHA-256 cryptographic hash digest of the EtsiTs103759 ASN.1 module can be used as a means to verify the integrity of the EtsiTs103759 ASN.1 module. The EtsiTs103759 ASN.1 module has type and value definitions presented in the following ASN.1 modules:

EtsiTs103759 {itu-t(0) identified-organization(4) etsi(0) itsDomain(5) wg5(5) ts(103759) general(1) core(1) major-version-1(1) minor-version-1 (1)}—top-Class definitions.

EtsiTs103759MbrCommonObservations {itu-t(0) identified-organization(4) etsi(0) itsDomain(5) wg5(5) ts(103759) general(1) common-observations(2) major-version-1(1) minor-version-1(1)}—definitions of observations that are available to be imported into AID-specific misbehavior reports.

EtsiTs103759AsrCam {itu-t(0) identified-organization(4) etsi(0) itsDomain(5) wg5(5) ts(103759) aid-specific(2) cam (36) major-version-1(1) minor-version-1(1)}—definitions of misbehavior reports relevant to CAMs.

EtsiTs103759AsrDenm {itu-t(0) identified-organization (4) etsi(0) itsDomain(5) wg5(5) ts(103759) aid-specific(2) denm(37) major-version-1(1) minor-version-1(1)}—definitions of misbehavior reports relevant to DENMs.

EtsiTs103759AsrCpm {itu-t(0) identified-organization(4) etsi(0) itsDomain(5) wg5(5) ts(103759) aid-specific(2) cpm (38) major-version-1(1) minor-version-1(1)}—definitions of misbehavior reports relevant to CPMs.

EtsiTs103759AsrAppAgnostic {itu-t(0) identified-organization(4) etsi(0) itsDomain(5) wg5(5) ts(103759) aid-specific(2) appAgnostic(270549119) major-version-1(1) minor-version-1(1)}—definitions of reports for misbehavior that cannot be mapped to a specific misbehaving app.

The ASN.1 modules used to build a misbehavior reporting message 1000 of ASN.1 type EtsiTs103759Data is specified in Annex A of [TS103759]. As for all SM-PDU specified in [TS102941], ASN.1 data structures defined herein using ASN.1 (see e.g., ISO/IEC 8824-1) are encoded using the Canonical Octet Encoding Rules (COER) as defined in Recommendation ITU-T X.696. To get a future-proof set of ASN.1 definitions, the concept of Information Object Classes (IOC) and respective Information Object Sets (IOS) is applied. Additionally, the misbehavior reporting message structure 1000 uses the IOC C-ASR with the IOS SetAsr to identify the source of observations a specific observed message such as a CAM (see e.g., [EN302637-2]), DENM (see e.g., ETSI EN 302 637-3 v1.2.1 (2014-09)), CPM, and/or the like). Other aspects of the ASN.1 modules used to build a misbehavior reporting message 1000 are discussed in [TS103759]. In other implementations, other formats such as XML, JSON, and/or the like can be used to represent the misbehavior reporting message 1000.

1.6. Collective Perception Message (CPM) Format and Structure

The CPS is a facility layer entity that operates the CPM protocol, which provides two services: sending and receiving of CPMs (e.g., CPM 1100*a* and/or 1100*b* in FIG. 11). The CPS uses the services provided by the protocol entities of the ITS networking & transport layer to disseminate the CPM 1100*a*, 1100*b*.

The sending of CPMs 1100*a*, 1100*b* comprises the generation and transmission of CPMs 1100*a*, 1100*b*. In the course of CPM generation, the originating ITS-S composes the CPM, which is then delivered to the ITS networking & transport layer for dissemination. The dissemination of CPMs 1100*a*, 1100*b* may vary depending on the applied communication system. CPMs 1100*a*, 1100*b* are sent by the originating ITS-S to all ITS-Ss within the direct communication range. This range may, inter alia, be influenced in the originating ITS-S by changing the transmit power depending on the relevance area. CPMs 1100*a*, 1100*b* are generated periodically with a rate controlled by the CP service in the originating ITS-S. The generation frequency is determined by taking into account the dynamic behavior of the detected object status, e.g., change of position, speed or direction, sending of CPMs 1100*a*, 1100*b* for the same (perceived) object by another ITS-S, as well as the radio channel load. Upon receiving a CPM, the CP service makes the content of the CPM available to the ITS apps and/or to facilities within the receiving ITS-S, such as an LDM (see e.g., [TR102863] and/or [TS302895]).

FIG. 11 illustrates the structure of a CPM 1100*a* and 1100*b*, which enable ITS-Ss to share sensor information, perceived object lists, free space addenda, and layered costmaps. A CPM 1100*a*, 1100*b* comprises a common ITS PDU header and multiple containers, which together constitute a CPM 1100*a*, 1100*b*. Each container comprises a sequence of optional or mandatory data elements (DEs) and/or data frames (DFs). The DEs and DFs included in the CPM format are based on the ETSI Common Data Dictionary (CDD) (see e.g., ETSI TS 102 894-2 V1.3.1 (2018-08) ("[TS102894-2]")) and/or makes use of certain elements defined in "Intelligent transport systems—Cooperative ITS—Using V2I and I2V communications for apps related to signalized intersections", International Organization for Standardization (ISO) Technical Committee (TC) 204, Ed. 2 (2019-06) ("[CEN-ISO/TS19091]"). Some or all DEs and DFs are defined in Annex A of [TS103324].

Regardless of which type of ITS-S disseminates a CPM, the Management Container provides information regarding the ITS-S Type and the Reference Position of the ITS-S. CPMs 1100*a*, 1100*b* can be disseminated either by a moving ITS-S, such as a V-ITS-S 1210, or by a stationary ITS-S, such as an R-ITS-S 1230. Support for other types of ITS-Ss can be added later using an ASN.1 extensibility feature. To allow for simplified future extensibility of the CPM, ASN.1 Information Object Classes are employed for the Station Data and Perception Data Container.

In case of a CPM 1100*a*, 1100*b* generated by a V-ITS-S, the Station Data Container of Type CpmStationDataContainer containing the information object OriginatingVehicleITSSContainer is present and contain the dynamic information of the originating ITS-S.

In case of a CPM 1100*a*, 1100*b* generated by a R-ITS-S, the Originating Roadside ITS-S Container of Type CpmStationDataContainer containing the information object OriginatingRoadsideITSSContainer may be present. If present, it provides references to identification numbers provided by the MAP Message (see e.g., [CEN-ISO/TS19091]) disseminated be the same roadside ITS-S.

The Sensor Information Container of type CpmPerceptionDataContainer containing the information object SensorInformationContainer may be present to provide information about the sensory capabilities that are available to an ITS sub-system. Depending on the ITS-S type of the originating ITS-S, different container specifications are available to encode the properties of a sensor. The Sensor Information Containers are attached at a lower frequency than the other containers, as defined in clause 6.1.3.3 in [TS103324].

A Perceived Object Container of type CpmPerceptionDataContainer containing the information object PerceivedObjectContainer may be present for objects that have been perceived by an ITS sub-system. It provides information about the detected object with respect to the disseminating ITS-S. Classifications and positions matched to road data can also be provided. This container is only added for objects that have been detected according to the inclusion rules defined in Clause 6.1.3.1 in [TS103324].

The Free Space Addendum Container of type CpmPerceptionDataContainer containing the information object FreeSpaceAddendumContainer may be present to describe changes to a computed free space description.

1.6.1. ITS PDU Header

CPMs 1100*a*, 1100*b* include an ITS PDU header. The ITS PDU header is a common header that includes the information of the protocol version, the message type, and the ITS-S identifier (ID) of the originating ITS-S. The ITS PDU header is included as specified in [TS102894-2]. Detailed data presentation rules of the ITS PDU header in the context of a CPM 1100*a*, 1100*b* is as specified in Annex A of [TS103324].

1.6.2. CPM Management Container

The management container provides basic information about the originating ITS-S, regardless of whether it is a V-ITS-S 1210 or R-ITS-S 1230. The container includes the ITS-S type, reference position, and/or other information about the current message segment as part of the messageSegmentInfo. Message segmentation is managed according to clause 6.1.4 in [TS103324]. The reference position is used for referencing objects relative to a provided global position. The reference point to be provided is detailed in [EN302890-2]. For V-ITS-Ss 1210, the reference point refers to the ground position of the center of the front side of the bounding box of the V-ITS-Ss 1210. For R-ITS-Ss 1230, the reference point refers to an arbitrary position on a road segment or intersection. This point is used to determine the offset to other data points.

1.6.3. CPM Station Data Container 1.6.3.1. Originating V-ITS-S Container

The originating V-ITS-S container comprises information about the dynamics of the vehicle ITS sub-system disseminating the CPM 1100*a*, 1100*b*, and is included in every CPM 1100*a*, 1100*b* transmitted by a V-ITS-S. Such information is required to transform objects described in the Perceived Object Container of the same CPM 1100*a*, 1100*b* into a target reference frame, such as a vehicle centered coordinate system. The originating V-ITS-S container is encoded as specified in Annex A of [TS103324]. More specifically, the following rules apply:

The Vehicle Orientation Angle provides means to transmit the actual orientation of the vehicle opposed to the vehicle heading which references the orientation of the provided velocity vector magnitude only. The container also provides means to include a description for trailers attached to a towing vehicle (e.g., for trucks). Different layouts for attached trailers are possible. Providing the TrailerData is required to transform objects detected by a sensor mounted to a trailer into a receiving ITS-S's reference frame. Every trailer added to the description of a vehicle includes a TrailerData container which can be added up to two times. Each TrailerData provides a new reference point ID, incrementing from 1. The reference point ID 0 always refers to the reference point of the towing vehicle. An offset to a hitch point in the longitudinal direction from the towing vehicle's reference point is provided. The trailer's dimensions are provided by defining the trailer's front and rear overhang with respect to the trailer's hitch point, as depicted. The width of the trailer may be provided optionally. The hitch angle is also optionally available. More configurations for providing reference points for ITS-S can be found in [EN302890-2].

1.6.3.2. Originating Roadside its-S Container

In case a CPM 1100*a*, 1100*b* is generated by an R-ITS-S 1230, the Originating Roadside ITS-S Container of Type CpmStationDataContainer containing the information object OriginatingRoadsideITSSContainer may be present. If present, it provides references to identification numbers provided by the MAP Message (see e.g., [CEN-ISO/TS19091]) disseminated be the same R-ITS-S 1230. The Originating Roadside ITS-S Container includes two parameters to reference information received by the MAP message (see e.g., [CEN-ISO/TS19091]) disseminated by the same roadside ITS-S. Either, the IntersectionReferenceID or the RoadSegmentID can be used to refer to the road infrastructure provided by the road lane topology service. In case the OriginatingRoadsideITSSContainer is included, the R-ITS-S 1230 also transmits a MAP message. In case of R-ITS-S 1230 disseminating the CPM 1100*a*, 1100*b*, the reference position refers to the reference position as defined in [CEN-ISO/TS19091] (e.g., an arbitrary point on the intersection).

1.6.4. Sensor Information Container

The sensor information container lists information about individual sensor(s) attached to an ITS sub-system. The Sensor Information Container is of type CpmPerceptionDataContainer containing the information object sensorInformationCpmContainer. The Sensor Information Container is encoded as specified in Annex A of [TS103324]. More specifically the following rules apply:

This container type offers the possibility to provide descriptive information about the sensory properties that are available in an ITS sub-system. Every described sensor is assigned an ID, which is in turn utilized in the Perceived Object Container to relate measured object information to a particular sensor. Additionally, each provided sensor information DF is accompanied by a sensor categorization to indicate the type of the perception system. This can be a specific sensor type such as a radar or LIDAR sensor up to a system providing fused object information from multiple sensors. As different sensor types may be attached to an ITS-S (e.g., radar, LIDAR, combined sensor fusion system, and/or the like). This container provides different possibilities for describing the properties of a sensor-system.

Two types of descriptions are differentiated: sensors that are mounted on vehicles are described using the vehicleSensor description DF. Stationary sensors (e.g., sensors mounted on a roadside infrastructure or the like) are described using a stationarySensor variant DF. The perception area of a perception system can be inferred on the receiving ITS-S by the data provided in the SensorInformationContainer.

Either variant can be used to describe the sensory capabilities of the disseminating ITS-S. This can be the actual parameters of a perception-system, e.g., its actual perception range, or the applicable perception area of the perception system, e.g., the area in which objects will be detected by the perception system.

A vehicleSensor type description provides information about sensors mounted to vehicles. The properties of these perception systems are defined by providing the mounting position of a sensor with respect to a specific reference point on the vehicle. The range and horizontal as well as optional vertical opening angles are provided to describe the sensor's frustum. In case a sensor has multiple detection areas, up to ten perception areas for a sensor can be encoded. The provided offset from a reference point on the vehicle serves as the origin of a sensor-specific local Cartesian coordinate system.

In case of a perception system mounted to a roadside infrastructure, the stationarySensorRadial DF provides a similar concept to describe the roadside system's perception capabilities. The position provided by the offset from a reference point serves as the origin of a sensor-specific local Cartesian coordinate system. Being provided with the sensor position and the opening angles, the receivers of the CPM 1100*a*, 1100*b* can determine the sensor measurement area by projecting the area defined by the opening angles on the ground.

For stationary sensors, alternative DFs for describing the perception system's perceived area are provided in case the origin of a sensor system should or cannot be revealed. This is particularly useful if the perception area is generated by combining several separate systems which however act as one sensor. A geographical representation of a system's perception area can be expressed in terms of a circular, rectangular, ellipsoidal or a polygon area. Due to their geographical reference of the reference point, these types are applicable to stationary sensors only.

The optional FreeSpaceConfidence DE may be used to provide information that a particular sensor is able to provide confirmed measurements about detected free space. The indication states an isotropic confidence level that is assumed for the entire detection area. FreeSpaceConfidence is used to indicate the corresponding confidence as specified herein and/or in [TS103324].

In combination with received objects, a receiver may employ the free space confidence indication to compute the resulting free space by applying a simple ray-tracing algorithm. The perception area may be assumed to be free with an isotropic FreeSpaceConfidence (blue area), generated by the DetectionArea DF. Not all objects known to a transmitter will be reported in every CPM. The receiver should ensure that suitable tracking and prediction mechanisms for previously transmitted objects are employed to update the shadowed area accordingly.

The received geometric extension of a PerceivedObject may be used to compute the resulting shadowed area for each object. For this purpose, a simple ray-tracing approach may be utilized. A ray thereby connects from the origin of a particular sensor to the outermost corner-points of the received object geometry and extends to the perception range of a particular sensor. The area behind the object from the perspective of the sensor mounting point is considered as shadowed. No indication about the free space confidence can be given behind a shadowing object. A description in three dimensions may be applied. In case an object is detected by a sensor with a certain height above ground (e.g., a signage gantry), the same ray-tracing approach is employed for a three-dimensional representation.

In case the shadowing model does not apply, the shadowingApplies DE of the SensorInformation is set to False to indicate that no shadowing model can be computed on the receiving side for this sensor.

1.6.5. Perceived Object Container

A Perceived Object Container is added to the CPM 1100*a*, 1100*b* for each detected object as defined in clause 6.1.3.2 in [TS103324]. The Perceived Object Container is of type CpmPerceptionDataContainer containing the information object PerceivedObjectContainer. One key goal of the CPM 1100*a*, 1100*b* is to share information about perceived objects. For that purpose, the kinematic attitude state along with additional information on an object is provided through the Perceived Object Container.

The total number of perceived objects is provided in the variable numberOfPerceivedObjects in the PerceivedObjectContainer. Due to the message generation rule as specified in clause 6.1.3 in [TS103324] and the associated object inclusion scheme, the number of included objects does not have to equal the numberOfPerceivedObjects of the received CPM.

A receiving ITS-S does not assume that the received PerceivedObjects in the perceived object container represents all objects known to the Tx. An Rx has to listen for further CPMs 1100*a*, 1100*b* from the same transmitter for at least one second until all objects have been received. The container enables a detailed description of the dynamic state and properties of a detected object. The information regarding the location and dynamic state of the perceived object is provided in a coordinate system (see e.g., FIG. 5 in [TS103324]). Such a coordinate system is used for the description of the object's state variables in case of a vehicle sharing information about a detected object. In case of R-ITS-S disseminating the CPM 1100*a*, 1100*b*, the reference position refers to the reference position as defined in [CEN-ISO/TS19091] (e.g., an arbitrary point on the intersection (see e.g., FIG. 8 in [TS103324]).

1.6.5.1. Kinematic State and Attitude Description

Figure 14:
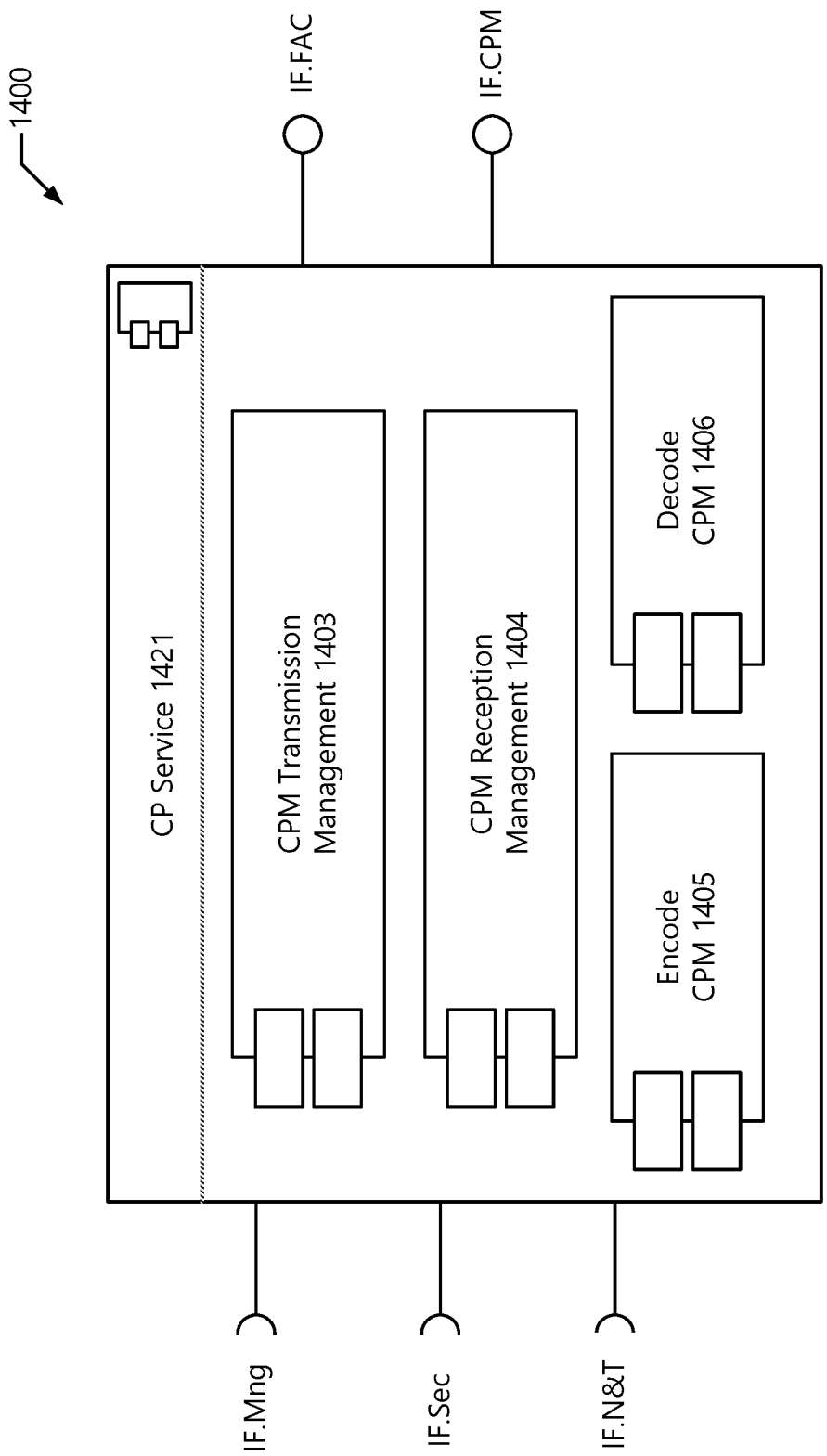
FIG. 14 depicts a collective perception basic service functional model.

Every object is described by at least providing the distance and speed in the x/y plane of the respective coordinate system with respect to an ITS-S's reference point (see e.g., FIG. 14 in [TS103324] for the case of a V-ITS-S). The reference point of a measurement is also provided as part of the message. The full kinematic attitude state of an object is represented in an 18-dimensional kinematic state and attitude space. The corresponding state vector is represented as: $state_{Obj}=(d_x, d_y, d_z, v_x, v_y, v_z, a_x, a_y, a_z, \theta_{roll}, \theta_{pitch}, \theta_{yaw}, \omega_{roll}, \omega_{pitch}, \omega_{yaw})^T$ where $d_i$, $v_i$, $a_i$ represents the distance, speed, and acceleration; and $\theta_i$, $\omega_i$, $\alpha_i$, correspondingly representing angle, angular speed and acceleration. Annex D in [TS103324] provides an example for how to interpret a received kinematic state and attitude description.

1.6.5.2. Object Id and Time Management

The Perceived Object Container is encoded as specified in Annex A in [TS103324]. More specifically, the following rules apply:

An objectID is assigned to each detected object. This ID is taken from a range of monotonously increasing numbers and is maintained per object, as long as an object is perceived and new sensor measurements are assigned to the object. The range of allowed objectIDs is between 0 and 255. As soon as objectID 255 has been assigned to an object, the next object is assigned the next free ID, starting from ID 0 in a round-robin fashion.

A time of measurement is provided for each object as the time difference for the provided measurement information with respect to the generation delta time stated in the CollectivePerceptionMessage DF. [TS103324] provides an interpretation for the time of measurement which is always relative to the GenerationDeltaTime encoded in the message and the time which corresponds to when the state space information about a detected object is made available. The GenerationDeltaTime always corresponds to the latest point in time when the latest reference position is available on the transmitting side. Upon receiving the message, the receiver computes its own local GenerationDeltaTime based on its current absolute timestamp. The difference between the encoded GenerationDeltaTime in the received CPM 1100*a*, 1100*b* and the local GenerationDeltaTime represents the age of the CPM. The received encoded Time of Measurement then needs to be added to the age of the CPM 1100*a*, 1100*b* to compute the age of the encoded object. Positive Time of Measurements thereby indicate that the Time of Measurement needs to be added to the message age on the receiver side, as the state space of the object has been created before the transmitter's GenerationDeltaTime and is therefore older. Negative time values indicate that the time of measurement needs to be subtracted from the age of the CPM 1100*a*, 1100*b* as the state space of the described object has been determined after the transmitter's GenerationDeltaTime has been created. The Time of Measurement includes any processing time of a sensor or data fusion system. In case the fused object state information is transmitted, the time of measurement references the point in time to which the state space has been predicted.

The age of the detected object is provided for each object. The objectAge reflects the time how long the object is already known to the sender's system at the time of message generation.

1.6.5.3. Representation of Object Accuracy

For every component provided in the kinematic state and attitude space of an object in the CPM, in accordance to clause 7.6.1 of [TS103324], the corresponding standard deviation of the Probability Density Function (PDF) is provided to a pre-defined confidence level (e.g., 95%).

In addition, correlation information may be provided for each component. If correlation information is provided, the number of correlation entries corresponds to the size of the kinematic state and attitude space, e.g., given a state space vector of length n, the corresponding correlation matrix has to be of size n×n. Correlation is represented in a vectorised form for each column of the corresponding lower-triangular positive semidefinite correlation matrix ordered in the same fashion as the provided kinematic attitude state components stated in clause 7.6.1 in [TS103324].

The correlation is mathematically symmetric (e.g., corr (x,y)=corr(y,x)) for any two given random variables. Therefore, every component of the kinematic attitude state only provides the correlation information with the remaining, subsequent components.

1.6.5.4. Representation of Object Confidence

A one-value indication about the overall information quality on a perceived object may be provided in the DE objectConfidence. The object characteristics contributing to the object confidence are: object age, sensor or system specific detection confidence, and detection success.

The objectAge is provided in the CPM, whereas the detection confidence and the detection success indication are system specific assessments of the ITS sub-system's object detection system. A detection success describes the assessment whether a given measurement has successfully perceived the object (binary assessment).

If provided, the objectConfidence at a discrete time instant t, is determined according to the following process:
1) Compute the exponential moving average for the system specific confidence c with factor $\alpha$, $0 \leq \alpha \leq 1$,
   a. If t==0: $EMA_0 = c_0$
   b. If t>0: $EMA_t = \alpha * D_t + (1-\alpha) * EMA_{t-1}$
2) Compute the rating $r_c = floor(EMA_t * 15)$
3) Repeat steps 1) and 2) for the detection success d to obtain rating $r_d$
4) Compute the object age rating $r_{oa} = \min\{\lfloor OA/100 \rfloor, 15\}$ $$objectConfidence = floor\left(\frac{w_d * r_d + w_c * r_c + w_{oa} * r_{oa}}{w_d + w_c + w_{oa}}\right)$$

with weights $w_d$, $w_c$ and $w_{oa}$

The specification of factor $\alpha$ and weights $w_d$, $w_c$ and $w_{oa}$ is provided elsewhere.

1.6.6. Free Space Addendum Container

The Free Space Addendum Container may be attached to express different confidence levels for certain areas within the DetectionArea of a particular sensor. The Free Space Addendum Container is of type CpmPerceptionDataContainer containing the information object FreeSpaceAddendumContainer.

The Free Space Addendum Container in the context of a CPM 1100a, 1100b is encoded as specified in Annex A in [TS103324]. More specifically the following rules apply:

This container is only added if the confidence indication needs to be altered with respect to the isotropic confidence level indication provided in the SensorInformationContainer. As such, the Free Space Addendum Container may be interpreted even if a received CPM 1100a, 1100b does not contain the SensorInformationContainer. This can be the case when a sensor cannot utilize its entire DetectionArea to reliably provide a free space indication, or in case the shadowing model detailed in Clause 7.5 in [TS103324] does not apply for a particular object (e.g., in case of a radar sensor measuring two vehicles driving behind each other).

Two possible apps of the free space addendum container: The isotropic free space confidence provided in the SensorInformationContainer of level 11 does not apply to the entire DetectionArea of the sensor. Instead, part of the computed shadowed area behind one of the object has a different free space confidence of level 12 (e.g., as a result of sensor fusion processes). This area is described by providing a FreeSpaceArea DF as part of the FreeSpaceAddendum container. Additionally, the sensor system is only able to provide a free space confidence indication for a confined area within its DetectionArea. A different confidence level $l_3$ applies to the depicted grey area, expressed as an additional FreeSpaceAddendum container.

The shadowingApplies DE of the FreeSpaceAddendum container is used to indicate if the simple tracing approach to compute the shadowed area behind objects also applies for the areas described in the FreeSpaceAddendum container. In case of a transmitter also providing its own dimensions, the area occupied by the transmitting ITS-S is also considered as occupied. Information about the geometric dimensions of a transmitting ITS-S may be provided in the CPM 1100a, 1100b or additional transmitted messages such as the CAM.

The order given by thefreeSpaceID of provided FreeSpaceAddendum containers for each sensor in one or several messages is thereby overwriting the confidence level indication of an overlapping FreeSpaceAddendum container of the same sensor in an ascending fashion. The confidence level indication $l_3$ with freeSpaceID 2 overlaps the confidence levels $l_1$ (from the SensorInformationContainer) and $l_2$ (from the first FreeSpaceAddendum container with freeSpaceID 1) represents the dominating confidence level indication within the prescribed area.

A FreeSpaceAddendumContainer may be located partially outside of the detectionArea. By providing a FreeSpaceAddendum container outside of the detectionArea, simpler shapes for the FreeSpaceArea may be leveraged to decrease the message size. ThefreeSpaceConfidence DE of the FreeSpaceAddendum container expresses the free space confidence that applies to the area provided in the freeSpaceArea DF. An optional list of sensorIds links to the corresponding sensorInformationContainer and may be provided to indicate which sensor provided the corresponding free space confidence indication.

FIG. 11 shows the existing general structure of CPM 1100a, 1100b which enables ITS-Ss to share perceived object list and free space addendum. A Perceived Object Container of type PerceptionData can be added for every object that has been perceived by an ITS-S (up to maximum of 128). It provides information about the detected object with respect to the disseminating station. The Free Space Addendum Container express different confidence levels as a free space confirmation for certain areas within the DetectionArea of a particular sensor. This container is added only if the confidence indication needs to be altered with respect to the isotropic confidence level indication provided in the SensorInformationContainer.

FIG. 11 also illustrates a layered costmap based CPM 1100b, which is also discussed in Int'l App. No. PCT/US2021/034031 filed on 25 May 2021 ("[PCTa]"), Int'l App. No. PCT/US2020/038723 filed on 19 Jun. 2020 ("[PCTb]"), the contents of each of which are hereby incorporated by reference in their entireties. In CPM 1100b (and discussed in [PCTa] and [PCTb]), a Layered Costmap Container (LayeredCostMapContainer) of type PerceptionData is added to the CPM 1100b to share overall dynamic environment perceived by the transmitter as a cost-based occupancy grid. The container LayeredCostMapContainer considers grid-based representation of the costmap where each cell will carry a cost (for example, indicating safe/caution/lethal to drive through the cell) or probability that specific types of obstacles/objects/Vulnerable Road Users (VRU) 12116, 12117 are present in the cell. Some or all vehicles 1210 (or V-ITS-S 12103) follow a global grid with the same size (or hierarchical grid sizes) of cell representation. In hierarchical cell size, cell sizes are integer multiples of each other.

Each vehicle 1210 (or V-ITS-S 12103) prepares a costmap for a rectangular area of specified dimensions in its FOV where the rectangular area is further divided into smaller rectangular cells (e.g., rectangular area is divided into n cells by m cells). This rectangular area is described by providing ReportedCostMapGridArea DF as part of the LayeredCostMapContainer.

Dimensions of each cell is described by GridCellSizeX and GridCellSizeY DEs. The center of the reported rectangular Grid Area is specified with respect to the reference position of the disseminating ITS-S. The cost of each cell is calculated by the disseminating ITS-S based on its local sensors, information shared by neighbors (such as perceived objects shared by neighbors through CPM) and static map available to the transmitter. The cost of each cell is specified along with confidence level. Disseminating ITS-S shares Aggregated Costmap Layer and may share one or more of the other layers depending on the bandwidth or access layer congestion information. Each Shared Costmap Layer type is specified by CostMapLayer Type DF.

2. Edge Computing and Communication Network Configurations and Arrangements

Edge computing refers to the implementation, coordination, and use of computing and resources at locations closer to the "edge" or collection of "edges" of a network. Deploying computing resources at the network's edge may reduce app and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, and the like) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, and the like) where respective partitionings may contain security and/or integrity protection capabilities. Edge nodes may also provide orchestration of multiple apps through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of app composition. The edge nodes are coordinated based on edge provisioning functions, while the operation of the various apps are coordinated with orchestration functions (e.g., VM or container engine, and the like). The orchestration functions may be used to deploy the isolated user-space instances, identifying and scheduling use of specific hardware, security related functions (e.g., key management, trust anchor management, and the like), and other tasks related to the provisioning and lifecycle of isolated user spaces.

Apps that have been adapted for edge computing include but are not limited to virtualization of traditional network functions including include, for example, SDN, NFV, distributed RAN units and/or RAN clouds, and the like. Additional example use cases for edge computing include computational offloading, CDN services (e.g., video on demand, content streaming, security surveillance, alarm system monitoring, building access, data/content caching, and the like), gaming services (e.g., AR/VR, and the like), accelerated browsing, IoT and industry apps (e.g., factory automation), media analytics, live streaming/transcoding, and V2X apps (e.g., driving assistance and/or autonomous driving apps).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include [MEC]; [O-RAN]; [ISEO]; [SA6Edge]; Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

FIG. 12 illustrates an overview of an environment 1200, which includes vehicles 1210A and 1210B (collectively "vehicle 1210"). Vehicles 1210 includes an engine, transmission, axles, wheels and so forth (not shown). The vehicles 1210 may be any type of motorized vehicles used for transportation of people or goods, each of which are equipped with an engine, transmission, axles, wheels, as well as control systems used for driving, parking, passenger comfort and/or safety, and/or the like. The terms "motor", "motorized", and/or the like as used herein refer to devices that convert one form of energy into mechanical energy, and include internal combustion engines (ICE), compression combustion engines (CCE), electric motors, and hybrids (e.g., including an ICE/CCE and electric motor(s)). The vehicles 1210 shown by FIG. 12 may represent motor vehicles of varying makes, models, trim, and/or the like. Additionally, the vehicles 1210 may correspond to the vehicles in the vehicular network 110 of FIG. 1.

For illustrative purposes, the following description is provided for deployment scenarios including vehicles 1210 in a 2D freeway/highway/roadway environment wherein the vehicles 1210 are automobiles. However, other types of vehicles are also applicable, such as trucks, busses, motorboats, motorcycles, electric personal transporters, and/or any other motorized devices capable of transporting people or goods. In another example, the vehicles 1210 may be robots operating in an industrial environment or the like. 3D deployment scenarios are also applicable where some or all of the vehicles 1210 are implemented as flying objects, such as aircraft, drones, UAVs, and/or to any other like motorized devices. Additionally, for illustrative purposes, the following description is provided where the vehicles 1210 include in-vehicle systems (IVS) 1201, which are discussed in more detail infra. However, the vehicles 1210 could include additional or alternative types of computing devices/systems such as smartphones, tablets, wearables, laptops, laptop computer, robots, drones, in-vehicle infotainment system, in-car entertainment system, instrument cluster, head-up display (HUD) device, onboard diagnostic device, on-board unit, dashtop mobile equipment, mobile data terminal, electronic engine management system, electronic/engine control unit, electronic/engine control module, embedded system, microcontroller, control module, and/or any other suitable device or system (such as those discussed herein) that may be operable to perform the functionality discussed herein. Vehicles 1210 including a computing system (e.g., IVS 1201) as well as the vehicles referenced throughout the present disclosure, may be referred to as vehicle user equipment (UE) 1210, vehicle stations 1210, vehicle ITS stations (V-ITS-S) 1210, computer assisted (CA)/autonomous driving (AD) vehicles 1210, and/or the like. In various implementations, the V-ITS-Ss 1210 may be the same or similar as the V-ITS-S 1601 of FIG. 16.

Each vehicle 1210 includes an in-vehicle system (IVS) 1201, one or more sensors 1272, and one or more driving control units (DCUs) 1274 (also referred to as "Electronic Control Units" or "ECUs"). The IVS 1200 includes a number of vehicle computing hardware subsystems and/or apps including, for example, various hardware and software elements to implement the ITS reference architecture 1300 of FIG. 13. Additionally, some or all of the vehicles 1210 may be computer-assisted or autonomous driving (CA/AD) vehicles, which may include artificial intelligence (AI) and/or or machine learning (ML) element, and/or robotics to assist vehicle operation Additionally, the IVS 1201 and CA/AD vehicle 1210 may include other components/subsystems not shown by FIG. 12 such as the elements shown and described throughout the present disclosure.

Figure 13:
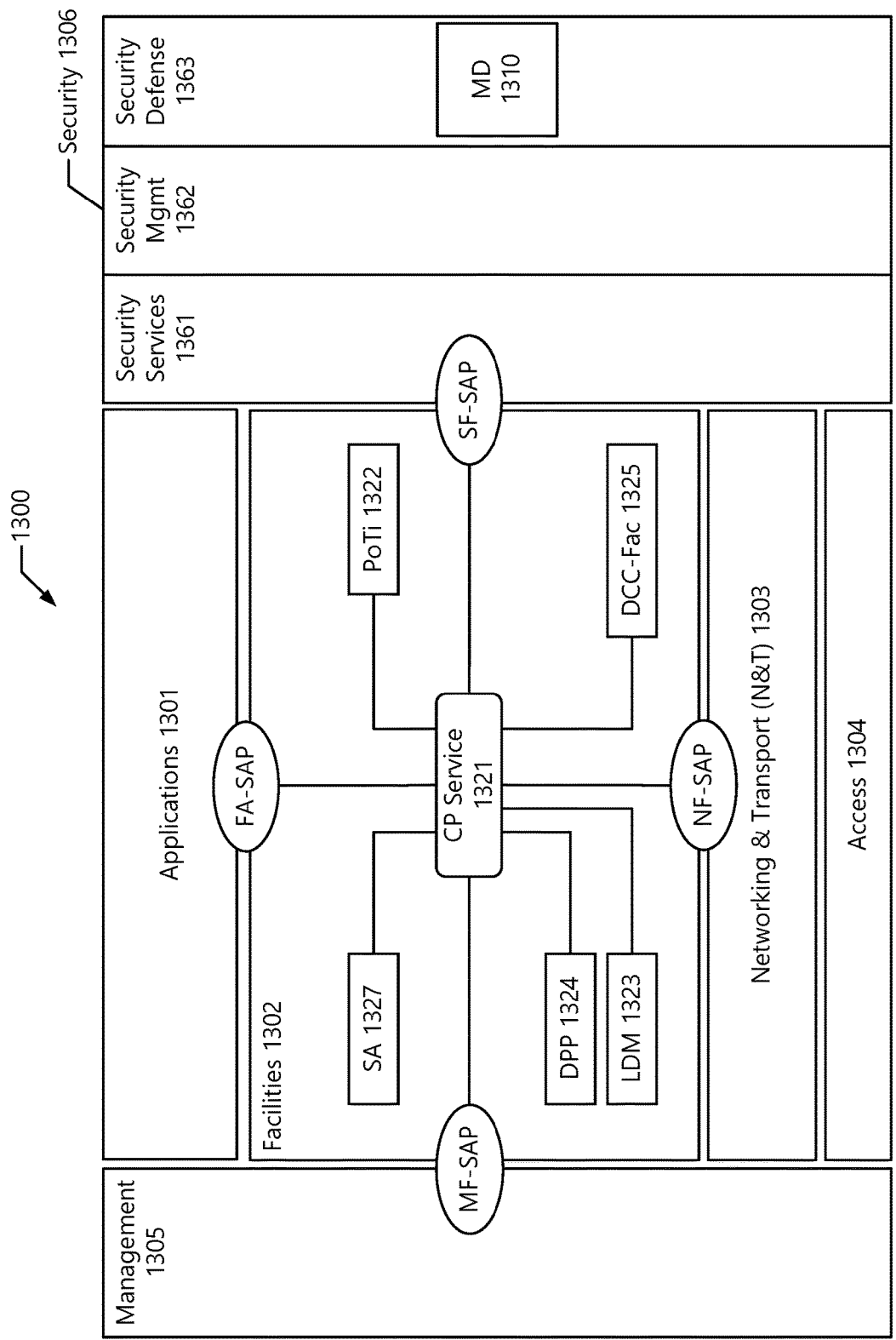
FIG. 13 depicts an ITS-S reference architecture.

The IVS 1201 includes the ITS-S 1203, which may be the same or similar to the ITS-S reference architecture 1300 of FIG. 13. The ITS-S 1203 employs one or more RATs, which allows the vehicles 1210 to communicate directly with one another and with infrastructure equipment (e.g., network access node (NAN) 1230). The one or more RATs may refer to cellular V2X (C-V2X) RATs (e.g., 3GPP LTE, 5G/NR, and beyond), a WLAN V2X (W-V2X) RAT (e.g., DSRC in the USA or ITS-G5 in the EU), and/or some other RAT such as those discussed herein. Some or all of the vehicles 1210 may include positioning circuitry (e.g., positioning circuitry 1975 of FIG. 19) to (coarsely) determine their respective geolocations and communicate their current position with the NAN 1230 in a secure and reliable manner. This allows the vehicles 1210 to synchronize with one another and/or the NAN 1230.

Additionally or alternatively, the ITS-S 1203 may utilize respective connections (or channels) 1212a, 1212b to communicate data (e.g., transmit and receive) data with the NAN 1230. The connections 1212a, 1212b are illustrated as an air interface to enable communicative coupling consistent with one or more communications protocols, such as any of those discussed herein. Additionally or alternatively, the ITS-Ss 1203 can directly exchange data via direct links 1253, which may be LTE/NR Proximity Services (ProSe) link, PC5 interfaces/links, sidelink channels, or the like; WiFi based links or a personal area network (PAN) based links (e.g., [IEEE802154] based protocols including ZigBee, IPv6 over Low power Wireless Personal Area Networks (6LoWPAN), WirelessHART, MiWi, Thread, and/or the like; WiFi-direct; Bluetooth/Bluetooth Low Energy (BLE) protocols); ITS-G5 and/or DSRC links, and/or the like.

Additionally or alternatively, the ITS-S 1203 is capable of collecting or otherwise obtaining radio information, and providing the radio information to one or more NANs 1230. The radio information may include, for example, signal strength measurements, signal quality measurements, various signal/channel characteristics, and/or the like. The radio information may be in the form of one or more measurement reports and/or the like. Each measurement report is tagged with a timestamp and the location of the measurement (e.g., a current location of the ITS-S 1203 or the vehicle 1210). The radio information may be used for various purposes including, for example, cell selection, handover, network attachment, testing, and/or other purposes. Additionally or alternatively, the same or similar measurements/characteristics discussed herein may be measured and/or collected by the VRU system 1217 and/or the NAN 1230 and provided to the edge compute node 1240 and/or the cloud system 1260. access network 130 of FIG. 1

Examples of the measurements/characteristics collected by individual UEs (e.g., ITS-S 1203, VRU system 1217, and/or the like) include bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio ($E_b/N_0$), energy per chip to interference power density ratio ($E_c/I_0$), energy per chip to noise power density ratio ($E_c/N_0$), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the $i^{th}$ GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for WLAN/WiFi (e.g., [IEEE80211]) networks, and/or one or more of the measurements/metrics discussed in 3GPP TS 36.214 v17.0.0 (2022 Mar. 31) ("[TS36214]"), 3GPP TS 38.215 v17.1.0 (2022 Apr. 1) ("[TS38215]"), 3GPP TS 38.314 v17.0.0 (2022 Apr. 13) ("[TS38314]"), *IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications*, IEEE Std 802.11-2020, pp. 1-4379 (26 Feb. 2021) ("[IEEE80211]"), the contents of which are hereby incorporated by reference in their entireties. The measurements/metrics can also be those defined by other suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., MAMS [RFC8743]), IEEE/WiFi (e.g., [IEEE80211], [WiMAX], [IEEE16090], and/or the like), and/or any other like standards such as those discussed elsewhere herein.

The subsystems/apps may also include instrument cluster subsystems, front-seat and/or back-seat infotainment subsystems and/or other like media subsystems, a navigation subsystem (NAV) 1202, a vehicle status subsystem/app, a HUD subsystem, an EMA subsystem, and so forth. The NAV 1202 may be configurable or operable to provide navigation guidance or control, depending on whether vehicle 1210 is a computer-assisted vehicle, partially or fully autonomous driving vehicle. NAV 1202 may be configured with computer vision to recognize stationary or moving objects (e.g., a pedestrian, another vehicle, or some other moving object) in an area surrounding vehicle 1210, as it travels enroute to its destination. The NAV 1202 may be configurable or operable to recognize stationary or moving objects in the area surrounding vehicle 1210, and in response, make its decision in guiding or controlling DCUs of vehicle 1210, based at least in part on sensor data collected by sensors 1272.

The DCUs 1274 include hardware elements that control various systems of the vehicles 1210, such as the operation of the engine, the transmission, steering, braking, and/or the like. DCUs 1274 are embedded systems or other like computer devices that control a corresponding system of a vehicle 1210. The DCUs 1274 may each have the same or similar components as devices/systems of FIG. 1974 discussed infra, or may be some other suitable microcontroller or other like processor device, memory device(s), communications interfaces, and the like. Individual DCUs 1274 are capable of communicating with one or more sensors 1272 and actuators (e.g., actuators 1974 of FIG. 19).

The sensors 1272 are hardware elements configurable or operable to detect an environment surrounding the vehicles 1210 and/or changes in the environment. The sensors 1272 are configurable or operable to provide various sensor data to the DCUs 1274 and/or one or more AI agents to enable the DCUs 1274 and/or one or more AI agents to control respective control systems of the vehicles 1210. Some or all of the sensors 1272 may be the same or similar as the sensor circuitry 1972 of FIG. 19. In particular, the IVS 1201 may include or implement a facilities layer and operate one or more facilities within the facilities layer. The sensors 1272 include(s) devices, modules, and/or subsystems whose purpose is to detect events or changes in its environment and send the information (sensor data) about the detected events to some other a device, module, subsystem, and/or the like. Examples of such sensors 1272 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., visible light cameras, thermographic camera and/or thermal imaging camera (TIC) systems, forward-looking infrared (FLIR) camera systems, radiometric thermal camera systems, active IR camera systems, ultraviolet (UV) camera systems, and/or the like); light detection and ranging (LiDAR) sensors; proximity sensors (e.g., IR radiation detector and the like), depth sensors, ambient light sensors, ultrasonic transceivers; microphones; and/or the like. Some of the sensor circuitry 1272 may be sensors used for various aerial asset and/or vehicle control systems such as, for example, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data; catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; pedal position sensors; accelerometers; altimeters; magnetometers; level sensors; flow/fluid sensors, barometric pressure sensors, vibration sensors (e.g., shock & vibration sensors, motion vibration sensors, main and tail rotor vibration monitoring and balancing (RTB) sensor(s), gearbox and drive shafts vibration monitoring sensor(s), bearings vibration monitoring sensor(s), oil cooler shaft vibration monitoring sensor(s), engine vibration sensor(s) to monitor engine vibrations during steady-state and transient phases, and/or the like), force and/or load sensors, remote charge converters (RCC), rotor speed and position sensor(s), fiber optic gyro (FOG) inertial sensors, Attitude & Heading Reference Unit (AHRU), fibre Bragg grating (FBG) sensors and interrogators, tachometers, engine temperature gauges, pressure gauges, transformer sensors, airspeed-measurement meters, vertical speed indicators, and/or the like. The sensor circuitry 1272 may include other sensors such as and/or other like sensors/systems.

IVS 1201, on its own or in response to user interactions, communicates or interacts with one or more vehicles 1210 via interface 1253, which may be, for example, 3GPP-based direct links (e.g., sidelinks, Proximity Services (ProSe) links, and/or PC5 interfaces/links), IEEE-based direct links (e.g., WiFi-direct, [IEEE80211p], IEEE 802.11bd, [IEEE802154], ITS-G5, DSRC, WAVE, and/or the like). The 3GPP (e.g., LTE or 5G/NR) direct links may be, [IEEE80211] based direct links or a personal area network (PAN) links, and/or other technologies (e.g., Bluetooth/Bluetooth Low Energy (BLE) or the like) such as any RAT discussed herein. The vehicles 1210 may exchange ITS protocol data units (PDUs) (e.g., CAMs, CPMs, DENMs, Misbehavior Report messages, and/or the like) or other messages with one another over the interface 1253. IVS 1201, on its own or in response to user interactions, communicates or interacts with one or more remote/cloud servers 1260 via NAN 1230 over interface 1212 and over network 1258. The NAN 1230 is arranged to provide network connectivity to the vehicles 1210 via respective interfaces 1212 between the NAN 1230 and the individual vehicles 1210. The NAN 1230 is, or includes, an ITS-S that is the same or similar as ITS-S 1203 (referred to as a roadside ITS-S(R-ITS-S)).

The NAN 1230 is a network element that is part of an access network that provides network connectivity to the end-user devices (e.g., V-ITS-Ss 1210 and/or VRU ITS-Ss 1217). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. All or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. The CRAN, CR, or vBBUP may implement a RAN function split, wherein one or more communication protocol layers are operated by the CRAN/CR/vBBUP and other communication protocol entities are operated by individual RAN nodes 1230. This virtualized framework allows the freed-up processor cores of the NAN 1230 to perform other virtualized apps, such as virtualized apps for the VRU 1216/V-ITS-S 1210. The NAN 1230 may include ground stations (e.g., terrestrial access points) or satellite stations to provide network connectivity or coverage within a geographic area (e.g., a cell). The NAN 1230 may be implemented as one or more dedicated physical devices such as a macrocell base stations and/or a low power base station for providing femtocells, picocells, or other like cells having smaller coverage areas, smaller user capacity, or higher bandwidth compared to macrocells. In various implementations, the NAN 1230 may be the same or similar as one or more access network nodes in the access network 130 of FIG. 1, and/or the roadside infrastructure system 1800 of FIG. 18.

Environment 1200 also includes VRU 1216, which includes a VRU device 1217 (also referred to as "VRU equipment" or "VRU system"). The VRU 1216 is a non-motorized road users such as pedestrians, light vehicles carrying persons (e.g., wheelchair users, skateboards, e-scooters, Segways, and/or the like), motorcyclists (e.g., motorbikes, powered two wheelers, mopeds, and/or the like), and/or animals posing safety risk to other road users (e.g., pets, livestock, wild animals, and/or the like). The VRU device 1217 includes an ITS-S that is the same or similar as the ITS-S 1203 discussed previously, and/or related hardware components, other in-station services, and sensor sub-systems. The VRU device 1217 could be a pedestrian-type VRU device 1217 (e.g., a "personal ITS-S" such as a smartphone, tablet, wearable device, and the like), a vehicle-type VRU device 1217 (e.g., a device embedded in or coupled with a bicycle, motorcycle, or the like, or a pedestrian-type VRU device 1217 in or on a bicycle, motorcycle, or the like), or an IoT device (e.g., traffic control devices) used by a VRU 1216 integrating ITS-S technology. For purposes of the present disclosure, the term "VRU" may be used to refer to both the VRU 1216 and its VRU device 1217 unless the context dictates otherwise. Various details regarding VRUs and VAMs are discussed in ETSI TR 103 300-1 v2.1.1 (2019 September) ("[TR103300-1]"), ETSI TS 103 300-2 V0.3.0 (2019 December) ("[TS103300-2]"), and ETSI TS 103 300-3 V0.1.11 (2020 May) ("[TS103300-3]"). In various implementations, the VRU device 1217 may be the same or similar as the personal computing system 1700 of FIG. 17.

The Radio Access Technologies (RATs) employed by the NAN 1230, the V-ITS-Ss 1210, and the VRU ITS-S 1217 may include one or more V2X RATs, which allow the V-ITS-Ss 1210 to communicate directly with one another, with infrastructure equipment (e.g., NAN 1230), and with VRU devices 1217. In the example of FIG. 12, any number of V2X RATs may be used for V2X communication. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 1212a and the WLAN V2X RAT may utilize an air interface 1212b. The W-V2X RATs include, for example, IEEE 1609.0-2019, "IEEE Guide for Wireless Access in Vehicular Environments (WAVE) Architecture" (2019 Apr. 10) ("[IEEE16090]"), SAE Int'l, "V2X Communications Message Set Dictionary" (formerly "Dedicated Short Range Communication (DSRC) Message Set Dictionary") (2020-07-23) ("[J2735 202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018 Mar. 2) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) ("[EN302663]") and describes the access layer of the ITS-S reference architecture 1300. The ITS-G5 access layer comprises [IEEE80211] (which now incorporates IEEE 802.11p) and/or IEEE/ISO/IEC 8802-2-1998 protocols, as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020 January), 3GPP TS 23.285 v17.0.0 (2022 Mar. 29) ("[TS23285]"); and 3GPP 5G/NR-V2X is outlined in, inter alia, 3GPP TR 23.786 v16.1.0 (2019-06) and 3GPP TS 23.287 v17.2.0 (2021 Dec. 23) ("[TS23287]"). In arrangement 1200, V-ITS-S 1210a may be equipped with a first V2X RAT communication system (e.g., C-V2X) whereas V-ITS-S 1210b may be equipped with a second V2X RAT communication system (e.g., W-V2X). Additionally or alternatively, the V-ITS-S 1210a and/or V-ITS-S 1210b may each be employed with multiple V2X RAT communication systems.

In V2X scenarios, V-ITS-Ss 1210, VRU device 1217, and/or NAN 1230 may be or act as an RSU or R-ITS-S, which refers to any transportation infrastructure entity used for V2X communications. In the example of FIG. 12, the NAN 1230 is a stationary RSU, such as an gNB/eNB-type RSU or other like infrastructure. In other implementations, a V-ITS-S 1210 and/or VRU device 1217 may be a mobile RSU or a UE-type RSU. In these cases, mobility issues can be managed in order to ensure a proper radio coverage of the translation entities. Additionally or alternatively, RSU may be a road embedded reflector, a smart street or traffic light, a road side tag, smart signage, or other like traffic control device/element.

The NAN 1230 or an edge compute node 1240 may provide one or more services/capabilities 1280. In an example implementation, RSU 1230 is a computing device coupled with radio frequency circuitry located on a roadside that provides connectivity support to passing V-ITS-Ss 1210. The RSU 1230 may also include internal data storage circuitry to store intersection map geometry, traffic statistics, media, as well as apps/software to sense and control ongoing vehicular and pedestrian traffic. The RSU 1230 provides various services/capabilities 1280 such as, for example, very low latency communications required for high speed events, such as crash avoidance, traffic warnings, and the like. Additionally or alternatively, the RSU 1230 may provide other services/capabilities 1280 such as, for example, cellular/WLAN communications services. In some implementations, the components of the RSU 1230 may be packaged in a weatherproof enclosure suitable for outdoor installation, and may include a network interface controller to provide a wired connection (e.g., Ethernet) to a traffic signal controller and/or a backhaul network. Further, RSU 1230 may include wired or wireless interfaces to communicate with other RSUs 1230 (not shown by FIG. 12).

The network 1258 may represent a network such as the Internet, a wireless local area network (WLAN), or a wireless wide area network (WWAN) including proprietary and/or enterprise networks for a company or organization, a cellular core network, a backbone network, an edge computing network, a cloud computing service, a data network, an enterprise network, and/or combinations thereof. As examples, the network 1258 and/or access technologies may include cellular technology (e.g., 3GPP LTE, NR/5G, MuL- TEfire, WiMAX, and so forth), WLAN (e.g., WiFi®), and/or any other suitable technology such as those discussed herein. Different technologies exhibit benefits and limitations in different scenarios, and app performance in different scenarios becomes dependent on the choice of the access networks. The remote/cloud servers 1260 may represent one or more app servers, a cloud computing architecture/platform that provides cloud computing services, and/or some other remote infrastructure. The remote/cloud servers 1260 may include any one of a number of services and capabilities 1280 such as, for example, ITS-related apps and services, driving assistance (e.g., mapping/navigation), content provision (e.g., multi-media infotainment streaming), and/or the like.

Additionally, the NAN 1230 is co-located with an edge compute node 1240 (or a collection of edge compute nodes 1240), which may provide any number of services/capabilities 1280 to vehicles 1210 such as ITS services/apps, driving assistance, and/or content provision services 1280. The edge compute node 1240 may include or be part of an edge network or "edge cloud". The edge compute node 1240 may also be referred to as an "edge host 1240," "edge server 1240," or "compute platforms 1240." In any of the implementations discussed herein, the edge servers 1240 provide a distributed computing environment for app and service hosting, and also provide storage and processing resources so that data and/or content can be processed in close proximity to subscribers (e.g., users of UEs 1210, 1217) for faster response times The edge servers 1240 also support multitenancy run-time and hosting environment(s) for apps, including virtual appliance apps that may be delivered as packaged virtual machine (VM) images, middleware app and infrastructure services, content delivery services including content caching, mobile big data analytics, and computational offloading, among others. Computational offloading involves offloading computational tasks, workloads, apps, and/or services to the edge compute node 1240 from the UEs 1210, 1217, core network, cloud service, and/or server(s) 1260, or vice versa. For example, a device app or client app operating in a UE 1210, 1217 may offload app tasks or workloads to one or more edge servers 1240. In another example, an edge server 1240 may offload app tasks or workloads to one or more UEs 1210, 1217 (e.g., for distributed ML computation or the like).

The edge compute node 1240 includes or is part of an edge system (or edge network) that employs one or more ECTs. The edge compute node 1240 may also be referred to as "edge host 1240" or "edge server 1240." The edge system/ECT includes a collection of edge servers 1240 and edge management systems (not shown by FIG. 12) necessary to run edge computing apps within an operator network or a subset of an operator network. The edge servers 1240 are physical computer systems that may include an edge platform and/or virtualization infrastructure, and provide compute, storage, and network resources to edge computing apps. Each of the edge servers 1240 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 1210, 1217. The VI of the edge servers 1240 provide virtualized environments and virtualized resources for the edge hosts, and the edge computing apps may run as VMs and/or app containers on top of the VI.

In one example implementation, the ECT 1240 is and/or operates according to the MEC framework, as discussed in ETSI GR MEC 001 v3.1.1 (2022 January), ETSI GS MEC 003 v3.1.1 (2022 March) ("[MEC003]"), ETSI GS MEC 009 v3.1.1 (2021 June), ETSI GS MEC 010-1 v1.1.1 (2017 October), ETSI GS MEC 010-2 v2.2.1 (2022-02), ETSI GS MEC 011 v2.2.1 (2020 December), ETSI GS MEC 012 V2.2.1 (2022 February) ("[MEC012]"), ETSI GS MEC 013 V2.2.1 (2022 January), ETSI GS MEC 014 v2.1.1 (2021 March), ETSI GS MEC 015 v2.1.1 (2020 June), ETSI GS MEC 016 v2.2.1 (2020 April), ETSI GS MEC 021 v2.2.1 (2022 February), ETSI GR MEC 024 v2.1.1 (2019 November), ETSI GS MEC 028 V2.2.1 (2021 July), ETSI GS MEC 029 v2.2.1 (2022 January), ETSI MEC GS 030 v2.1.1 (2020 April) ("[MEC030]"), ETSI GR MEC 031 v2.1.1 (2020 October), and Int'l App. No. PCT/US2020/066969 filed on Dec. 23, 2020 (collectively referred to herein as "[MEC]"), the contents of each of which are hereby incorporated by reference in their entireties. This example implementation (and/or in any other example implementation discussed herein) may also include NFV and/or other like virtualization technologies such as those discussed in ETSI GR NFV 001 V1.3.1 (2021 March), ETSI GS NFV 002 V1.2.1 (2014 December), ETSI GR NFV 003 V1.6.1 (2021 March), ETSI GS NFV 006 V2.1.1 (2021 January), ETSI GS NFV-INF 001 V1.1.1 (2015 January), ETSI GS NFV-INF 003 V1.1.1 (2014 December), ETSI GS NFV-INF 004 V1.1.1 (2015 Januaary), ETSI GS NFV-MAN 001 v1.1.1 (2014 December), and/or Israel et al., *OSM Release FIVE Technical Overview*, ETSI OPEN SOURCE MANO, OSM White Paper, 1st ed. (January 2019), https://osm.etsi.org/images/OSM-Whitepaper-TechContent-ReleaseFIVE-FINAL.pdf (collectively referred to as "[ETSINFV]"), the contents of each of which are hereby incorporated by reference in their entireties. Other virtualization technologies and/or service orchestration and automation platforms may be used such as, for example, those discussed in *E2E Network Slicing Architecture*, GSMA, Official Doc. NG.127, v1.0 (3 Jun. 2021), https://www.gsma.com/newsroom/wp-content/uploads//NG.127-v1.0-2.pdf, *Open Network Automation Platform (ONAP) documentation*, Release Istanbul, v9.0.1 (17 Feb. 2022), https://docs.onap.org/en/latest/index.html ("[ONAP]"), 3GPP Service Based Management Architecture (SBMA) as discussed in 3GPP TS 28.533 v17.1.0 (2021 Dec. 23) ("[TS28533]"), the contents of each of which are hereby incorporated by reference in their entireties.

In another example implementation, the ECT 1240 is and/or operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and interoperability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable hardware with radio access control powered by AI. Various aspects of the O-RAN architecture are described in *O-RAN Architecture Description* v05.00, O-RAN ALLIANCE WG1 (July 2021); *O-RAN Operations and Maintenance Architecture Specification* v04.00, O-RAN ALLIANCE WG1 (November 2020); *O-RAN Operations and Maintenance Interface Specification* v04.00, O-RAN ALLIANCE WG1 (November 2020); *O-RANInformationModeland-DataModels Specification* v01.00, O-RAN ALLIANCE WG1 (November 2020); *O-RAN Working Group 1 Slicing Architecture* v05.00, O-RAN ALLIANCE WG1 (July 2021); *O-RAN*

*Working Group 2 (Non-RT RIC and A1 interface WG) A1 interface: Application Protocol* v03.01, O-RAN ALLIANCE WG2 (March 2021); *O-RAN Working Group 2 (Non-RT RIC and A1 interface WG) A1 interface: Type Definitions* v02.00, O-RAN ALLIANCE WG2 (July 2021); *O-RAN Working Group 2 (Non-RT RIC and A1 interface WG) A1 interface: Transport Protocol* v01.01, O-RAN ALLIANCE WG2 (March 2021); *O-RAN Working Group 2 AI/ML workflow description and requirements* v01.03 O-RAN ALLIANCE WG2 (July 2021); *O-RAN Working Group 2 Non-RT RIC: Functional Architecture* v01.03 O-RAN ALLIANCE WG2 (July 2021); *O-RAN Working Group 3, Near-Real-time Intelligent Controller, E2 Application Protocol (E2AP)* v02.00, O-RAN ALLIANCE WG3 (July 2021); *O-RAN Working Group 3 Near-Real-time Intelligent Controller Architecture & E2 General Aspects and Principles* v02.00, O-RAN ALLIANCE WG3 (July 2021); *O-RAN Working Group 3 Near-Real-time Intelligent Controller E2 Service Model (E2SM)* v02.00, O-RAN ALLIANCE WG3 (July 2021); *O-RAN Working Group 3 Near-Real-time Intelligent Controller E2 Service Model (E2SM) KPM* v02.00, O-RAN ALLIANCE WG3 (July 2021); *O-RAN Working Group 3 Near-Real-time Intelligent Controller E2 Service Model (E2SM) RAN Function Network Interface (NI)* v01.00, O-RAN ALLIANCE WG3 (February 2020); *O-RAN Working Group 3 Near-Real-time Intelligent Controller E2 Service Model (E2SM) RAN Control* v01.00, O-RAN ALLIANCE WG3 (July 2021); *O-RAN Working Group 3 Near-Real-time Intelligent Controller Near-RT RIC Architecture* v02.00, O-RAN ALLIANCE WG3 (March 2021); *O-RAN Fronthaul Working Group 4 Cooperative Transport Interface Transport Control Plane Specification* v02.00, O-RAN ALLIANCE WG4 (March 2021); *O-RAN Fronthaul Working Group 4 Cooperative Transport Interface Transport Management Plane Specification* v02.00, O-RAN ALLIANCE WG4 (March 2021); *O-RAN Fronthaul Working Group 4 Control, User, and Synchronization Plane Specification* v07.00, O-RAN ALLIANCE WG4 (July 2021); *O-RAN Fronthaul Working Group 4 Management Plane Specification* v07.00, O-RAN ALLIANCE WG4 (July 2021); *O-RAN Open F1/W1/E1/X2/Xn Interfaces Working Group Transport Specification* v01.00, O-RAN ALLIANCE WG5 (April 2020); *O-RAN Alliance Working Group 5 O1 Interface specification for O-DU* v02.00, O-RAN ALLIANCE WGX (July 2021); *Cloud Architecture and Deployment Scenarios for O-RAN Virtualized RAN* v02.02, O-RAN ALLIANCE WG6 (July 2021); *O-RAN Acceleration Abstraction Layer General Aspects and Principles* v01.01, O-RAN ALLIANCE WG6 (July 2021); *Cloud Platform Reference Designs* v02.00, O-RAN ALLIANCE WG6 (November 2020); *O-RAN O2 Interface General Aspects and Principles* v01.01, O-RAN ALLIANCE WG6 (July 2021); *O-RAN White Box Hardware Working Group Hardware Reference Design Specification for Indoor Pico Cell with Fronthaul Split Option 6* v02.00, O-RAN ALLIANCE WG7 (July 2021); *O-RAN WG7 Hardware Reference Design Specification for Indoor Picocell (FR1) with Split Option 7-2* v03.00, O-RAN ALLIANCE WG7 (July 2021); *O-RAN WG7 Hardware Reference Design Specification for Indoor Picocell (FR1) with Split Option 8* v03.00, O-RAN ALLIANCE WG7 (July 2021); *O-RAN Open Transport Working Group 9 Xhaul Packet Switched Architectures and Solutions* v02.00, O-RAN ALLIANCE WG9 (July 2021); *O-RAN Open X-haul Transport Working Group Management interfaces for Transport Network Elements* v02.00, O-RAN ALLIANCE WG9 (July 2021); *O-RAN Open X-haul Transport WG9 WDM-based Fronthaul Transport* v01.00, O-RAN ALLIANCE WG9 (November 2020); *O-RAN Open X-haul Transport Working Group Synchronization Architecture and Solution Specification* v01.00, O-RAN ALLIANCE WG9 (March 2021); *O-RAN Operations and Maintenance Interface Specification* v05.00, O-RAN ALLIANCE WG10 (July 2021); *O-RAN Operations and Maintenance Architecture* v05.00, O-RAN ALLIANCE WG10 (July 2021); *O-RAN: Towards an Open and Smart RAN*, O-RAN ALLIANCE, White Paper (October 2018), ("[ORANWP]"), and U.S. application Ser. No. 17/484,743 filed on 24 Sep. 2021 (collectively referred to as "[O-RAN]"); the contents of each of which are hereby incorporated by reference in their entireties.

In another example implementation, the ECT 1240 is and/or operates according to the 3rd Generation Partnership Project (3GPP) System Aspects Working Group 6 (SA6) Architecture for enabling Edge Apps (referred to as "3GPP edge computing") as discussed in 3GPP TS 23.558 v17.2.0 (2021 Dec. 31), 3GPP TS 23.501 v17.4.0 (2022 Mar. 23) ("[TS23501]"), 3GPP TS 23.502 v17.4.0 (2022 Mar. 23) ("[TS23502]"), 3GPP TS 23.503 v17.4.0 (2022 Mar. 23) ("[TS23503]"), 3GPP TS 28.538 v0.4.0 (2021 Dec. 8), and U.S. application Ser. No. 17/484,719 filed on 24 Sep. 2021 (collectively referred to as "[SA6Edge]"), the contents of each of which are hereby incorporated by reference in their entireties.

In another example implementation, the ECT 1240 is and/or operates according to the Intel® Smart Edge Open framework (formerly known as OpenNESS) as discussed in Intel® Smart Edge Open Developer Guide, version 21.09 (30 Sep. 2021), available at: https://smart-edge-open.github-b.io/ ("[ISEO]"), the contents of which is hereby incorporated by reference in its entirety.

In another example implementation, the edge system 1240 operates according to the Multi-Access Management Services (MAMS) framework as discussed in Kanugovi et al., *Multi-Access Management Services (MAMS)*, INTERNET ENGINEERING TASK FORCE (IETF), Request for Comments (RFC) 8743 (March 2020) ("[RFC8743]"), Ford et al., *TCP Extensions for Multipath Operation with Multiple Addresses*, IETF RFC 8684, (March 2020), De Coninck et al., *Multipath Extensions for QUIC (MP-QUIC)*, IETF DRAFT-DECONINCK-QUIC-MULTIPATH-07, IETA, QUIC Working Group (3 May 2021), Zhu et al., *User-Plane Protocols for Multiple Access Management Service*, IETF DRAFT-ZHU-IN-TAREA-MAMS-USER-PROTOCOL-09, IETA, INTAREA (4 Mar. 2020), and Zhu et al., *Generic Multi-Access (GMA) Convergence Encapsulation Protocols*, IETF DRAFT-ZHU-INTAREA-GMA-14, IETA, INTAREA/Network Working Group (24 Nov. 2021) (collectively referred to as "[MAMS]"), the contents of each of which are hereby incorporated by reference in their entireties. In these implementations, an edge compute node UEs 1240 and/or one or more cloud computing nodes/clusters may be one or more MAMS servers that includes or operates a Network Connection Manager (NCM) for downstream/DL traffic, and the individual UEs 1210, 1217 include or operate a Client Connection Manager (CCM) for upstream/UL traffic. An NCM is a functional entity that handles MAMS control messages from clients (e.g., individual UEs 1210, 1217 configures the distribution of data packets over available access paths and (core) network paths, and manages user-plane treatment (e.g., tunneling, encryption, and/or the like) of the traffic flows (see e.g., [MAMS]). The CCM is the peer functional element in a client (e.g., individual UEs 1210, 1217 that handles MAMS control-plane procedures, exchanges MAMS signaling messages with the NCM, and configures the network paths at the client for the transport of user data (e.g., network packets, and/or the like) (see e.g., [MAMS]).

3. ITS-Station Configurations and Arrangements

FIG. 13 shows an ITS-S reference architecture 1300. Some or all of the components depicted by FIG. 13 follows the ITSC protocol, which is based on the principles of the OSI model for layered communication protocols extended for ITS apps. The ITSC 1300 includes an access layer 1304 that corresponds with the OSI layers 1 and 2, a networking & transport (N&T) layer 1303 that corresponds with OSI layers 3 and 4, the facilities layer which corresponds with OSI layers 5, 6, and at least some functionality of OSI layer 7, and an apps layer 1301 that corresponds with some or all of OSI layer 7. Each of these layers are interconnected via respective observable interfaces, service access points (SAPs), APIs, and/or other like connectors or interfaces (see e.g., ETSI EN 302 665 v1.1.1 (2010-09)). The interconnections in this example include the MF-SAP, FA-SAP, NF-SAP, and SF-SAP.

The applications layer 1301 provides ITS services, and ITS apps are defined within the app layer 1301. An ITS app is an app layer entity that implements logic for fulfilling one or more ITS use cases. An ITS app makes use of the underlying facilities and communication capacities provided by the ITS-S. Each app can be assigned to one of the three identified app classes: (active) road safety, (cooperative) traffic efficiency, cooperative local services, global internet services, and other apps (see e.g., [EN302663]), ETSI TR 102 638 V1.1.1 (2009-06) ("[TR102638]"), and [TS102940]). Examples of ITS apps may include driving assistance for cooperative awareness (CA), driving assistance for road hazard warnings (RHW), Automatic Emergency Braking (AEB), Forward Collision Warning (FCW), cooperative adaptive cruise control (CACC), control loss warning (CLW), queue warning, Automated Parking System (APS), pre-crash sensing warning, cooperative Speed Management (CSM) (e.g., curve speed warning and the like), mapping and/or navigation apps (e.g., turn-by-turn navigation and cooperative navigation), cooperative navigation (e.g. platooning and the like), location based services (LBS), community services, ITS-S lifecycle management services, transport related electronic financial transactions, and the like. A V-ITS-S 1210 provides ITS apps to vehicle drivers and/or passengers, and may require an interface for accessing in-vehicle data from the in-vehicle network or in-vehicle system. For deployment and performances needs, specific instances of a V-ITS-S 1210 may contain groupings of Apps and/or Facilities.

The facilities layer 1302 comprises middleware, software connectors, software glue, or the like, comprising multiple facility layer functions (or simply a "facilities"). In particular, the facilities layer contains functionality from the OSI app layer, the OSI presentation layer (e.g., ASN.1 encoding and decoding, and encryption) and the OSI session layer (e.g., inter-host communication). A facility is a component that provides functions, information, and/or services to the apps in the app layer and exchanges data with lower layers for communicating that data with other ITS-Ss. C-ITS facility services can be used by ITS Apps. Examples of these facility services include: Cooperative Awareness (CA) provided by cooperative awareness basic service (CABS) facility (see e.g., ETSI EN 302 637-2 v1.4.1 (2019-04) ("[EN302637-2]")) to create and maintain awareness of ITS-Ss and to support cooperative performance of vehicles using the road network; Decentralized Environmental Notification (DEN) provided by the DEN basic service (DENBS) facility to alert road users of a detected event using ITS communication technologies; Cooperative Perception (CP) provided by a CP services (CPS) facility 1321 (see e.g., ETSI TS 103 324 v.0.0.22 (2021-05) ("[TS103324]")) complementing the CA service to specify how an ITS-S can inform other ITS-Ss about the position, dynamics and attributes of detected neighboring road users and other objects; Multimedia Content Dissemination (MCD) to control the dissemination of information using ITS communication technologies; VRU awareness provided by a VRU basic service (VBS) facility to create and maintain awareness of vulnerable road users participating in the VRU system; Interference Management Zone to support the dynamic band sharing in co-channel and adjacent channel scenarios between ITS stations and other services and apps; Diagnosis, Logging and Status for maintenance and information purposes; Positioning and Time management (PoTi) provided by a PoTi facility that provides time and position information to ITS apps and services; Decentralized Congestion Control (DCC) contributing to the overall ITS-S congestion control functionalities using various methods at the facilities and apps layer for reducing at the number of generated messages based on the congestion level; Device Data Provider (DDP) for a V-ITS-S 1210 connected with the in-vehicle network and provides the vehicle state information; Local Dynamic Map (LDM), which is a local georeferenced database (see e.g., ETSI EN 302 895 v1.1.1 (2014-09) ("[TS302895]") and ETSI TR 102 863 v1.1.1 (2011-06) ("[TR102863]")); Signal Phase and Timing Service (SPATS); and/or Maneuver Coordination Services (MCS). A list of the common facilities is given by ETSI TS 102 894-1 v1.1.1 (2013-08) ("[TS102894-1]"), which is hereby incorporated by reference in its entirety.

FIG. 13 shows the CPS-specific functionality, including interfaces mapped to the ITS-S architecture 1300 along with the logical interfaces to other layers and entities within the facilities layer 1302. The CPS-specific functionality is centered around the CP Service (CPS) 1321 (also referred to as "CPS Basic Service 1321" or the like) located in the facilities layer. The CPS 1321 interfaces with other entities of the facilities layer 1302 and with ITS apps 1301 to collect relevant information for CPM generation and for forwarding received CPM 1100a-b content for further processing. Collective Perception (CP) is the concept of sharing a perceived environment of an ITS-S based on perception sensors. In contrast to Cooperative Awareness (CA), an ITS-S broadcasts information about its current (e.g., driving) environment rather than about its current state. Hence, CP is the concept of actively exchanging locally perceived objects between different ITS-Ss by means of V2X communication technology (or V2X RAT). CP decreases the ambient uncertainty of ITS-Ss by contributing information to their mutual Field-of-Views. The CPM 1100a-b enables ITS-Ss to share information about objects in the surrounding, which have been detected by sensors, cameras, or other information sources mounted or otherwise accessible to the Tx ITS-S. The CPS differs fundamentally from the CA basic service (see e.g., ETSI EN 302 637-2 V1.4.1 (2019-04) ("[EN302637-2]")), as it does not focus on Tx data about the current state of the disseminating ITS-S but about its perceived environment. To avoid broadcasting CPMs 1100a-b about the same object by multiple ITS-Ss, the CP service may filter detected objects to be included in CPMs 1100a-b (see e.g., clause 6.1 of [TS103324]).

The CPS 1321 operates according to the CPM protocol, which is an ITS facilities layer protocol for the operation of the CPMs 1100*a-b* transmission (Tx) and reception (Rx). The CPM 1100*a-b* is a CP basic service PDU including CPM data and an ITS PDU header. The CPM data comprises a partial or complete CPM payload, and may include the various data containers and associated values/parameters as discussed herein. The CPS Basic Service 1321 consumes data from other services located in the facilities layer, and is linked with others app support facilities. The CPS Basic Service 1321 is responsible for Tx of CPMs 1100*a-b*.

The entities for the collection of data to generate a CPM 1100*a-b* include the Device Data Provider (DDP) 1324, the PoTi 1322, and the LDM 1323. For subsystems of V-ITS-Ss 1210, the DDP 1324 is connected with the in-vehicle network and provides the vehicle state information. For subsystems of R-ITS-Ss 1230, the DDP 1324 is connected to sensors mounted on the roadside infrastructure such as poles, gantries, gates, signage, and the like.

The LDM 1323 is a database in the ITS-S, which in addition to on-board sensor data may be updated with received CAM and CPM data (see e.g., ETSI TR 102 863 v1.1.1 (2011-06)). ITS apps may retrieve information from the LDM 1323 for further processing. The CPS 1321 may also interface with the Service Announcement (SA) service 1327 to indicate an ITS-S's ability to generate CPMs 1100*a-b* and to provide details about the communication technology (e.g., RAT) used. Message dissemination-specific information related to the current channel utilization are received by interfacing with the DCC-Fac entity 1325. The DCC-FAC 1325 provides access network congestion information to the CPS 1321.

The PoTi 1322 manages the position and time information for use by ITS apps layer 1301, facility layer 1302, N&T layer 1303, management layer 135, and security layer 136. The position and time information may be the position and time at the ITS-S. For this purpose, the PoTi 1322 gets information from sub-system entities such as GNSS, sensors and other subsystem of the ITS-S. The PoTi 1322 ensures ITS time synchronicity between ITS-Ss in an ITS constellation, maintains the data quality (e.g., by monitoring time deviation), and manages updates of the position (e.g., kinematic and attitude state) and time. An ITS constellation is a group of ITS-S's that are exchanging ITS data among themselves. The PoTi entity 1322 may include augmentation services to improve the position and time accuracy, integrity, and reliability. Among these methods, communication technologies may be used to provide positioning assistance from mobile to mobile ITS-Ss and infrastructure to mobile ITS-Ss. Given the ITS app requirements in terms of position and time accuracy, PoTi 1322 may use augmentation services to improve the position and time accuracy. Various augmentation methods may be applied. PoTi 1322 may support these augmentation services by providing messages services broadcasting augmentation data. For instance, an R-ITS-S 1230 may broadcast correction information for GNSS to oncoming V-ITS-S 1210; ITS-Ss may exchange raw GPS data or may exchange terrestrial radio position and time relevant information. PoTi 1322 maintains and provides the position and time reference information according to the app and facility and other layer service requirements in the ITS-S. In the context of ITS, the "position" includes attitude and movement parameters including velocity, heading, horizontal speed and optionally others. The kinematic and attitude state of a rigid body contained in the ITS-S included position, velocity, acceleration, orientation, angular velocity, and possible other motion related information. The position information at a specific moment in time is referred to as the kinematic and attitude state including time, of the rigid body.

In addition to the kinematic and attitude state, PoTi 1322 should also maintain information on the confidence of the kinematic and attitude state variables The CPS 1321 interfaces through the Network—Transport/Facilities (NF)-Service Access Point (SAP) with the N&T layer 1303 for exchanging of CPMs 1100*a-b* with other ITS-Ss. The CPS interfaces through the Security—Facilities (SF)-SAP with the Security entity to access security services for CPM 1100*a-b* Tx and CPM 1100*a-b* Rx. The CPS interfaces through the Management-Facilities (MF)-SAP with the Management entity and through the Facilities—Application (FA)-SAP with the app layer if received CPM data is provided directly to the apps. Each of the aforementioned interfaces/SAPs may provide the full duplex exchange of data with the facilities layer, and may implement suitable APIs to enable communication between the various entities/elements.

The CPS 1321 resides or operates in the facilities layer 1302, generates CPS rules, checks related services/messages to coordinate transmission of CPMs 1100*a-b* with other ITS service messages generated by other facilities and/or other entities within the ITS-S, which are then passed to the N&T layer 1303 and access layers 1304 for transmission to other proximate ITS-Ss. The CPMs 1100*a-b* are included in ITS packets, which are facilities layer PDUs that are passed to the access layer 1304 via the N&T layer 1303 or passed to the app layer 1301 for consumption by one or more ITS apps. In this way, the CPM format is agnostic to the underlying access layer 1304 and is designed to allow CPMs 1100*a-b* to be shared regardless of the underlying access technology/RAT.

Each of the aforementioned interfaces/Service Access Points (SAPs) may provide the full duplex exchange of data with the facilities layer, and may implement suitable APIs to enable communication between the various entities/elements.

For a V-ITS-S 1210, the facilities layer 1302 is connected to an in-vehicle network via an in-vehicle data gateway as shown and described infra. The facilities and apps of a V-ITS-S 1210 receive required in-vehicle data from the data gateway in order to construct ITS messages (e.g., CSMs, VAMs, CAMs, DENMs, MCMs, and/or CPMs 1100*a-b*) and for app usage. FIG. 14 shows and describes the functionality for sending and receiving CPMs 1100*a-b*.

As alluded to previously, CP involves ITS-Ss sharing information about their current environments with one another. An ITS-S participating in CP broadcasts information about its current (e.g., driving) environment rather than about itself. For this purpose, CP involves different ITS-Ss actively exchanging locally perceived objects (e.g., other road participants and VRUs 1216, obstacles, and the like) detected by local perception sensors by means of one or more V2X RATs. In some implementations, CP includes a perception chain that can be the fusion of results of several perception functions at predefined times. These perception functions may include local perception and remote perception functions. The local perception is provided by the collection of information from the environment of the considered ITS element (e.g., VRU device, vehicle, infrastructure, and/or the like). This information collection is achieved using relevant sensors (optical camera, thermal camera, radar, LIDAR, and/or the like). The remote perception is provided by the provision of perception data via C-ITS (mainly V2X communication). CPS 1321 can be used to transfer a remote perception. Several perception sources may then be used to achieve the cooperative perception function. The consistency of these sources may be verified at predefined instants, and if not consistent, the CPS 1321 may select the best one according to the confidence level associated with each perception variable. The result of the CP should comply with the required level of accuracy as specified by PoTi. The associated confidence level may be necessary to build the CP resulting from the fusion in case of differences between the local perception and the remote perception. It may also be necessary for the exploitation by other functions (e.g., risk analysis) of the CP result. The perception functions from the device local sensors processing to the end result at the cooperative perception level may present a significant latency time of several hundred milliseconds. For the characterization of a VRU trajectory and its velocity evolution, there is a need for a certain number of the vehicle position measurements and velocity measurements thus increasing the overall latency time of the perception. Consequently, it is necessary to estimate the overall latency time of this function to take it into account when selecting a collision avoidance strategy.

Additionally or alternatively, existing infrastructure services, such as those described herein, can be used in the context of the CPS 1321. For example, the broadcast of the SPAT and SPAT relevance delimited area (MAP) is already standardized and used by vehicles at intersection level. In principle they protect VRUs 1216/1217 crossing. However, signal violation warnings may exist and can be detected and signaled using DENM. This signal violation indication using DENMs is very relevant to VRU devices 1217 as indicating an increase of the collision risk with the vehicle which violates the signal. If it uses local captors or detects and analyses VAMs, the traffic light controller may delay the red phase change to green and allow the VRU 1216/1217 to safely terminate its road crossing. The contextual speed limit using In-Vehicle Information (IVI) can be adapted when a large cluster of VRUs 1216/1217 is detected (e.g., limiting the vehicles' speed to 30 km/hour). At such reduced speed a vehicle 1210 may act efficiently when perceiving the VRUs by means of its own local perception system.

Referring back to FIG. 13, the N&T layer 1303 provides functionality of the OSI network layer and the OSI transport layer and includes one or more networking protocols, one or more transport protocols, and network and transport layer management. Each of the networking protocols may be connected to a corresponding transport protocol. Additionally, sensor interfaces and communication interfaces may be part of the N&T layer 1303 and access layer 1304. Examples of the networking protocols include IPv4, IPv6, IPv6 networking with mobility support, IPv6 over GeoNetworking, CALM, CALM FAST, FNTP, and/or some other suitable network protocol such as those discussed herein. Examples of the transport protocols include BOSH, BTP, GRE, GeoNetworking protocol, MPTCP, MPUDP, QUIC, RSVP, SCTP, TCP, UDP, VPN, one or more dedicated ITSC transport protocols, and/or some other suitable transport protocol such as those discussed herein.

The access layer includes a physical layer (PHY) 1304 connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY 1304 and DLL, and a security adaptation entity (SAE) to provide security services for the access layer 1304. The access layer 1304 may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (V2X RATs) may be used in various other implementations.

The management entity 1305 is in charge of managing communications in the ITS-S including, for example, cross-interface management, Inter-unit management communications (IUMC), networking management, communications service management, ITS app management, station management, management of general congestion control, management of service advertisement, management of legacy system protection, managing access to a common Management Information Base (MIB), and so forth.

The security entity 1306 provides security services to the OSI communication protocol stack, to the security entity and to the management entity 1305. The security entity 1306 contains security functionality related to the ITSC communication protocol stack, the ITS station and ITS apps such as, for example, firewall and intrusion management; authentication, authorization and profile management; identity, crypto key and certificate management; a common security information base (SIB); hardware security modules (HSM); and so forth. The security entity 1306 can also be considered as a specific part of the management entity 1305.

In some implementations, the security entity 1306 includes a security services layer/entity 1361 (see e.g., [TS102940]). Examples of the security services provided by the security services entity in the security entity 1306 are discussed in Table 3 in [TS102940]. In FIG. 13, the security entity 1306 is shown as a vertical layer adjacent to each of the ITS. In some implementations, security services are provided by the security entity 1306 on a layer-by-layer basis so that the security layer 1306 can be considered to be subdivided into the four basic ITS processing layers (e.g., one for each of the apps, facilities, N&T, and access layers). Security services are provided on a layer-by-layer basis, in the manner that each of the security services operates within one or several ITS architectural layers, or within the security management layer/entity 1362. Besides these security processing services, which provide secure communications between ITS stations, the security entity 1306 in the ITS-S architecture 1300 can include two additional sub-parts: security management services layer/entity 1362 and security defense layer/entity 1363.

The security defense layer 1363 prevents direct attacks against critical system assets and data and increases the likelihood of the attacker being detected. The security defense layer 1363 can include mechanisms such as intrusion detection and prevention (IDS/IPS), firewall activities, and intrusion response mechanisms. The security defense layer 1363 includes misbehavior detection (MD) functionality 1310, which performs plausibility checks on the security elements, processing of incoming V2X messages including the various MD functionality discussed herein. The MD 1310 performs misbehavior detection on CAMs, DENMs, CPMs, and/or other ITS-S/V2X messages.

In some implementations, the MD 1310 corresponds to the local (on-ITS-S) MDS 210 of FIG. 2, MDS 301 of FIG. 3, local MD 402 of FIG. 4, local MD 502 of FIG. 5, and/or some other MD mechanism such as those discussed herein.

Additionally or alternatively, the MD 1310 is based on the contents of app messages, and can be part of app logic within the apps layer 1301 and/or facilities logic within the facilities layer 1302. Additionally or alternatively, the MD 1310 is implemented as a middleware module and/or firmware module that obtains information from facilities layer 1301 services (e.g., CPS 1321, PoTi 1322, LDM 1323, and so forth) via suitable APIs, SAPs, and/or the like. In either of these implementations, the MD 1310 may be assisted by the security entity 1306. In any of the aforementioned implementations, the MD 1310 can be operated by a host platform (e.g., app processor such as processor circuitry 1952 of FIG. 19 and/or the like) a hardware accelerator (acceleration circuitry 1962 of FIG. 19 and/or the like), a trusted platform module (e.g., TEE 1990 of FIG. 19 and/or the like). In such implementations, the MD 1310 is arranged in such a way that it can perform misbehavior detection (including inconsistency and/or plausibility checks) in (near) real-time, a control loop, in or part of a processing pipeline, and/or the like. In any of the aforementioned implementations, the MD 1310 can include, or be communicatively coupled with an orchestration entity or orchestrator that arranges and/or allocates compute resources to the MD 1310 such as, for example, allocating the MD 1310 to specific processors, individual processor cores, and/or other components. In some implementations, such an orchestrator may be, or may be part of the management entity 1305. In any implementation, the MD functionality 1310 can include updateable policies for MD, firewalling or IDS/IPS that allow detected security events to be linked to certain responses (e.g. dropping suspicious ITS messages, alerts, system shut-downs, and/or the like).

The ITS-S reference architecture 1300 may be applicable to the elements of FIGS. 16 and 18. The ITS-S gateway 1611, 1811 (see e.g., FIGS. 16 and 18) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 1611, 1811 (see e.g., FIGS. 16 and 18) is capable of converting protocols. This allows an ITS-S to communicate with external elements of the system in which it is implemented. The ITS-S router 1611, 1811 provides the functionality the ITS-S reference architecture 1300 excluding the Apps and Facilities layers. The ITS-S router 1611, 1811 interconnects two different ITS protocol stacks at layer 3. The ITS-S router 1611, 1811 may be capable to convert protocols. One of these protocol stacks typically is connected to the ITS station-internal network. The ITS-S border router 1814 (see e.g., FIG. 18) provides the same functionality as the ITS-S router 1611, 1811, but includes a protocol stack related to an external network that may not follow the management and security principles of ITS (e.g., the mgmnt layer 1305 and security layer 1306 in FIG. 13).

Additionally, other entities that operate at the same level but are not included in the ITS-S include the relevant users at that level, the relevant HMI (e.g., audio devices, display/touchscreen devices, and/or the like); when the ITS-S is a vehicle, vehicle motion control for computer-assisted and/or automated vehicles (both HMI and vehicle motion control entities may be triggered by the ITS-S apps); a local device sensor system and IoT Platform that collects and shares IoT data; local device sensor fusion and actuator app(s), which may contain ML/AI and aggregates the data flow issued by the sensor system; local perception and trajectory prediction apps that consume the output of the fusion app and feed the ITS-S apps; and the relevant ITS-S. The sensor system can include one or more cameras, radars, LIDARs, and/or the like, in a V-ITS-S 1210 or R-ITS-S 1230. In the central station, the sensor system includes sensors that may be located on the side of the road, but directly report their data to the central station, without the involvement of a V-ITS-S 1210 or R-ITS-S 1230. In some cases, the sensor system may additionally include gyroscope(s), accelerometer(s), and the like (see e.g., sensor circuitry 1972 of FIG. 19). These elements are discussed in more detail infra with respect to FIGS. 16, 17, and 18.

FIG. 14 shows an example CPS service functional architecture 1400. FIG. 14 also shows the CPS and interfaces to other facilities and layers. For sending and receiving CPMs 1100, the CPS includes a CPM transmission management sub-function 1403, CPM reception management sub-function 1404, an encode CPM sub-function 1405, and a decode CPM sub-function 1406.

The encode CPM sub-function 1405 constructs the CPM 1100*a-b* according to the format specified in Annex A of [TS103324]. The most recent abstract CP object information, sensor information and free space information data are included in the CPM 1100*a-b*. The decode CPM sub-function 1406 decodes the received CPM 1100*a-b*.

The CPM transmission management sub-function 1403 implements the protocol operation of the originating ITS-S such as, for example, activation and termination of CPM Tx operation; determination of the CPM generation frequency; and triggering the generation of the CPM 1100*a-b*. Additionally or alternatively, the CPM transmission management sub-function 1403 can include the MD functionality 1310 or interface with the MD functionality 1310 for generating and sending misbehavior reports as discussed herein.

The CPM reception management sub-function 1404 implements the protocol operation of the receiving ITS-S such as, for example, triggering the decoding of the CPM upon receiving an incoming CPM; provisioning of the received CPM 1100*a-b* to the LDM and/or ITS apps of the Rx ITS-S; and/or checking the validity of the information of received CPMs 1100*a-b* (see e.g., [TR103460]). Additionally or alternatively, the CPM reception management sub-function 1404 can include the MD functionality 1310 or interface with the MD functionality 1310 for misbehavior detection of received ITS/V2X messages such as CPMs 1100*a-b* as discussed herein.

Figure 15:
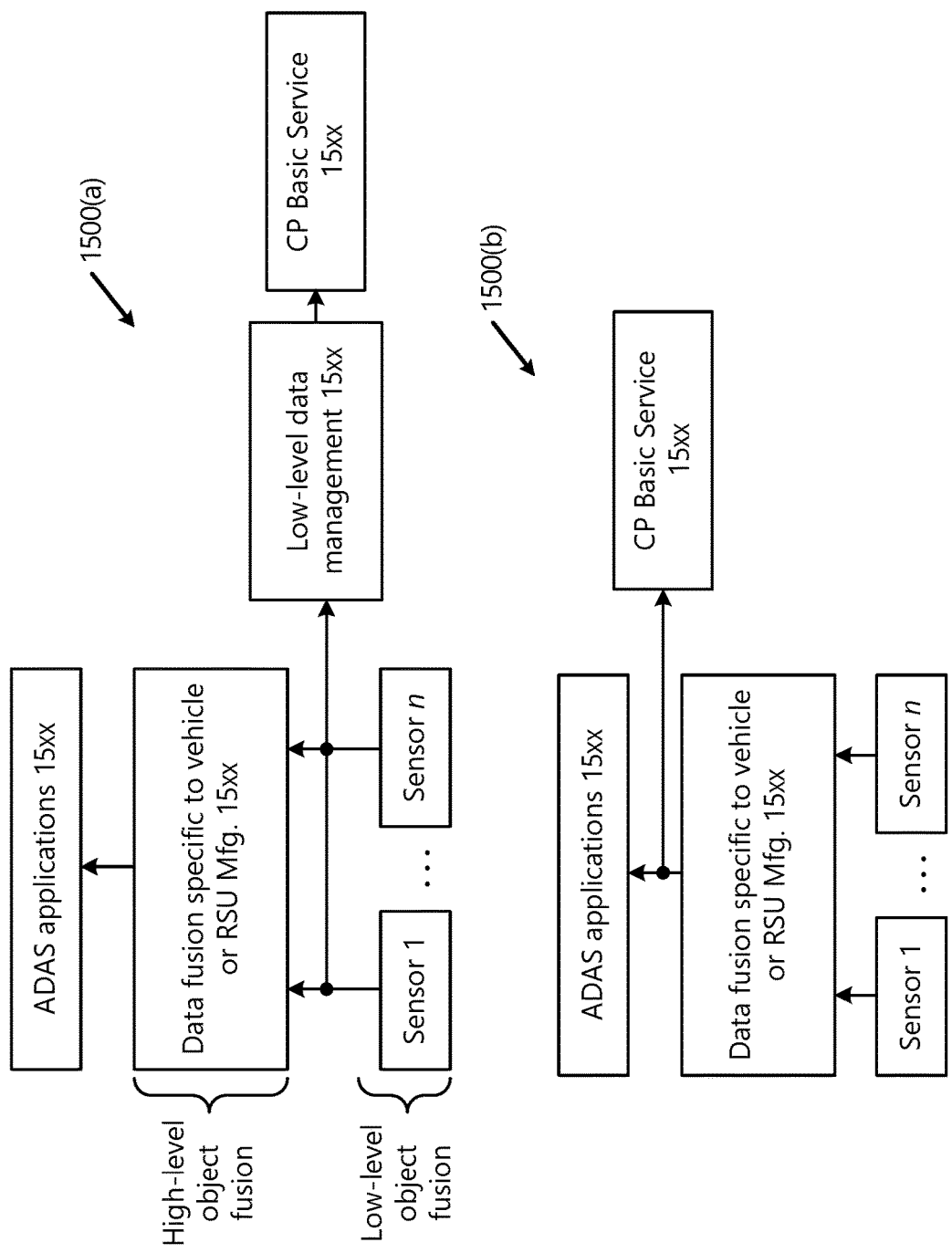
FIG. 15 shows object data extraction levels of a CPS basic service.

FIG. 15 shows an example object data extraction levels of the CP basic service. FIG. 15 part (a) depicts an implementation in which sensor data is processed as part of a low-level data management entity. The CP Basic Service then selects the object candidates to be transmitted as defined in clause 4.3 of [TS103324], and/or ETSI TR 103 562 V2.1.1 (2019-12) ("[TR103562]"). Part (a) is more likely to avoid filter cascades, as the task of high-level fusion will be performed by the receiving ITS-S. FIG. 15 part (b) depicts an implementation in which the CP Basic Service selects objects to be transmitted as part of the CPM 1100*a-b* according to clause 4.3 of [TS103324], [TR103562] from a high-level fused object list, thereby abstracting the original sensor measurement used in the fusion process. The CPM 1100*a-b* provides data fields to indicate the source of the object.

Raw sensor data refers to low-level data generated by a local perception sensor that is mounted to, or otherwise accessible by, a vehicle or an RSU. This data is specific to a sensor type (e.g., reflexions, time of flight, point clouds, camera image, and/or the like). In the context of environment perception, this data is usually analyzed and subjected to sensor-specific analysis processes to detect and compute a mathematical representation for a detected object from the raw sensor data. The IST-S sensor may provide raw sensor data as a result of their measurements, which is then used by a sensor specific low-level object fusion system (e.g., sensor hub, dedicated processor(s), and the like) to provide a list of objects as detected by the measurement of the sensor. The detection mechanisms and data processing capabilities are specific to each sensor and/or hardware configurations.

This means that the definition and mathematical representation of an object can vary. The mathematical representation of an object is called a state space representation. Depending on the sensor type, a state space representation may comprise multiple dimensions (e.g., relative distance components of the feature to the sensor, speed of the feature, geometric dimensions, and/or the like). A state space is generated for each detected object of a particular measurement. Depending on the sensor type, measurements are performed cyclically, periodically, and/or based on some defined trigger condition. After each measurement, the computed state space of each detected object is provided in an object list that is specific to the timestamp of the measurement.

The object (data) fusion system maintains one or more lists of objects that are currently perceived by the ITS-S. The object fusion mechanism performs prediction of each object to timestamps at which no measurement is available from sensors; associates objects from other potential sensors mounted to the station or received from other ITS-Ss with objects in the tracking list; and merges the prediction and an updated measurement for an object. At each point in time, the data fusion mechanism is able to provide an updated object list based on consecutive measurements from (possibly) multiple sensors containing the state spaces for all tracked objects. V2X information (e.g., CAMs, DENMs, CPMs 1100*a-b*, and/or the like) from other vehicles may additionally be fused with locally perceived information. Other approaches additionally provide alternative representations of the processed sensor data, such as an occupancy grid.

The data fusion mechanism also performs various housekeeping tasks such as, for example, adding state spaces to the list of objects currently perceived by an ITS-S in case a new object is detected by a sensor; updating objects that are already tracked by the data fusion system with new measurements that should be associated to an already tracked object; and removing objects from the list of tracked objects in case new measurements should not be associated to already tracked objects. Depending on the capabilities of the fusion system, objects can also be classified (e.g., some sensor systems may be able to classify a detected object as a particular road user, while others are merely able to provide a distance measurement to an object within the perception range). These tasks of object fusion may be performed either by an individual sensor, or by a high-level data fusion system or process.

FIG. 16 depicts an example vehicle computing system 1600. In this example, the vehicle computing system 1600 includes a V-ITS-S 1601 and Electronic Control Units (ECUs) 1674. The V-ITS-S 1601 includes a V-ITS-S gateway 1611, an ITS-S host 1612, and an ITS-S router 1613. The V-ITS-S gateway 1611 provides functionality to connect the components at the in-vehicle network (e.g., ECUs 1674) to the ITS station-internal network. The interface to the in-vehicle components (e.g., ECUs 1674) may be the same or similar as those discussed herein (see e.g., IX 1956 of FIG. 19) and/or may be a proprietary interface/interconnect. Access to components (e.g., ECUs 1674) may be implementation specific. The ECUs 1674 may be the same or similar to the driving control units (DCUs) 1274 discussed previously with respect to FIG. 12. The ITS station connects to ITS ad hoc networks via the ITS-S router 1613.

FIG. 17 depicts an example personal computing system 1700. The personal ITS sub-system 1700 provides the app and communication functionality of ITSC in mobile devices, such as smartphones, tablet computers, wearable devices, PDAs, portable media players, laptops, and/or other mobile devices. The personal ITS sub-system 1700 contains a personal ITS station (P-ITS-S) 1701 and various other entities not included in the P-ITS-S 1701, which are discussed in more detail infra. The device used as a personal ITS station may also perform HMI functionality as part of another ITS sub-system, connecting to the other ITS sub-system via the ITS station-internal network (not shown). For purposes of the present disclosure, the personal ITS sub-system 1700 may be used as a VRU ITS-S 1217.

FIG. 18 depicts an example roadside infrastructure system 1800. In this example, the roadside infrastructure system 1800 includes an R-ITS-S 1801, output device(s) 1805, sensor(s) 1808, and one or more radio units (RUs) 1810. The R-ITS-S 1801 includes a R-ITS-S gateway 1811, an ITS-S host 1812, an ITS-S router 1813, and an ITS-S border router 1814. The ITS station connects to ITS ad hoc networks and/or ITS access networks via the ITS-S router 1813. The R-ITS-S gateway 1611 provides functionality to connect the components of the roadside system (e.g., output devices 1805 and sensors 1808) at the roadside network to the ITS station-internal network. The interface to the in-vehicle components (e.g., ECUs 1674) may be the same or similar as those discussed herein (see e.g., IX 1956 of FIG. 19) and/or may be a proprietary interface/interconnect. Access to components (e.g., ECUs 1674) may be implementation specific. The sensor(s) 1808 may be inductive loops and/or sensors that are the same or similar to the sensors 1272 discussed infra with respect to FIG. 12 and/or sensor circuitry 1972 discussed infra with respect to FIG. 19.

The actuators 1813 are devices that are responsible for moving and controlling a mechanism or system. The actuators 1813 are used to change the operational state (e.g., on/off, zoom or focus, and/or the like), position, and/or orientation of the sensors 1808. The actuators 1813 are used to change the operational state of some other roadside equipment, such as gates, traffic lights, digital signage or variable message signs (VMS), and/or the like The actuators 1813 are configured to receive control signals from the R-ITS-S 1801 via the roadside network, and convert the signal energy (or some other energy) into an electrical and/or mechanical motion. The control signals may be relatively low energy electric voltage or current. The actuators 1813 comprise electromechanical relays and/or solid state relays, which are configured to switch electronic devices on/off and/or control motors, and/or may be that same or similar or actuators 1974 discussed infra with respect to FIG. 19.

Each of FIGS. 16, 17, and 18 also show entities which operate at the same level but are not included in the ITS-S including the relevant HMI 1606, 1706, and 1806; vehicle motion control 1608 (only at the vehicle level); local device sensor system and IoT Platform 1605, 1705, and 1805; local device sensor fusion and actuator app 1604, 1704, and 1804; local perception and trajectory prediction apps 1602, 1702, and 1802; motion prediction 1603 and 1703, or mobile objects trajectory prediction 1803 (at the RSU level); and connected system 1607, 1707, and 1807.

The local device sensor system and IoT Platform 1605, 1705, and 1805 collects and shares IoT data. The sensor system and IoT Platform 1705 is at least composed of the PoTi management function present in each ITS-S of the system (see e.g., ETSI EN 302 890-2 ("[EN302890-2]")). The PoTi entity provides the global time common to all system elements and the real time position of the mobile elements. Local sensors may also be embedded in other mobile elements as well as in the road infrastructure (e.g., camera in a smart traffic light, electronic signage, and/or the like). An IoT platform, which can be distributed over the system elements, may contribute to provide additional information related to the environment surrounding the device/system 1600, 1700, 1800. The sensor system can include one or more cameras, radars, LiDARs, and/or other sensors (see e.g., sensors 1972 of FIG. 19), in a V-ITS-S 1210 or R-ITS-S 1230. In personal computing system 1700 (or VRU 1217), the sensor system 1705 may include gyroscope(s), accelerometer(s), and/or other sensors (see e.g., sensors 1972 of FIG. 19). In a central station (not shown), the sensor system includes sensors that may be located on the side of the road, but directly report their data to the central station, without the involvement of a V-ITS-S 1210, an R-ITS-S 1230, or VRU 1217.

The (local) sensor data fusion function and/or actuator apps 1604, 1704, and 1804 provides the fusion of local perception data obtained from the VRU sensor system and/or different local sensors. This may include aggregating data flows issued by the sensor system and/or different local sensors. The local sensor fusion and actuator app(s) may contain machine learning (ML)/Artificial Intelligence (AI) algorithms and/or models. Sensor data fusion usually relies on the consistency of its inputs and then to their timestamping, which correspond to a common given time. Various ML/AI techniques can be used to carry out the sensor data fusion and/or may be used for other purposes, such as any of the AI/ML techniques and technologies discussed herein. Where the apps 1604, 1704, and 1804 are (or include) AI/ML functions, the apps 1604, 1704, and 1804 may include AI/ML models that have the ability to learn useful information from input data (e.g., context information, and/or the like) according to supervised learning, unsupervised learning, reinforcement learning (RL), and/or neural network(s) (NN). Separately trained AI/ML models can also be chained together in a AI/ML pipeline during inference or prediction generation.

The input data may include AI/ML training information and/or AI/ML model inference information. The training information includes the data of the ML model including the input (training) data plus labels for supervised training, hyperparameters, parameters, probability distribution data, and other information needed to train a particular AI/ML model. The model inference information is any information or data needed as input for the AI/ML model for inference generation (or making predictions). The data used by an AI/ML model for training and inference may largely overlap, however, these types of information refer to different concepts. The input data is called training data and has a known label or result.

Supervised learning is an ML task that aims to learn a mapping function from the input to the output, given a labeled data set. Examples of supervised learning include regression algorithms (e.g., Linear Regression, Logistic Regression), and the like), instance-based algorithms (e.g., k-nearest neighbor, and the like), Decision Tree Algorithms (e.g., Classification And Regression Tree (CART), Iterative Dichotomiser 3 (ID3), C4.5, chi-square automatic interaction detection (CHAID), and/or the like), Fuzzy Decision Tree (FDT), and the like), Support Vector Machines (SVM), Bayesian Algorithms (e.g., Bayesian network (BN), a dynamic BN (DBN), Naive Bayes, and the like), and Ensemble Algorithms (e.g., Extreme Gradient Boosting, voting ensemble, bootstrap aggregating ("bagging"), Random Forest and the like). Supervised learning can be further grouped into Regression and Classification problems. Classification is about predicting a label whereas Regression is about predicting a quantity. For unsupervised learning, Input data is not labeled and does not have a known result. Unsupervised learning is an ML task that aims to learn a function to describe a hidden structure from unlabeled data. Some examples of unsupervised learning are K-means clustering and principal component analysis (PCA). Neural networks (NNs) are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), and/or the like), deep stacking network (DSN), Reinforcement learning (RL) is a goal-oriented learning based on interaction with environment. In RL, an agent aims to optimize a long-term objective by interacting with the environment based on a trial and error process. Examples of RL algorithms include Markov decision process, Markov chain, Q-learning, multi-armed bandit learning, and deep RL.

The (local) sensor data fusion function and/or actuator apps 1604, 1704, and 1804 can use any suitable data fusion or data integration technique(s) to generate fused data, union data, and/or composite information. For example, the data fusion technique may be a direct fusion technique or an indirect fusion technique. Direct fusion combines data acquired directly from multiple sensors or other data sources, which may be the same or similar (e.g., all devices or sensors perform the same type of measurement) or different (e.g., different device or sensor types, historical data, etc.). Indirect fusion utilizes historical data and/or known properties of the environment and/or human inputs to produce a refined data set. Additionally or alternatively, the data fusion technique can include one or more fusion algorithms, such as a smoothing algorithm (e.g., estimating a value using multiple measurements in real-time or not in real-time), a filtering algorithm (e.g., estimating an entity's state with current and past measurements in real-time), and/or a prediction state estimation algorithm (e.g., analyzing historical data (e.g., geolocation, speed, direction, and signal measurements) in real-time to predict a state (e.g., a future signal strength/quality at a particular geolocation coordinate)). Additionally or alternatively, data fusion functions can be used to estimate various device/system parameters that are not provided by that device/system. As examples, the data fusion algorithm(s) 1604, 1704, and 1804 may be or include one or more of a structured-based algorithm (e.g., tree-based (e.g., Minimum Spanning Tree (MST)), cluster-based, grid and/or centralized-based), a structure-free data fusion algorithm, a Kalman filter algorithm, a fuzzy-based data fusion algorithm, an Ant Colony Optimization (ACO) algorithm, a fault detection algorithm, a Dempster-Shafer (D-S) argumentation-based algorithm, a Gaussian Mixture Model algorithm, a triangulation based fusion algorithm, and/or any other like data fusion algorithm(s), or combinations thereof.

In one example, the ML/AI techniques are used for object tracking. The object tracking and/or computer vision techniques may include, for example, edge detection, corner detection, blob detection, a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), and/or the like), a deep learning object detection technique (e.g., fully convolutional neural network (FCNN), region proposal convolution neural network (R-CNN), single shot multibox detector, 'you only look once' (YOLO) algorithm, and/or the like), and/or the like.

In another example, the ML/AI techniques are used for motion detection based on the y sensor data obtained from the one or more sensors. Additionally or alternatively, the ML/AI techniques are used for object detection and/or classification. The object detection or recognition models may include an enrollment phase and an evaluation phase. During the enrollment phase, one or more features are extracted from the sensor data (e.g., image or video data). A feature is an individual measurable property or characteristic. In the context of object detection, an object feature may include an object size, color, shape, relationship to other objects, and/or any region or portion of an image, such as edges, ridges, corners, blobs, and/or some defined regions of interest (ROI), and/or the like. The features used may be implementation specific, and may be based on, for example, the objects to be detected and the model(s) to be developed and/or used. The evaluation phase involves identifying or classifying objects by comparing obtained image data with existing object models created during the enrollment phase. During the evaluation phase, features extracted from the image data are compared to the object identification models using a suitable pattern recognition technique. The object models may be qualitative or functional descriptions, geometric surface information, and/or abstract feature vectors, and may be stored in a suitable database that is organized using some type of indexing scheme to facilitate elimination of unlikely object candidates from consideration.

Any suitable data fusion or data integration technique(s) may be used to generate the composite information. For example, the data fusion technique may be a direct fusion technique or an indirect fusion technique. Direct fusion combines data acquired directly from multiple vUEs or sensors, which may be the same or similar (e.g., all vUEs or sensors perform the same type of measurement) or different (e.g., different vUE or sensor types, historical data, and/or the like). Indirect fusion utilizes historical data and/or known properties of the environment and/or human inputs to produce a refined data set. Additionally, the data fusion technique may include one or more fusion algorithms, such as a smoothing algorithm (e.g., estimating a value using multiple measurements in real-time or not in real-time), a filtering algorithm (e.g., estimating an entity's state with current and past measurements in real-time), and/or a prediction state estimation algorithm (e.g., analyzing historical data (e.g., geolocation, speed, direction, and signal measurements) in real-time to predict a state (e.g., a future signal strength/quality at a particular geolocation coordinate)). As examples, the data fusion algorithm may be or include a structured-based algorithm (e.g., tree-based (e.g., Minimum Spanning Tree (MST)), cluster-based, grid and/or centralized-based), a structure-free data fusion algorithm, a Kalman filter algorithm and/or Extended Kalman Filtering, a fuzzy-based data fusion algorithm, an Ant Colony Optimization (ACO) algorithm, a fault detection algorithm, a Dempster-Shafer (D-S) argumentation-based algorithm, a Gaussian Mixture Model algorithm, a triangulation based fusion algorithm, and/or any other like data fusion algorithm A local perception function (which may or may not include trajectory prediction app(s)) 1602, 1702, and 1802 is provided by the local processing of information collected by local sensor(s) associated to the system element. The local perception (and trajectory prediction) function 1602, 1702, and 1802 consumes the output of the sensor data fusion app/function 1604, 1704, and 1804 and feeds ITS-S apps with the perception data (and/or trajectory predictions). The local perception (and trajectory prediction) function 1602, 1702, and 1802 detects and characterize objects (static and mobile) which are likely to cross the trajectory of the considered moving objects. The infrastructure, and particularly the road infrastructure 1800, may offer services relevant to the VRU support service. The infrastructure may have its own sensors detecting VRUs 1216/1217 evolutions and then computing a risk of collision if also detecting local vehicles' evolutions, either directly via its own sensors or remotely via a cooperative perception supporting services such as the CPS 1321 (see e.g., [TR103562]). Additionally, road marking (e.g., zebra areas or crosswalks) and vertical signs may be considered to increase the confidence level associated with the VRU detection and mobility since VRUs 1216/1217 usually have to respect these marking/signs.

The motion dynamic prediction function 1603 and 1703, and the mobile objects trajectory prediction 1803 (at the RSU level), are related to the behavior prediction of the considered moving objects. The motion dynamic prediction function 1603 and 1703 predict the trajectory of the vehicle 1210 and the VRU 1216, respectively. The motion dynamic prediction function 1603 may be part of the VRU Trajectory and Behavioral Modeling module and trajectory interception module of the V-ITS-S 1210. The motion dynamic prediction function 1703 may be part of the dead reckoning module and/or the movement detection module of the VRU ITS-S 1217.

Alternatively, the motion dynamic prediction functions 1603 and 1703 may provide motion/movement predictions to the aforementioned modules. Additionally or alternatively, the mobile objects trajectory prediction 1803 predict respective trajectories of corresponding vehicles 1210 and VRUs 1216, which may be used to assist the vehicles 1210 and/or VRU ITS-S 1217 in performing dead reckoning and/or assist the V-ITS-S 1210 with VRU Trajectory and Behavioral Modeling entity. Motion dynamic prediction includes a moving object trajectory resulting from evolution of the successive mobile positions. A change of the moving object trajectory or of the moving object velocity (acceleration/deceleration) impacts the motion dynamic prediction. In most cases, when VRUs 1216/1217 are moving, they still have a large amount of possible motion dynamics in terms of possible trajectories and velocities. This means that motion dynamic prediction 1603, 1703, 1803 is used to identify which motion dynamic will be selected by the vehicles 1210 and/or VRU 1216 as quickly as possible, and if this selected motion dynamic is subject to a risk of collision with another VRU or a vehicle. The motion dynamic prediction functions 1603, 1703, 1803 analyze the evolution of mobile objects and the potential trajectories that may meet at a given time to determine a risk of collision between them. The motion dynamic prediction works on the output of cooperative perception considering the current trajectories of considered device (e.g., VRU device 1217) for the computation of the path prediction; the current velocities and their past evolutions for the considered mobiles for the computation of the velocity evolution prediction; and the reliability level which can be associated to these variables. The output of this function is provided to a risk analysis function.

In many cases, working only on the output of the cooperative perception is not sufficient to make a reliable prediction because of the uncertainty which exists in terms of device/system trajectory selection and its velocity. However, complementary functions may assist in increasing consistently the reliability of the prediction. For example, the use of the device's navigation system, which provides assistance to the user to select the best trajectory for reaching its planned destination. With the development of Mobility as a Service (MaaS), multimodal itinerary computation may also indicate to the device or user dangerous areas and then assist to the motion dynamic prediction at the level of the multimodal itinerary provided by the system. In another example, the knowledge of the user habits and behaviors may be additionally or alternatively used to improve the consistency and the reliability of the motion predictions. Some users follow the same itineraries, using similar motion dynamics, for example when going to the main Point of Interest (POI), which is related to their main activities (e.g., going to school, going to work, doing some shopping, going to the nearest public transport station from their home, going to sport center, and/or the like). The device, system, or a remote service center may learn and memorize these habits. In another example, the indication by the user itself of its selected trajectory in particular when changing it (e.g., using a right turn or left turn signal similar to vehicles when indicating a change of direction).

The vehicle motion control 1608 may be included for computer-assisted and/or automated vehicles 1210. Both the HMI entity 1606 and vehicle motion control entity 1608 may be triggered by one or more ITS-S apps. The vehicle motion control entity 1608 may be a function under the responsibility of a human driver or of the vehicle if it is able to drive in automated mode.

The Human Machine Interface (HMI) 1606, 1706, and 1806, when present, enables the configuration of initial data (parameters) in the management entities (e.g., VRU profile management) and in other functions (e.g., VBS management). The HMI 1606, 1706, and 1806 enables communication of external events related to the VBS to the device owner (user), including the alerting about an immediate risk of collision (TTC<2 s) detected by at least one element of the system and signaling a risk of collision (e.g., TTC>2 seconds) being detected by at least one element of the system. For a VRU system 1217 (e.g., personal computing system 1700), similar to a vehicle driver, the HMI provides the information to the VRU 1216, considering its profile (e.g., for a blind person, the information is presented with a clear sound level using accessibility capabilities of the particular platform of the personal computing system 1700). In various implementations, the HMI 1606, 1706, and 1806 may be part of the alerting system.

The connected systems 1607, 1707, and 1807 refer to components/devices used to connect a system with one or more other systems. As examples, the connected systems 1607, 1707, and 1807 may include communication circuitry and/or radio units. The system 1600, 1700, 1800 may be a connected system made of various/different levels of equipment (e.g., up to 4 levels). The system 1600, 1700, 1800 may also be an information system which collects, in real time, information resulting from events, processes the collected information and stores them together with processed results. At each level of the system 1600, 1700, 1800, the information collection, processing and storage is related to the functional and data distribution scenario which is implemented.

Figure 19:
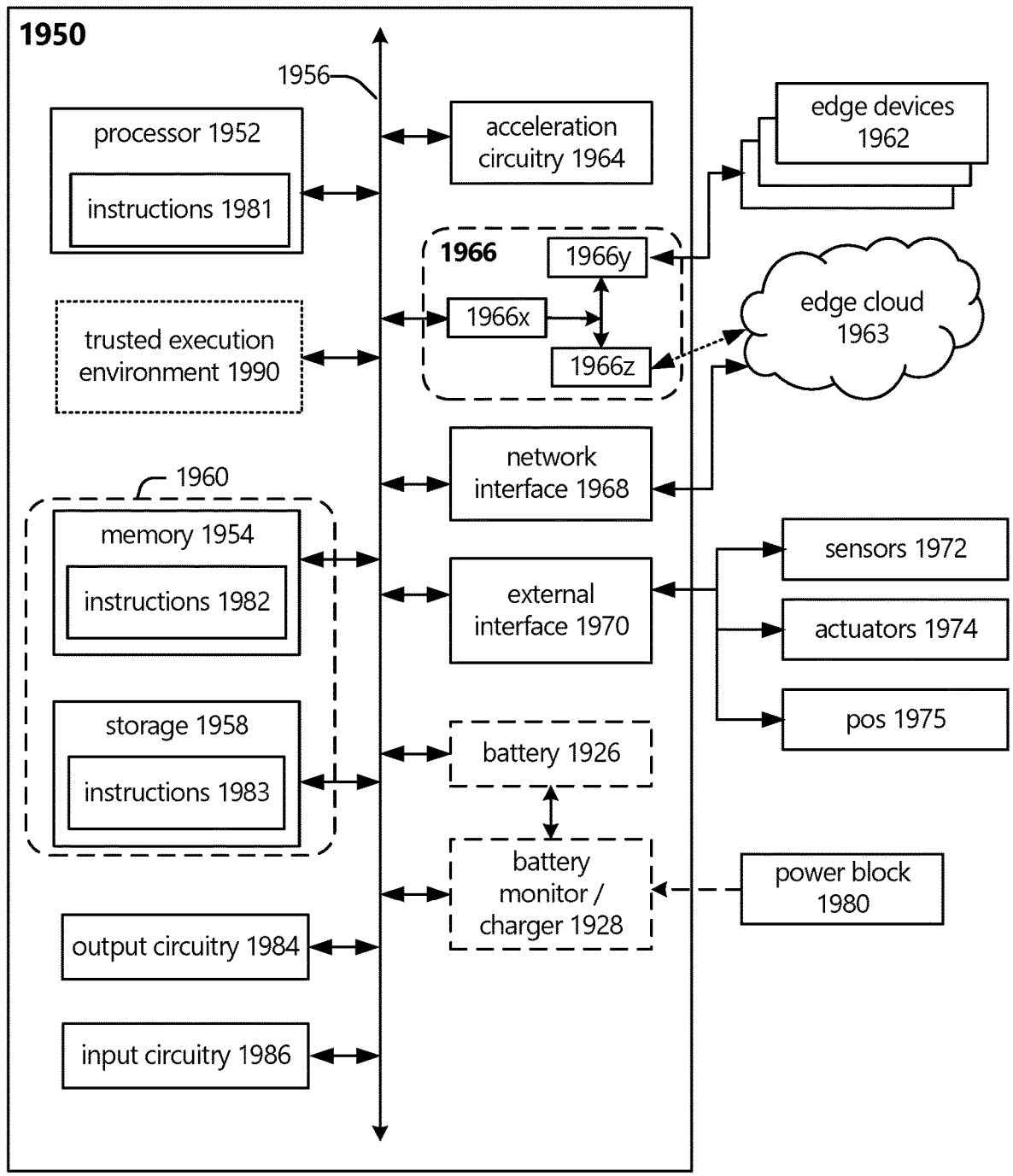
FIG. 19 depicts example components of an example compute node.

FIG. 19 illustrates an example of components that may be present in an compute node 1950 for implementing the techniques (e.g., operations, processes, methods, and methodologies) described herein. This compute node 1950 provides a closer view of the respective components of node 1950 when implemented as or as part of a computing device (e.g., as a mobile device, a base station, server, gateway, and the like). The compute node 1950 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 1950, or as components otherwise incorporated within a chassis of a larger system. The components of compute node 1950 and/or any of the devices and/or systems discussed herein may be servers, appliances, network infrastructure, machines, robots, drones, and/or any other type of computing devices. In various implementations, the compute node 1950 corresponds to one or more of a vehicle in the vehicular network 110, an access network node in the access network 130, the PKI and/or MA in the back-end security system 140 of FIG. 1; the local MD 210, MA 220, and/or MRR 230 of FIG. 2; individual detectors 303a and 303b, local MD 301, MRS subsystem 401, and/or backend MMS 420 of FIGS. 3 and 4; local MD 502, detector 503, report generator 504, and/or MA 520 of FIG. 5; reporting ITS-S 610, MA 620, and/or ITS-S roadside (gateway) 630 of FIG. 6; robot 801 and/or compute node 850 in FIG. 8; vehicle system 1210, VRU device 1217, NAN 1230, edge compute node 1240, one or more NFs and/or app functions in network 1258, and/or on or more servers 1260 in FIG. 12; ITS 1300 and/or MD 1310 of FIG. 13; vehicle computing system 1600 of FIG. 16; personal computing system 1700 of FIG. 17; roadside infrastructure system 1800 of FIG. 18; and/or any other computing device/system discussed herein.

The compute node 1950 includes processing circuitry in the form of one or more processors 1952. The processor circuitry 1952 includes circuitry such as, for example, one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1952 may include one or more hardware accelerators (e.g., same or similar to acceleration circuitry 1964), which may be microprocessors, programmable processing devices (e.g., FPGA, ASIC, and the like), or the like. The one or more accelerators may include, for example, computer vision and/or deep learning accelerators. In some implementations, the processor circuitry 1952 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 1952 may be, for example, one or more processor cores (CPUs), app processors, graphics processing units (GPUs), RISC processors, Acorn RISC Machine (ARM) processors, CISC processors, one or more DSPs, FPGAs, PLDs, one or more ASICs, baseband processors, radio-frequency integrated circuits (RFIC), microprocessors or controllers, multi-core processor, multi-threaded processor, ultra-low voltage processor, embedded processor, a specialized x-processing unit (xPU) or a data processing unit (DPU) (e.g., Infrastructure Processing Unit (IPU), network processing unit (NPU), and the like), and/or any other known processing elements, or any suitable combination thereof. In various implementations, the processor circuitry 1952 includes a parch that is capable of executing the μenclave implementations and techniques discussed herein. The processors (or cores) 1952 may be coupled with or may include memory/storage and may be configured to execute instructions stored in the memory/storage to enable various apps or OSs to run on the platform 1950. The processors (or cores) 1952 is configured to operate app software to provide a specific service to a user of the platform 1950. Additionally or alternatively, the processor(s) 1952 may be a special-purpose processor(s)/controller(s) configured (or configurable) to operate according to the elements, features, and implementations discussed herein. In some implementations, the processor(s) 1952 may be a part of a system on a chip (SoC), System-in-Package (SiP), a multi-chip package (MCP), and/or the like, in which the processor(s) 1952 and other components are formed into a single integrated circuit, or a single package.

The processor(s) 1952 may communicate with system memory 1954 over an interconnect (IX) 1956. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs. Additionally or alternatively, the memory circuitry 1954 is or includes block addressable memory device(s), such as those based on NAND or NOR technologies (e.g., Single-Level Cell ("SLC"), Multi-Level Cell ("MLC"), Quad-Level Cell ("QLC"), Tri-Level Cell ("TLC"), or some other NAND).

To provide for persistent storage of information such as data, apps, OSs and so forth, a storage 1958 may also couple to the processor 1952 via the IX 1956. In an example, the storage 1958 may be implemented via a solid-state disk drive (SSDD) and/or high-speed electrically erasable memory (commonly referred to as "flash memory"). Other devices that may be used for the storage 1958 include flash memory cards, such as SD cards, microSD cards, eXtreme Digital (XD) picture cards, and the like, and USB flash drives. Additionally or alternatively, the memory circuitry 1954 and/or storage circuitry 1958 may be or may include memory devices that use chalcogenide glass, multi-threshold level NAND flash memory, NOR flash memory, single or multi-level Phase Change Memory (PCM) and/or phase change memory with a switch (PCMS), NVM devices that use chalcogenide phase change material (e.g., chalcogenide glass), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. Additionally or alternatively, the memory circuitry 1954 and/or storage circuitry 1958 can include resistor-based and/or transistor-less memory architectures. The memory circuitry 1954 and/or storage circuitry 1958 may also incorporate three-dimensional (3D) cross-point (XPOINT) memory devices (e.g., Intel® 3D XPoint™ memory), and/or other byte addressable write-in-place NVM. The memory circuitry 1954 and/or storage circuitry 1958 may refer to the die itself and/or to a packaged memory product. In low power implementations, the storage 1958 may be on-die memory or registers associated with the processor 1952. However, in some examples, the storage 1958 may be implemented using a micro hard disk drive (HDD). Further, any number of new technologies may be used for the storage 1958 in addition to, or instead of, the technologies described, such resistance change memories, phase change memories, holographic memories, or chemical memories, among others.

Computer program code for carrying out operations of the present disclosure (e.g., computational logic and/or instructions 1981, 1982, 1983) may be written in any combination of one or more programming languages, including object oriented programming languages, procedural programming languages, scripting languages, markup languages, and/or some other suitable programming languages including proprietary programming languages and/or development tools, or any other languages tools. The computer program code 1981, 1982, 1983 for carrying out operations of the present disclosure may also be written in any combination of the programming languages discussed herein. The program code may execute entirely on the system 1950, partly on the system 1950, as a stand-alone software package, partly on the system 1950 and partly on a remote computer or entirely on the remote computer or server. In the latter scenario, the remote computer may be connected to the system 1950 through any type of network, including a LAN or WAN, or the connection may be made to an external computer (e.g., through the Internet using an Internet Service Provider (ISP)).

In an example, the instructions 1981, 1982, 1983 on the processor circuitry 1952 (separately, or in combination with the instructions 1981, 1982, 1983) may configure execution or operation of a trusted execution environment (TEE) 1990. The TEE 1990 operates as a protected area accessible to the processor circuitry 1902 to enable secure access to data and secure execution of instructions. In some implementations, the TEE 1990 may be a physical hardware device that is separate from other components of the system 1950 such as a secure-embedded controller, a dedicated SoC, or a tamper-resistant chipset or microcontroller with embedded processing devices and memory devices. Additionally or alternatively, the TEE 1990 may be implemented as secure enclaves (or "enclaves"), which are isolated regions of code and/or data within the processor and/or memory/storage circuitry of the compute node 1950, where only code executed within a secure enclave may access data within the same secure enclave, and the secure enclave may only be accessible using the secure app (which may be implemented by an app processor or a tamper-resistant microcontroller). Additionally or alternatively, the memory circuitry 1954 and/or storage circuitry 1958 may be divided into isolated user-space instances such as virtualization/OS containers, partitions, virtual environments (VEs), and/or the like. Virtual machines could also be used in some implementations. Such virtual computing environments may include a hypervisor managing (e.g., spawning, deploying, destroying, and the like) one or more virtual machines, one or more virtualization/OS containers, and the like. Such virtual computing environments provide an execution environment in which one or more apps and/or other software, code or scripts may execute while being isolated from one or more other apps, software, code or scripts. In some implementations, the memory circuitry 1904 and/or storage circuitry 1908 may be divided into one or more trusted memory regions for storing apps or software modules of the TEE 1990.

The OS stored by the memory circuitry 1954 and/or storage circuitry 1958 is software to control the compute node 1950. The OS may include one or more drivers that operate to control particular devices that are embedded in the compute node 1950, attached to the compute node 1950, and/or otherwise communicatively coupled with the compute node 1950. Example OSs include consumer-based OS, real-time OS (RTOS), hypervisors, and/or the like. The OS can invoke alternate software to facilitate one or more functions and/or operations that are not native to the OS, such as particular communication protocols and/or interpreters. Additionally or alternatively, the OS instantiates various functionalities that are not native to the OS. In some examples, OSs include varying degrees of complexity and/or capabilities. In some examples, a first OS on a first compute node 1950 may be the same or different than a second OS on a second compute node 1950. For instance, the first OS may be an RTOS having particular performance expectations of responsivity to dynamic input conditions, and the second OS can include GUI capabilities to facilitate end-user I/O and the like.

The storage 1958 may include instructions 1983 in the form of software, firmware, or hardware commands to implement the techniques described herein. Although such instructions 1983 are shown as code blocks included in the memory 1954 and the storage 1958, any of the code blocks may be replaced with hardwired circuits, for example, built into an app specific integrated circuit (ASIC), FPGA memory blocks, and/or the like. In an example, the instructions 1981, 1982, 1983 provided via the memory 1954, the storage 1958, or the processor 1952 may be embodied as a non-transitory, machine-readable medium 1960 including code to direct the processor 1952 to perform electronic operations in the compute node 1950. The processor 1952 may access the non-transitory, machine-readable medium 1960 (also referred to as "computer readable medium 1960"

or "CRM 1960") over the IX 1956. For instance, the non-transitory, CRM 1960 may be embodied by devices described for the storage 1958 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, CRM 1960 may include instructions to direct the processor 1952 to perform a specific sequence or flow of actions, for example, as described with respect to the flowchart(s) and/or block diagram(s) of operations and functionality depicted herein.

The components of edge computing device 1950 may communicate over an interconnect (IX) 1956. The IX 1956 may include any number of technologies, including instruction set architecture (ISA), extended ISA (eISA), Inter-Integrated Circuit ($I^2C$), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX, RapidIO™ IX, Coherent Accelerator Processor Interface (CAPI), OpenCAPI, Advanced Microcontroller Bus Architecture (AMBA) IX, cache coherent interconnect for accelerators (CCIX), Gen-Z Consortium IXs, a HyperTransport IX, NVLink provided by NVIDIA®, ARM Advanced eXtensible Interface (AXI), a Time-Trigger Protocol (TTP) system, a FlexRay system, PROFIBUS, Ethernet, USB, On-Chip System Fabric (IOSF), Infinity Fabric (IF), and/or any number of other IX technologies. The IX 1956 may be a proprietary bus, for example, used in a SoC based system.

The IX 1956 couples the processor 1952 to communication circuitry 1966 for communications with other devices, such as a remote server (not shown) and/or the connected edge devices 1962. The communication circuitry 1966 is a hardware element, or collection of hardware elements, used to communicate over one or more networks (e.g., cloud 1963) and/or with other devices (e.g., edge devices 1962). Communication circuitry 1966 includes modem circuitry 1966x that may interface with processor circuitry 1952 for generation and processing of baseband signals and for controlling operations of the TRx 1966y and/or TRx 1966z. The modem circuitry 1966x may handle various radio control functions that enable communication with one or more (R)ANs via the transceivers (TRx) 1966y and 1966z according to one or more wireless communication protocols and/or RATs. The modem circuitry 1966x may include circuitry such as, but not limited to, one or more single-core or multi-core processors (e.g., one or more baseband processors) or control logic to process baseband signals received from a receive signal path of the TRxs 1966y, 1966z, and to generate baseband signals to be provided to the TRxs 1966y, 1966z via a transmit signal path. The modem circuitry 1966x may implement an RTOS to manage resources of the modem circuitry 1966x, schedule tasks, perform the various radio control functions, process the transmit/receive signal paths, and the like. In some implementations, the modem circuitry 1966x includes a parch that is capable of executing the μenclave implementations and techniques discussed herein.

The TRx 1966y may use any number of frequencies and protocols, such as 2.4 Gigahertz (GHz) transmissions under [IEEE802154], using Bluetooth® low energy (BLE), Zig- Bee®, among others. Any number of radios, configured for a particular wireless communication protocol, may be used for the connections to the connected edge devices 1962. For example, a wireless local area network (WLAN) unit may be used to implement WiFi® communications in accordance with a [IEEE802] standard (e.g., [IEEE80211] and/or the like). In addition, wireless wide area communications (e.g., according to a cellular or other wireless wide area protocol) may occur via a wireless wide area network (WWAN) unit.

The TRx 1966y (or multiple transceivers 1966y) may communicate using multiple standards or radios for communications at a different range. For example, the compute node 1950 may communicate with relatively close devices (e.g., within about 10 meters) using a local Bluetooth/BLE TRx, or another low power radio, to save power. More distant connected edge devices 1962 (e.g., within about 50 meters) may be reached over ZigBee® or other intermediate power radios. Both communications techniques may take place over a single radio at different power levels or may take place over separate TRxs, for example, a local TRx using BLE and a separate mesh transceiver using ZigBee®.

A TRx 1966z (e.g., a radio transceiver) may be included to communicate with devices or services in the edge cloud 1963 via (W)LAN or WAN protocols. The TRx 1966z may be an LPWA transceiver that follows [IEEE802154], among others. The edge computing node 1963 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used. Any number of other radio communications and protocols may be used in addition to the systems mentioned for the TRx 1966z, as described herein. For example, the TRx 1966z may include a cellular transceiver that uses spread spectrum (SPA/SAS) communications for implementing high-speed communications. Further, any number of other protocols may be used, such as WiFi® networks for medium speed communications and provision of network communications. The TRx 1966z may include radios that are compatible with any number of 3GPP specifications, such as LTE and 5G/NR communication systems.

A network interface controller (NIC) 1968 may be included to provide a wired communication to nodes of the edge cloud 1963 or to other devices, such as the connected edge devices 1962 (e.g., operating in a mesh, fog, and/or the like). The wired communication may provide an Ethernet connection (see e.g., Ethernet (e.g., IEEE Standard for Ethernet, IEEE Std 802.3-2018, pp. 1-5600 (31 Aug. 2018) ("[IEEE8023]")) or may be based on other types of networks, such as Controller Area Network (CAN), Local Interconnect Network (LIN), DeviceNet, ControlNet, Data Highway+, or PROFINET, a SmartNIC, Intelligent Fabric Processor(s) (IFP(s)), among many others. An additional NIC 1968 may be included to enable connecting to a second network, for example, a first NIC 1968 providing communications to the cloud over Ethernet, and a second NIC 1968 providing communications to other devices over another type of network.

Given the variety of types of applicable communications from the device to another component or network, applicable communications circuitry used by the device may include or be embodied by any one or more of components 1964, 1966, 1968, or 1970. Accordingly, in various examples, applicable means for communicating (e.g., receiving, transmitting, broadcasting, and so forth) may be embodied by such communications circuitry.

The compute node 1950 may include or be coupled to acceleration circuitry 1964, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. Additionally or alternatively, the acceleration circuitry 1964 may include xPUs and/or DPUs, IPUs, NPUs, and/or the like. These tasks may include AI/ML tasks (e.g., training, inferencing/prediction, classification, and the like), visual data processing, network data processing, infrastructure function management, object detection, rule analysis, or the like. In FPGA-based implementations, the acceleration circuitry 1964 may comprise logic blocks or logic fabric and other interconnected resources that may be programmed (configured) to perform various functions, such as the procedures, methods, functions, and the like, discussed herein. In such implementations, the acceleration circuitry 1964 may also include memory cells (e.g., EPROM, EEPROM, flash memory, static memory (e.g., SRAM, anti-fuses, and the like) used to store logic blocks, logic fabric, data, and the like in LUTs and the like. In some implementations, the modem circuitry 1966x includes a parch that is capable of executing the μenclave implementations and techniques discussed herein.

The IX 1956 also couples the processor 1952 to a sensor hub or external interface 1970 that is used to connect additional devices or subsystems. The additional/external devices may include sensors 1972, actuators 1974, and positioning circuitry 1945. Access to various components (e.g., sensors 1972, actuators 1974, positioning circuitry 1945, and the like) may be implementation specific.

The sensor circuitry 1972 includes devices, modules, or subsystems whose purpose is to detect events or changes in its environment and send the information (sensor data) about the detected events to some other a device, module, subsystem, and the like. Examples of such sensors 1972 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1950); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; inductive loops; and/or the like. In some implementations, the sensor(s) 1972 are the same or similar as the sensors 1272 of FIG. 12.

The actuators 1974, allow platform 1950 to change its state, position, and/or orientation, or move or control a mechanism or system. The actuators 1974 comprise electrical and/or mechanical devices for moving or controlling a mechanism or system, and converts energy (e.g., electric current or moving air and/or liquid) into some kind of motion. The actuators 1974 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1974 may include one or more electromechanical devices such as pneumatic actuators, hydraulic actuators, electromechanical switches including electromechanical relays (EMRs), motors (e.g., DC motors, stepper motors, servomechanisms, and the like), power switches, valve actuators, wheels, thrusters, propellers, claws, clamps, hooks, audible sound generators, visual warning devices, and/or other like electromechanical components. The platform 1950 may be configured to operate one or more actuators 1974 based on one or more captured events and/or instructions or control signals received from a service provider and/or various client systems. In some implementations, the actuators 1974 are used to change the operational state (e.g., on/off, zoom or focus, and/or the like), position, and/or orientation of the sensors 1972.

In some implementations, such as when the compute node 1950 is part of a vehicle system (e.g., V-ITS-S 1210 of FIG. 12), the actuators 1974 correspond to the driving control units (DCUs) 1274 discussed previously with respect to FIG. 12. In some implementations, such as when the compute node 1950 is part of roadside equipment (e.g., R-ITS-S 1230 of FIG. 12), the actuators 1974 can be used to change the operational state of the roadside equipment or other roadside equipment, such as gates, traffic lights, digital signage or variable message signs (VMS), and/or the like. The actuators 1974 are configured to receive control signals from the R-ITS-S 1230 via a roadside network, and convert the signal energy (or some other energy) into an electrical and/or mechanical motion. The control signals may be relatively low energy electric voltage or current.

The positioning circuitry 1945 includes circuitry to receive and decode signals transmitted/broadcasted by a positioning network of a global navigation satellite system (GNSS).

Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and the like), or the like. The positioning circuitry 1945 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1945 may include a Micro-Technology for Positioning, Navigation, and Timing (Micro-PNT) IC that uses a master timing clock to perform position tracking/estimation without GNSS assistance. The positioning circuitry 1945 may also be part of, or interact with, the communication circuitry 1966 to communicate with the nodes and components of the positioning network. The positioning circuitry 1945 may also provide position data and/or time data to the app circuitry, which may use the data to synchronize operations with various infrastructure (e.g., radio base stations), for turn-by-turn navigation, or the like. When a GNSS signal is not available or when GNSS position accuracy is not sufficient for a particular app or service, a positioning augmentation technology can be used to provide augmented positioning information and data to the app or service. Such a positioning augmentation technology may include, for example, satellite based positioning augmentation (e.g., EGNOS) and/or ground based positioning augmentation (e.g., DGPS). In some implementations, the positioning circuitry 1945 is, or includes an INS, which is a system or device that uses sensor circuitry 1972 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1950 without the need for external references.

In some optional examples, various input/output (I/O) devices may be present within or connected to, the compute node 1950, which are referred to as input circuitry 1986 and output circuitry 1984 in FIG. 19. The input circuitry 1986 and output circuitry 1984 include one or more user interfaces designed to enable user interaction with the platform 1950 and/or peripheral component interfaces designed to enable peripheral component interaction with the platform 1950. The input circuitry 1986 and/or output circuitry 1984 may be, or may be part of a Human Machine Interface (HMI). Input circuitry 1986 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1984 may be included to show information or otherwise convey information, such as sensor readings, actuator position(s), or other like information. Data and/or graphics may be displayed on one or more user interface components of the output circuitry 1984. Output circuitry 1984 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and the like), with the output of characters, graphics, multimedia objects, and the like being generated or produced from the operation of the platform 1950. The output circuitry 1984 may also include speakers or other audio emitting devices, printer(s), and/or the like. Additionally or alternatively, the sensor circuitry 1972 may be used as the input circuitry 1984 (e.g., an image capture device, motion capture device, or the like) and one or more actuators 1974 may be used as the output device circuitry 1984 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1976 may power the compute node 1950, although, in examples in which the compute node 1950 is mounted in a fixed location, it may have a power supply coupled to an electrical grid, or the battery may be used as a backup or for temporary capabilities. The battery 1976 may be a lithium ion battery, or a metal-air battery, such as a zinc-air battery, an aluminum-air battery, a lithium-air battery, and the like.

A battery monitor/charger 1978 may be included in the compute node 1950 to track the state of charge (SoCh) of the battery 1976, if included. The battery monitor/charger 1978 may be used to monitor other parameters of the battery 1976 to provide failure predictions, such as the state of health (SoH) and the state of function (SoF) of the battery 1976. The battery monitor/charger 1978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1978 may communicate the information on the battery 1976 to the processor 1952 over the IX 1956. The battery monitor/charger 1978 may also include an analog-to-digital (ADC) converter that enables the processor 1952 to directly monitor the voltage of the battery 1976 or the current flow from the battery 1976. The battery parameters may be used to determine actions that the compute node 1950 may perform, such as transmission frequency, mesh network operation, sensing frequency, and the like.

A power block 1980, or other power supply coupled to a grid, may be coupled with the battery monitor/charger 1978 to charge the battery 1976. In some examples, the power block 1980 may be replaced with a wireless power receiver to obtain the power wirelessly, for example, through a loop antenna in the compute node 1950. A wireless battery charging circuit, such as an LTC4020 chip from Linear Technologies of Milpitas, California, among others, may be included in the battery monitor/charger 1978. The specific charging circuits may be selected based on the size of the battery 1976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The compute node 1950 can be implemented as a self-contained electronic device including a housing, chassis, case, or shell. In some implementations, the housing may be dimensioned for portability such that it can be carried by a human and/or shipped (e.g., as a UE or VRU system 1217). In other implementations, the housing may be a smaller module suitable for installation in a vehicle 1210. In other implementations, the housing may be a server rack enclosure or a ruggedized shell for deployment at a cell cite or otherwise collocated with a NAN 1230. Example housings may include materials that form one or more exterior surfaces that partially or fully protect contents of the appliance, in which protection may include weather protection, hazardous environment protection (e.g., electromagnetic interference (EMI), and/or radio-frequency interference (RFI), electromagnetic radiation, vibration, relatively extreme temperatures, and the like), and/or enable submergibility. The housing may include power circuitry (e.g., battery 1976, charger 1978, and/or power block 1980) to provide power for stationary and/or portable implementations including, for example, AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications (e.g., communication circuitry 1966 and/or positioning circuitry 1975). Example housings and/or surfaces thereof may include or connect to mounting hardware to enable attachment to structures such as buildings, telecommunication structures (e.g., poles, antenna structures, and the like) and/or racks (e.g., server racks, blade mounts, and the like). One or more sensors 1972 (e.g., temperature sensors, vibration sensors, light sensors, acoustic sensors, capacitive sensors, proximity sensors, and the like) may be contained in, carried by, or otherwise embedded in the surface and/or mounted to the surface of the housing. The housing and/or surfaces thereof may support mechanical connectivity using one or more actuators 1974, such as propulsion hardware (e.g., wheels, propellers, and the like) and/or articulating hardware (e.g., robot arms, pivotable appendages, and the like). In some circumstances, the housing and/or surfaces thereof includes various types of input devices 1986 such as user interface hardware (e.g., buttons, switches, dials, sliders, and the like), and/or the housing and/or surfaces thereof includes various types of output devices 1984 contained in, carried by, embedded therein and/or attached thereto (e.g., displays, touchscreens, lights, LEDs, speakers, I/O ports (e.g., USB), and the like). In some implementations, compute node 1950 is presented in a network for a specific purpose (e.g., roadside equipment control, provide edge compute services, and the like), but may have processing and/or other capacities that may be utilized for other purposes. In these implementations, the compute node 1950 may be independent from other networked devices and may be provided within the housing having a form factor suitable for its primary purpose; yet be available for other compute tasks that do not interfere with its primary task. Additionally or alternatively, the compute node 1950 may include hardware and software components to manage local issues such as device temperature, vibration, resource utilization, updates, power issues, physical and network security, and so forth.

The example of FIG. 19 is intended to depict a high-level view of components of a varying device, subsystem, or arrangement of an edge computing node. However, in other implementations, some of the components shown may be omitted, additional components may be present, and a different arrangement of the components shown may occur in other implementations. Further, these arrangements are usable in a variety of use cases and environments, including those discussed herein (e.g., a mobile UE in industrial compute for smart city or smart factory, among many other examples).

4. Example Implementations

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method for misbehavior detection for a Collective Perception Message (CPM), the method comprising: receiving the CPM from a transmitting node (Tx), wherein the CPM includes a set of perceived objects and free space detected by the Tx; determining, based on the received CPM, a Tx sensor field of view union of the Tx ("TxS-FoV union") and a free space union of the Tx ("TxFS union"); performing a first cross check on each perceived object in the set of perceived objects against the TxS-FoV union; performing a second cross check on the free space included in the received CPM against the TxS-FoV union; performing a third cross check on each perceived object against the TxFS union; and reporting a potential misbehavior of the Tx when an inconsistency is declared as a result of at least one cross check including the first cross check, the second cross check, and the third cross check.

Example 2 includes the method of example 1 and/or some other example(s) herein, further comprising: declaring a consistency when an individual perceived object of the set of perceived objects is inside the TxS-FoV union; and declaring the inconsistency when the individual perceived object is outside of the TxS-FoV union.

Example 3 includes the method of examples 1-2 and/or some other example(s) herein, wherein performing the second cross check comprises: determining a free space polygon for each Tx sensor indicated by the received CPM; and determining whether the free space polygon of each Tx sensor is inside the TxS-FoV union.

Example 4 includes the method of example 3 and/or some other example(s) herein, further comprising: declaring a consistency when a free space polygon of an individual Tx sensor is within the TxS-FoV union; and declaring the inconsistency when the free space polygon of the individual Tx sensor is outside of the TxS-FoV union.

Example 5 includes the method of examples 1-4 and/or some other example(s) herein, wherein performing the third cross check comprises: determining whether each perceived object is outside of the TxFS union.

Example 6 includes the method of example 5 and/or some other example(s) herein, further comprising: declaring a consistency when an individual perceived object of the set of perceived objects is outside the TxFS union; and declaring the inconsistency when the individual perceived object is inside of the TxFS union.

Example 7 includes the method of examples 1-6 and/or some other example(s) herein, wherein the CPM is a first CPM, and the method further comprises: performing a fourth cross check on a speed and an acceleration of a perceived object in the set of perceived objects that is a subject of a second CPM sent by the Tx and received before the first CPM.

Example 8 includes the method of example 7 and/or some other example(s) herein, wherein performing the fourth cross check comprises: declaring the inconsistency when the speed or the acceleration over a period of time is outside a standard deviation for a corresponding change in position or speed over the period of time.

Example 9 includes the method of examples 1-8 and/or some other example(s) herein, wherein the CPM is a first CPM, and the method further comprises: performing a fifth cross check across multiple CPMs received from multiple different Txs.

Example 10 includes the method of example 9 and/or some other example(s) herein, wherein performing the fifth cross check comprises: determining a receiver node (Rx) sensor field of view union ("RxS-FoV union"), wherein the RxS-FoV union is a union of respective FoVs of a set of local sensors at the Rx; generating or updating an Rx sensor-based environmental map ("RxS-map") based on the RxS-FoV union such that objects included in the RxS-FoV union are indicated in the RxS-map; determining, at each time instance when a new CPM is received, where a perceived object included in the new CPM is disposed in the RxS-map; and declaring the inconsistency when the perceived object included in the new CPM is disposed in an area of the RxS-map indicated as being unoccupied.

Example 11 includes the method of example 10 and/or some other example(s) herein, wherein performing the fifth cross check comprises: generating or updating an Rx CPM-based environmental map ("Rx-CPM-map") based on data obtained from at least two data sources; and declaring the inconsistency when a first data source indicates that a portion of the Rx-CPM-map is unoccupied and a second data source indicates that the portion of the Rx-CPM-map is occupied.

Example 12 includes the method of example 11 and/or some other example(s) herein, wherein generating or updating the Rx-CPM-map comprises: labelling the portion of the Rx-CPM-map as unoccupied when one data source of the at least two data sources indicates the portion is unoccupied and another data source of the at least two data sources indicates that the portion is unknown; and labelling the portion of the Rx-CPM-map as occupied when one data source of the at least two data sources indicates the portion is unknown and another data source of the at least two data sources indicates that the portion is occupied.

Example 13 includes the method of examples 11-12 and/or some other example(s) herein, wherein the at least two data sources include a set of local sensors of the Rx and individual CPMs of the multiple CPMs.

Example 14 includes the method of examples 11-13 and/or some other example(s) herein, further comprising: generating the Rx-CPM-map using a data fusion algorithm to fuse sensor data obtained from each local sensor of the set of local sensors at the Rx and perceived objects included in the multiple CPMs, and fuse free space indicators included in the multiple CPMs together.

Example 15 includes the method of example 14 and/or some other example(s) herein, wherein the data fusion algorithm is a first data fusion algorithm, and the method further comprises: generating the RxS-FoV union using a second data fusion algorithm to only fuse sensor data obtained from each local sensor of the set of local sensors at the Rx together.

Example 16 includes the method of example 15 and/or some other example(s) herein, further comprising: generating the TxS-FoV union using a third data fusion algorithm to fuse sensor data of the Tx indicated by the received CPM; and generating the TxFS union using a fourth data fusion algorithm to fuse free space indications included in the received CPM.

Example 17 includes the method of example 16 and/or some other example(s) herein, wherein the first data fusion algorithm is different than the second data fusion algorithm.

Example 18 includes the method of example 16 and/or some other example(s) herein, wherein the first data fusion algorithm is same as the second data fusion algorithm.

Example 19 includes the method of examples 16-18 and/or some other example(s) herein, wherein the second data fusion algorithm is different than the third data fusion algorithm.

Example 20 includes the method of examples 16-18 and/or some other example(s) herein, wherein the second data fusion algorithm is same as the third data fusion algorithm.

Example 21 includes the method of examples 16-20 and/or some other example(s) herein, wherein the third data fusion algorithm is different than the fourth data fusion algorithm.

Example 22 includes the method of examples 16-20 and/or some other example(s) herein, wherein the third data fusion algorithm is same as the fourth data fusion algorithm.

Example 23 includes the method of examples 1-22 and/or some other example(s) herein, wherein reporting the potential misbehavior comprises: generating a misbehavior report (MR) message including the inconsistency; and sending the MR message to a misbehavior authority.

Example 24 includes the method of examples 1-22 and/or some other example(s) herein, wherein the method is performed by a detection system of a misbehavior detection service (MDS), and the MDS is implemented by a compute node.

Example 25 includes the method of example 24 and/or some other example(s) herein, wherein the MDS includes a misbehavior reporting unit (MRU), and reporting the potential misbehavior comprises: sending an inconsistency indicator to the MRU for a determination as to whether the inconsistency should be reported as a misbehavior, wherein the MRU generates and sends an MR message to an MA based on the inconsistency indicator.

Example 26 includes the method of examples 24-25 and/or some other example(s) herein, wherein the compute node is or includes an Intelligent Transportation System Station (ITS-S) or a robotic system.

Example 27 includes the method of examples 1-23 and/or some other example(s) herein, wherein the method is performed by an ITS-S or a robotic system.

Example 28 includes the method of examples 26-27 and/or some other example(s) herein, wherein the ITS-S is a vehicle ITS-S (V-ITS-S), a roadside ITS-S(R-ITS-S), a vulnerable road user (VRU) ITS-S.

Example 29 includes a method of operating a receiver (Rx) ITS-S, the method comprising: conducting one or more data consistency checks upon receiving one or more CPMs from one or more ITS-S transmitters (Txs); and considering to report detected inconsistencies as potential misbehaviors, if any inconsistencies is/are detected.

Example 30 includes the method of example 29 and/or some other example(s) herein, wherein the data consistency checks include a cross check of data fields within a single CPM, a cross check of data fields across multiple received CPMs from a same Tx, and/or a cross check of data fields across multiple received CPMs from different Txs.

Example 31 includes the method of examples 29-30 and/or some other example(s) herein, wherein the cross check within the single CPM comprises: constructing an Tx Sensors' FoV union and Tx Free Space union for a Tx that sent the single CPM using information included in the single CPM.

Example 32 includes the method of examples 29-31 and/or some other example(s) herein, wherein the cross check within the single CPM comprises: cross checking each perceived object against the Tx Sensors' FoV union, cross check each free space polygon against the Tx Sensors' FoV Union, cross check each perceived object against the Tx Free Space Union.

Example 33 includes the method of examples 29-32 and/or some other example(s) herein, wherein the cross check of multiple received CPMs from the same Tx comprises: checking a speed and an acceleration by change of positions and change of speed within the multiple received CPMs.

Example 34 includes the method of examples 29-33 and/or some other example(s) herein, wherein the cross check of multiple received CPMs from different Txs comprises: constructing an Rx sensor-based environmental map and/or an Rx CPM-based environmental map.

Example 35 includes the method of example 34 and/or some other example(s) herein, further comprising: checking across multiple CPMs with Object List with Free Space (OLFS) from the different Txs.

Example 36 includes the method of example 35 and/or some other example(s) herein, wherein checking across multiple CPMs with OLFS from the different Txs comprises: checking each object's position in a corresponding CPM against the Rx Sensor-based environmental map and/or the Rx CPM-based environmental map.

Example 37 includes a vehicle intelligent transport system station (V-ITS-S) comprising: interface circuitry to communicatively couple the V-ITS-S with one or more sensors disposed in or on a vehicle; memory circuitry arranged to store program code; and processor circuitry communicatively coupled with the memory circuitry and the interface circuitry, wherein the processor circuitry is arranged to execute the program code to perform the method of any one of examples 1-36 and/or some other example(s) herein.

Example 38 includes a roadside intelligent transport system station (R-ITS-S) comprising: interface circuitry to communicatively couple the R-ITS-S with a sensor array, wherein individual sensors of the sensor array are arranged to observe respective sectors of an environment in which the R-ITS-S is deployed; memory circuitry arranged to store program code; and processor circuitry communicatively coupled with the memory circuitry and the interface circuitry, the processor circuitry is arranged to execute the program code to perform the method of any one of examples 1-36 and/or some other example(s) herein.

Example 39a includes a robotic system comprising: one or more sensors disposed on or in the robotic system; and a computing platform including: interface circuitry to connect the computing platform with the one or more sensors; memory circuitry arranged to store instructions for performing misbehavior detection; and processor circuitry connected to the memory circuitry and the interface circuitry, wherein the processor circuitry is arranged to execute the instructions to perform the method of any one of examples 1-36 and/or some other example(s) herein.

Example 39b includes a server comprising: network interface circuitry (NIC) to communicatively couple the server with one or more intelligent transport system stations (ITS-Ss); memory circuitry arranged to store instructions; and processor circuitry communicatively coupled with the memory circuitry and the NIC, and the processor circuitry is arranged to execute the instructions to perform the method of any one of examples 1-36 and/or some other example(s) herein.

Example 40 includes one or more computer readable media comprising instructions, wherein execution of the instructions by processor circuitry is to cause the processor circuitry to perform the method of any one of examples 1-36 and/or some other example(s) herein.

Example 41 includes a computer program comprising the instructions of example 40 and/or some other example(s) herein.

Example 42 includes an Application Programming Interface defining functions, methods, variables, data structures, and/or protocols for the computer program of example 41 and/or some other example(s) herein.

Example 43 includes an apparatus comprising circuitry loaded with the instructions of example 40 and/or some other example(s) herein.

Example 44 includes an apparatus comprising circuitry operable to run the instructions of example 40 and/or some other example(s) herein.

Example 45 includes an integrated circuit comprising one or more of the processor circuitry and the one or more computer readable media of example 40 and/or some other example(s) herein.

Example 46 includes a computing system comprising the one or more computer readable media and the processor circuitry of example 40 and/or some other example(s) herein.

Example 47 includes an apparatus comprising means for executing the instructions of example 40 and/or some other example(s) herein.

Example 48 includes a signal generated as a result of executing the instructions of example 40 and/or some other example(s) herein.

Example 49 includes a data unit generated as a result of executing the instructions of example 40 and/or some other example(s) herein, wherein the data unit is a datagram, network packet, data frame, data segment, a Protocol Data Unit (PDU), a Service Data Unit (SDU), a message, or a database object.

Example 50 includes a signal encoded with the data unit of example 49 and/or some other example(s) herein.

Example 51 includes an electromagnetic signal carrying the instructions of example 40 and/or some other example(s) herein.

Example 52 includes an apparatus comprising means for performing the method of any one of examples 1-36 and/or some other example(s) herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. For the purposes of the present disclosure, the phrase "A and/or B" means (A), (B), or (A and B). Additionally, the phrase "A, B, and/or C" means (A), (B), (C), (A and B), (A and C), (B and C), or (A, B and C). The phrase "(semi-)autonomous" means semi-autonomous and/or autonomous. The description may use the phrases "in an embodiment," "in some embodiments," or the like, each of which may refer to one or more of the same or different embodiments. The description may use the phrases "in an implementation," "in an example implementation," "in some implementations", or the like, each of which may refer to one or more of the same or different implementations or examples. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "colocated", "collocated", or "co-located" at least in some examples refers to two or more elements being in the same place or location, or relatively close to one another (e.g., within some predetermined distance from one another). Additionally or alternatively, the term "colocated" or "co-located" at least in some examples refers to the placement or deployment of two or more compute elements or compute nodes together in a secure dedicated storage facility, or within a same enclosure or housing.

The term "establish" or "establishment" at least in some examples refers to (partial or in full) acts, tasks, operations, and the like, related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, and the like, related to initiating, starting, or warming communication or initiating, starting, or warming a relationship between two entities or elements (e.g., establish a session, establish a session, and the like). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some examples refers to (partial or in full) acts, tasks, operations, and the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some examples refers to any action (or set of actions) involved with receiving or obtaining an object, data, data unit, and the like, and/or the fact of the object, data, data unit, and the like being received. The term "receipt" at least in some examples refers to an object, data, data unit, and the like, being pushed to a device, system, element, and the like (e.g., often referred to as a push model), pulled by a device, system, element, and the like (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, and the like, or combinations thereof.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value. The term "metric" at least in some examples refers to a standard definition of a quantity, produced in an assessment of performance and/or reliability of the network, which has an intended utility and is carefully specified to convey the exact meaning of a measured value.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The terms "ego" (as in, e.g., "ego device") and "subject" (as in, e.g., "data subject") at least in some examples refers to an entity, element, device, system, and the like, that is under consideration or being considered. The terms "neighbor" and "proximate" (as in, e.g., "proximate device") at least in some examples refers to an entity, element, device, system, and the like, other than an ego device or subject device.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to a name, address, label, distinguishing index, and/or attribute or a set of a names, addresses, labels, distinguishing indexes, and/or attributes of an entity that uniquely identifies the entity within a certain context. Additionally or alternatively, the term "identifier" at least in some examples refers to an instance of identification. The term "persistent identifier" at least in some examples refers to an identifier that is reused by a device or by another device associated with the same person or group of persons for an indefinite period. The term "identification" at least in some examples refers to a process of recognizing an identity as distinct from other identities in a particular scope or context, which may involve processing identifiers to reference an identity in an identity database.

The term "indicator" at least in some examples refers to a measure that provides an estimate or evaluation of specified attributes derived from an analytical model with respect to defined information.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), and so forth, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality.

The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some examples refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The terms "machine-readable medium" and "computer-readable medium" refers to tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EE-PROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, and the like), interpreting, loading, organizing (e.g., dynamically or statically linking), encoding, decoding, encrypting, unencrypting, packaging, unpackaging, or otherwise manipulating the information into the instructions. In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, and the like) on one or several remote servers. The source code packages may be encrypted when in transit over a network and decrypted, uncompressed, assembled (e.g., linked) if necessary, and compiled or interpreted (e.g., into a library, stand-alone executable, and the like) at a local machine, and executed by the local machine. The terms "machine-readable medium" and "computer-readable medium" may be interchangeable for purposes of the present disclosure. The term "non-transitory computer-readable medium at least in some examples refers to any type of memory, computer readable storage device, and/or storage disk and may exclude propagating signals and transmission media.

The term "interface circuitry" at least in some examples refers to, is part of, or includes circuitry that enables the exchange of information between two or more components or devices. The term "interface circuitry" at least in some examples refers to one or more hardware interfaces, for example, buses, I/O interfaces, peripheral component interfaces, network interface cards, and/or the like.

The term "device" at least in some examples refers to a physical entity embedded inside, or attached to, another physical entity in its vicinity, with capabilities to convey digital information from or to that physical entity.

The term "entity" at least in some examples refers to a distinct component of an architecture or device, or information transferred as a payload.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources.

The term "appliance," "computer appliance," or the like, at least in some examples refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and the like. Furthermore, the term "user equipment" or "UE" may include any type of wireless/wired device or any computing device including a wireless communications interface. Examples of UEs, client devices, and the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, (semi-)autonomous vehicles, drones, robots, robotic systems, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality devices, and/or other like systems or devices.

The term "network element" at least in some examples refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware.

The term "access point" or "AP" at least in some examples refers to an entity that contains one station (STA)

and provides access to the distribution services, via the wireless medium (WM) for associated STAs. An AP comprises a STA and a distribution system access function (DSAF).

The term "robotic system" or "robot" at least in some examples refers to a machine capable of automatically carrying out a series of actions or tasks. Additionally or alternatively, the term "robotic system" at least in some examples refers to a system or collection of two or more robots that may be separate entities and/or disposed in a same housing or enclosure. The term "autonomous robot" at least in some examples refers to a robot capable of acting without human control. The term "semi-autonomous robot" at least in some examples refers to a robot capable of partially acting without human control and partially operating based on human input; a "semi-autonomous robot" at least in some examples can be a remote-controlled robot. Examples of "robots" or "robotic systems" include (semi-)autonomous robots, remote controlled robots, humanoid robots, bio-inspired robots, soft robots and/or soft robotic systems, industrial robots, medical operating robots, healthcare robots, mining robots, nano robots (nanobot), (semi-)autonomous driving vehicle (ADV), (semi-)autonomous watercraft (e.g., unmanned underwater vehicles (UUV), (semi-)autonomous (e.g., unmanned aerial vehicles (UAVs), unmanned combat aerial vehicles (UCAVs), and/or the like), (semi-)autonomous sensors, IoT devices, smart appliances, personal assistant devices, and/or the like.

The term "network controller" at least in some examples refers to a functional block that centralizes some or all of the control and management functionality of a network domain and may provide an abstract view of the network domain to other functional blocks via an interface. The term "network access controller" at least in some examples refers to a functional block that centralizes some or all of the control and management functionality of a network domain and optionally provides an abstract view of its domain to other functional blocks via well-defined interfaces.

The term "cell" at least in some examples refers to a radio network object that can be uniquely identified by a UE from an identifier (e.g., cell ID) that is broadcasted over a geographical area from a network access node (NAN). Additionally or alternatively, the term "cell" at least in some examples refers to a geographic area covered by a NAN.

The term "E-UTEAN NodeB", "eNodeB", or "eNB" at least in some examples refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface. The term "next generation eNB" or "ng-eNB" at least in some examples refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface. The term "Next Generation NodeB", "gNodeB", or "gNB" at least in some examples refers to a RAN node providing NR user plane and control plane protocol terminations towards a UE, and connected via the NG interface to the 5GC. Two or more gNBs are interconnected with each other (and/or with one or more ng-eNBs) by means of an Xn interface. The term "E-UTRA-NR gNB" or "en-gNB" at least in some examples refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.8.0 (2021-12-23)). Two or more en-gNBs are interconnected with each other (and/or with one or more eNBs) by means of an X2 interface. The term "Next Generation RAN node" or "NG-RAN node" at least in some examples refers to either a gNB or an ng-eNB. The term "IAB-node" at least in some examples refers to a RAN node that supports new radio (NR) access links to user equipment (UEs) and NR backhaul links to parent nodes and child nodes. The term "IAB-donor" at least in some examples refers to a RAN node (e.g., a gNB) that provides network access to UEs via a network of backhaul and access links.

The term "Transmission Reception Point" or "TRxP" at least in some examples refers to an antenna array with one or more antenna elements available to a network located at a specific geographical location for a specific area.

The term "Central Unit" or "CU" at least in some examples refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs. The term "Distributed Unit" or "DU" at least in some examples refers to a logical node hosting Backhaul Adaptation Protocol (BAP), F1 application protocol (F1AP), radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU. The term "Radio Unit" or "RU" at least in some examples refers to a logical node hosting PHY layer or Low-PHY layer and radiofrequency (RF) processing based on a lower layer functional split.

The term "Road Side Unit" or "RSU" at least in some examples refers to a stationary infrastructure entity supporting V2X applications that can exchange messages with other entities supporting V2X applications. Additionally or alternatively, the term "Road Side Unit" or "RSU" at least in some examples refers to a logical entity that supports V2X application logic using functionality provided by either a network or a UE (referred to as "UE-type RSU").

The term "split architecture" at least in some examples refers to an architecture in which an RU and DU are physically separated from one another, and/or an architecture in which a DU and a CU are physically separated from one another. The term "integrated architecture at least in some examples refers to an architecture in which an RU and DU are implemented on one platform, and/or an architecture in which a DU and a CU are implemented on one platform.

The term "Residential Gateway" or "RG" at least in some examples refers to a device providing, for example, voice, data, broadcast video, video on demand, to other devices in customer premises. The term "Wireline 5G Access Network" or "W-5GAN" at least in some examples refers to a wireline AN that connects to a 5GC via N2 and N3 reference points. The W-5GAN can be either a W-5GBAN or W-5GCAN. The term "Wireline 5G Cable Access Network" or "W-5GCAN" at least in some examples refers to an access network defined in/by CableLabs. The term "Wireline BBF Access Network" or "W-5GBAN" at least in some examples refers to an Access Network defined in/by the Broadband Forum (BBF). The term "Wireline Access Gateway Function" or "W-AGF" at least in some examples refers to a Network function in W-5GAN that provides connectivity to a 3GPP 5G Core network (5GC) to 5G-RG and/or FN-RG. The term "5G-RG" at least in some examples refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, and the like). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "cloud service provider" or "CSP" indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing. The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems.

The term "compute resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), OSs, virtual machines (VMs), software/applications, computer files, and/or the like.

The term "network function" or "NF" at least in some examples refers to a functional block within a network infrastructure that has one or more external interfaces and a defined functional behavior. The term "network service" or "NS" at least in some examples refers to a composition of Network Function(s) and/or Network Service(s), defined by its functional and behavioral specification(s).

The term "network function virtualization" or "NFV" at least in some examples refers to the principle of separating network functions from the hardware they run on by using virtualization techniques and/or virtualization technologies. The term "virtualized network function" or "VNF" at least in some examples refers to an implementation of an NF that can be deployed on a Network Function Virtualization Infrastructure (NFVI). The term "Network Functions Virtualization Infrastructure Manager" or "NFVI" at least in some examples refers to a totality of all hardware and software components that build up the environment in which VNFs are deployed. The term "Virtualized Infrastructure Manager" or "VIM" at least in some examples refers to a functional block that is responsible for controlling and managing the NFVI compute, storage and network resources, usually within one operator's infrastructure domain.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "network function" or "NF" at least in some examples refers to a functional block within a network infrastructure that has one or more external interfaces and a defined functional behavior. The term "network service" or "NS" at least in some examples refers to a composition of Network Function(s) and/or Network Service(s), defined by its functional and behavioral specification(s).

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "radio technology" at least in some examples refers to technology for wireless transmission and/or reception of electromagnetic radiation for information transfer. The term "radio access technology" or "RAT" at least in some examples refers to the technology used for the underlying physical connection to a radio based communication network.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces.

The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In various implementations, a "protocol" and/or a "communication protocol" may be represented using a protocol stack, a finite state machine (FSM), and/or any other suitable data structure.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and may include identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT, Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP), Virtual Private Network (VPN), Extensible Messaging and Presence Protocol (XMPP), and/or the like.

The term "transport layer" at least in some examples refers to a protocol layer that provides end-to-end (e2e) communication services such as, for example, connection-oriented communication, reliability, flow control, and multiplexing. Examples of transport layer protocols include Binary Streams Over HTTP (BOSH), Basic Transport Protocol (BTP), datagram congestion control protocol (DCCP), fibre channel protocol (FBC), Generic Routing Encapsulation (GRE), GPRS Tunneling (GTP), Micro Transport Protocol (pTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include Communications Access for Land Mobiles (CALM), CALM FAST, FAST Networking & Transport layer Protocol (FNTP), internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "radio resource control", "RRC layer", or "RRC" at least in some examples refers to a protocol layer or sublayer that performs system information handling; paging; establishment, maintenance, and release of RRC connections; security functions; establishment, configuration, maintenance and release of Signaling Radio Bearers (SRBs) and Data Radio Bearers (DRBs); mobility functions/services; QoS management; and some sidelink specific services and functions over the Uu interface (see e.g., 3GPP TS 36.331 v17.0.0 (2022-04-13) ("[TS36331]") and/or 3GPP TS 38.331 v17.0.0 (2022-04) ("[TS38331]")).

The term "Service Data Adaptation Protocol", "SDAP layer", or "SDAP" at least in some examples refers to a protocol layer or sublayer that performs mapping between QoS flows and a data radio bearers (DRBs) and marking QoS flow IDs (QFI) in both DL and UL packets (see e.g., 3GPP TS 37.324 v17.0.0 (2022-04-13)).

The term "Packet Data Convergence Protocol", "PDCP layer", or "PDCP" at least in some examples refers to a protocol layer or sublayer that performs transfer user plane or control plane data; maintains PDCP sequence numbers (SNs); header compression and decompression using the Robust Header Compression (ROHC) and/or Ethernet Header Compression (EHC) protocols; ciphering and deciphering; integrity protection and integrity verification; provides timer based SDU discard; routing for split bearers; duplication and duplicate discarding; reordering and in-order delivery; and/or out-of-order delivery (see e.g., 3GPP TS 36.323 v17.0.0 (2022-04-15) and/or 3GPP TS 38.323 v17.0.0 (2022-04-14)).

The term "radio link control layer", "RLC layer", or "RLC" at least in some examples refers to a protocol layer or sublayer that performs transfer of upper layer PDUs; sequence numbering independent of the one in PDCP; error Correction through ARQ; segmentation and/or re-segmentation of RLC SDUs; reassembly of SDUs; duplicate detection; RLC SDU discarding; RLC re-establishment; and/or protocol error detection (see e.g., 3GPP TS 38.322 v17.0.0 (2022-04-15) and 3GPP TS 36.322 v17.0.0 (2022-04-15)).

The term "medium access control protocol", "MAC protocol", or "MAC" at least in some examples refers to a protocol that governs access to the transmission medium in a network, to enable the exchange of data between stations in a network. Additionally or alternatively, the term "medium access control layer", "MAC layer", or "MAC" at least in some examples refers to a protocol layer or sublayer that performs functions to provide frame-based, connectionless-mode (e.g., datagram style) data transfer between stations or devices. Additionally or alternatively, the term "medium access control layer", "MAC layer", or "MAC" at least in some examples refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., [IEEE802], 3GPP TS 38.321 v17.0.0 (2022-04-14) and 3GPP TS 36.321 v17.0.0 (2022-04) (collectively referred to as "[TSMAC]")).

The term "physical layer", "PHY layer", or "PHY" at least in some examples refers to a protocol layer or sublayer that includes capabilities to transmit and receive modulated signals for communicating in a communications network (see e.g., [IEEE802], 3GPP TS 38.211 v17.0.1 (2022-04-01), 3GPP TS 36.211 v17.0.1 (2022-04-01), 3GPP TS 38.201 v17.0.0 (2022-01-05), and 3GPP TS 36.201 v17.0.0 (2022-03-31)).

The term "RAT type" at least in some examples may identify a transmission technology and/or communication protocol used in an access network, for example, new radio (NR), Long Term Evolution (LTE), narrowband IoT (NB-IoT), untrusted non-3GPP, trusted non-3GPP, trusted Institute of Electrical and Electronics Engineers (IEEE) 802 (e.g., [IEEE80211]; see also *IEEE Standard for Local and Metropolitan Area Networks: Overview and Architecture*, IEEE Std 802-2014, pp. 1-74 (30 Jun. 2014) ("[IEEE802]"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), and the like; Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and the like), Generic Access Network (GAN)/Unlicensed Mobile Access (UMA), High Speed Packet Access (HSPA) (and variants thereof such as HSPA Plus (HSPA+), and the like), Long Term Evolution (LTE) (and variants thereof such as LTE-Advanced (LTE-A), Evolved UTRA (E-UTRA), LTE Extra, LTE-A Pro, LTE LAA, MuLTEfire, and the like), Fifth Generation (5G) or New Radio (NR), and the like; ETSI technologies such as High Performance Radio Metropolitan Area Network (HiperMAN) and the like; IEEE technologies such as [IEEE802] and/or WiFi (e.g., [IEEE80211] and variants thereof), Worldwide Interoperability for Microwave Access (WiMAX) (e.g., [WiMAX] and variants thereof), Mobile Broadband Wireless Access (MBWA)/iBurst (e.g., IEEE 802.20 and variants thereof), and the like; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.11ay, and the like); short-range and/or wireless personal area network (WPAN) technologies/standards such as Bluetooth (and variants thereof such as Bluetooth 5.3, Bluetooth Low Energy (BLE), and the like), IEEE 802.15 technologies/standards (e.g., IEEE Standard for Low-Rate Wireless Networks, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, IEEE Standard for Local and metropolitan area networks—Part 15.6. Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as *IEEE Standard for Local and metropolitan area networks—Part 15.7: Short-Range Optical Wireless Communications*, IEEE Std 802.15.7-2018, pp. 1-407 (23 Apr. 2019), and the like; V2X communication including 3GPP cellular V2X (C-V2X), *Wireless Access in Vehicular Environments (WAVE)* (*IEEE Standard for Information technology—Local and metropolitan area networks—Specific requirements—Part 11: Wireless LANMedium Access Control (MAC) and Physical Layer (PHY) Specifications Amendment 6: Wireless Access in Vehicular Environments*, IEEE Std 802.11p-2010, pp. 1-51 (15 Jul. 2010) ("[IEEE80211p]"), which is now part of [IEEE80211]), WAVE Short Message Protocol (WSMP), IEEE 802.11bd (e.g., for vehicular ad-hoc environments), Dedicated Short Range Communications (DSRC), Intelligent Transport Systems (ITS) (including the European ITS-G5, ITS-G5B, ITS-G5C, and the like); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), and the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, and the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some examples refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "flow" at least in some examples refers to a sequence of data and/or data units (e.g., datagrams, packets, or the like) from a source entity/element to a destination entity/element. Additionally or alternatively, the terms "flow" or "traffic flow" at least in some examples refer to an artificial and/or logical equivalent to a call, connection, or link. Additionally or alternatively, the terms "flow" or "traffic flow" at least in some examples refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. For purposes of the present disclosure, the terms "traffic flow", "data flow", "dataflow", "packet flow", "network flow", and/or "flow" may be used interchangeably even though these terms at least in some examples refers to different concepts. The term "dataflow" or "data flow" at least in some examples refers to the movement of data through a system including software elements, hardware elements, or a combination of both software and hardware elements. Additionally or alternatively, the term "dataflow" or "data flow" at least in some examples refers to a path taken by a set of data from an origination or source to destination that includes all nodes through which the set of data travels.

The term "stream" at least in some examples refers to a sequence of data elements made available over time. At least in some examples, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some examples refers to a manner of processing in which an object is not represented by a complete logical data structure of nodes occupying memory proportional to a size of that object, but are processed "on the fly" as a sequence of events.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like).

Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols. The term "network service" at least in some examples refers to a composition of Network Function (s) and/or Network Service(s), defined by its functional and behavioral specification.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges.

The term "quality" at least in some examples refers to a property, character, attribute, or feature of something as being affirmative or negative, and/or a degree of excellence of something. Additionally or alternatively, the term "quality" at least in some examples, in the context of data processing, refers to a state of qualitative and/or quantitative aspects of data, processes, and/or some other aspects of data processing systems. The term "Quality of Service" or "QoS" at least in some examples refers to a description or measurement of the overall performance of a service (e.g., telephony and/or cellular service, network service, wireless communication/connectivity service, cloud computing service, and the like). In some cases, the QoS may be described or measured from the perspective of the users of that service, and as such, QoS may be the collective effect of service performance that determine the degree of satisfaction of a user of that service. In other cases, QoS at least in some examples refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retainability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS" at least in some examples refers to mechanisms that provide traffic-forwarding treatment based on flow-specific traffic classification. In some implementations, the term "Quality of Service" or "QoS" can be used interchangeably with the term "Class of Service" or "CoS".

The term "PDU Connectivity Service" at least in some examples refers to a service that provides exchange of protocol data units (PDUs) between a UE and a data network (DN). The term "PDU Session" at least in some examples refers to an association between a UE and a DN that provides a PDU connectivity service (see e.g., 3GPP TS 38.415 v16.6.0 (2021-12-23) ("[TS38415]") and 3GPP TS 38.413 v16.8.0 (2021-12-23) ("[TS38413]"), the contents of each of which are hereby incorporated by reference in their entireties); a PDU Session type can be IPv4, IPv6, IPv4v6, Ethernet (see e.g., [IEEE8023]), Unstructured, or any other network/connection type, such as those discussed herein. The term "PDU Session Resource" at least in some examples refers to an NG-RAN interface (e.g., NG, Xn, and/or E1 interfaces) and radio resources provided to support a PDU Session. The term "multi-access PDU session" or "MA PDU Session" at least in some examples refers to a PDU Session that provides a PDU connectivity service, which can use one access network at a time or multiple access networks simultaneously.

The term "data network" or "DN" at least in some examples refers to a network hosting data-centric services such as, for example, operator services, the internet, third-party services, or enterprise networks. Additionally or alternatively, a DN at least in some examples refers to service networks that belong to an operator or third party, which are offered as a service to a client or user equipment (UE). DNs are sometimes referred to as "Packet Data Networks" or "PDNs". The term "Local Area Data Network" or "LADN" at least in some examples refers to a DN that is accessible by the UE only in specific locations, that provides connectivity to a specific DNN, and whose availability is provided to the UE.

The term "network path" or "path" at least in some examples refers to a data communications feature of a communication system describing the sequence and identity of system components visited by one or more packets, where the components of the path may be either logical or physical. The term "network forwarding path" at least in some examples refers to an ordered list of connection points forming a chain of NFs and/or nodes, along with policies associated to the list.

The term "forwarding treatment" at least in some examples refers to the precedence, preferences, and/or prioritization a packet belonging to a particular dataflow receives in relation to other traffic of other dataflows. Additionally or alternatively, the term "forwarding treatment" at least in some examples refers to one or more parameters, characteristics, and/or configurations to be applied to packets belonging to a dataflow when processing the packets for forwarding. Examples of such characteristics may include resource type (e.g., non-guaranteed bit rate (GBR), GBR, delay-critical GBR, etc.); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds; etc. In some implementations, the term "forwarding treatment" may be referred to as "Per-Hop Behavior" or "PHB".

The term "network address" at least in some examples refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) (and variants thereof), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI), 5G QoS Identifier (5QI), PC5 QoS Flow Identifier (PFI), PC5 5QI (PQI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, Provider Service Identifier (PSID), UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), and the like), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, unique identifier (UID) and/or universally unique identifier (UUID) (e.g., as specified in ISO/IEC 11578:1996, Extended Unique Identifier (EUI-48), 64-bit Extended Unique Identifier (EUI-64), and/or the like), a Universal Resource Locator (URL) and/or Universal Resource Identifier (URI), Virtual LAN (VLAN) ID, an X.21 address, an X.25 address, Zigbee® ID, Zigbee® Device Network ID, an IEEE 1451.4-2004 Manufacturer ID, Provider Service Identifier (PSID), and/or any other suitable network address and components thereof.

The term "application identifier", "application ID", or "app ID" at least in some examples refers to an identifier that can be mapped to a specific application or application instance; in the context of 3GPP 5G/NR systems, an "application identifier" at least in some examples refers to an identifier that can be mapped to a specific application traffic detection rule. The term "ITS application identifier" or "ITS-AID" at least in some examples refers to an application ID used to identify an ITS application object.

The term "endpoint address" at least in some examples refers to an address used to determine the host/authority part of a target URI, where the target URI is used to access an NF service (e.g., to invoke service operations) of an NF service producer or for notifications to an NF service consumer.

The term "network socket" or "socket" at least in some examples refers to an element that serves as an endpoint for sending and receiving data across a network or for inter-process communication. The structure and properties of a socket can be defined by one or more APIs, and may be identified by a socket address or the like.

The term "port" in the context of computer networks, at least in some examples refers to a communication endpoint, a virtual data connection between two or more entities, and/or a virtual point where network connections start and end. Additionally or alternatively, a "port" at least in some examples is associated with a specific process or service.

The term "application" at least in some examples refers to a computer program designed to carry out a specific task other than one relating to the operation of the computer itself. Additionally or alternatively, term "application" at least in some examples refers to a complete and deployable package, environment to achieve a certain function in an operational environment. The term "process" at least in some examples refers to an instance of a computer program that is being executed by one or more threads. In some implementations, a process may be made up of multiple threads of execution that execute instructions concurrently. The term "ITS application" at least in some examples refers to an instantiation of an ITS service that involves an association of two or more complementary ITS-S application processes.

The term "algorithm" at least in some examples refers to an unambiguous specification of how to solve a problem or a class of problems by performing calculations, input/output operations, data processing, automated reasoning tasks, and/or the like. The term "data processing" or "processing" at least in some examples refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "artificial intelligence" or "AI" at least in some examples refers to any intelligence demonstrated by machines, in contrast to the natural intelligence displayed by humans and other animals. Additionally or alternatively, the term "artificial intelligence" or "AI" at least in some examples refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), etc.), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), etc.), Linear Dynamical System (LDS), Switching LDS (SLDS), Optical NNs (ONNs), an NN for reinforcement learning (RL) and/or deep RL (DRL), and/or the like.

The term "data fusion" at least in some examples refers to the process of integrating multiple data sources to produce more consistent, accurate, and/or useful information than that provided by any data source individually.

The term "machine learning" or "ML" at least in some examples refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some examples refers to different concepts than the term "ML model," these terms may be used interchangeably for the purposes of the present disclosure. Furthermore, the term "AI/ML application" or the like at least in some examples refers to an application that contains some AI/ML models and application-level descriptions. ML techniques generally fall into the following main types of learning problem categories: supervised learning (e.g., classification algorithms, regression algorithms, and instance-based algorithms), unsupervised learning (e.g., K-means clustering, principal component analysis (PCA), and topic modeling, and the like), and reinforcement learning (e.g., Markov decision process, Markov chain, Q-learning, multi-armed bandit learning, temporal difference learning, and deep RL); and can include the use of one or more ANNs.

The term "user" at least in some examples refers to an abstract representation of any entity issuing commands, requests, and/or data, and receives commands, responses, data, and/or consumes services.

The term "authorization" at least in some examples refers to a prescription that a particular behavior shall not be prevented.

The term "integrity" at least in some examples refers to a mechanism that assures that data has not been altered in an unapproved way. Examples of cryptographic mechanisms that can be used for integrity protection include digital signatures, message authentication codes (MAC), and secure hashes.

The term "ego ITS-S" at least in some examples refers to an ITS-S that is under consideration, the term "ego vehicle" refers to a vehicle embedding an ITS-S being considered, and the term "neighbors" refers to other ITS-Ss different than the ego ITS-S and ego vehicle.

The term "Geo-Area" at least in some examples refers to one or more geometric shapes such as circular areas, rectangular areas, and elliptical areas. A circular Geo-Area is described by a circular shape with a single point A that represents the center of the circle and a radius r. The rectangular Geo-Area is defined by a rectangular shape with a point A that represents the center of the rectangle and a parameter a which is the distance between the center point and the short side of the rectangle (perpendicular bisector of the short side, a parameter b which is the distance between the center point and the long side of the rectangle (perpendicular bisector of the long side, and a parameter $\theta$ which is the azimuth angle of the long side of the rectangle. The elliptical Geo-Area is defined by an elliptical shape with a point A that represents the center of the rectangle and a parameter a which is the length of the long semi-axis, a parameter b which is the length of the short semi-axis, and a parameter $\theta$ which is the azimuth angle of the long semi-axis. An ITS-S can use a function F to determine whether a point P(x,y) is located inside, outside, at the center, or at the border of a geographical area. The function F(x,y) assumes the canonical form of the geometric shapes: The Cartesian coordinate system has its origin in the center of the shape. Its abscissa is parallel to the long side of the shapes. Point P is defined relative to this coordinate system.

The term "vehicle" at least in some examples refers to road vehicle designed to carry people or cargo on public roads and highways such as AVs, busses, cars, trucks, vans, motor homes, and motorcycles; by water such as boats, ships, and the like; or in the air such as airplanes, helicopters, UAVs, satellites, and the like.

The term "interoperability" at least in some examples refers to the ability of ITS-Ss utilizing one communication system or RAT to communicate with other ITS-Ss utilizing another communication system or RAT. The term "Coexistence" refers to sharing or allocating radiofrequency resources among ITS-Ss using either communication system or RAT.

The term "ITS data dictionary" at least in some examples refers to a repository of DEs and DFs used in the ITS applications and ITS facilities layer. The term "ITS message" refers to messages exchanged at ITS facilities layer among ITS stations or messages exchanged at ITS applications layer among ITS stations.

The term "Collective Perception" or "CP" at least in some examples refers to the concept of sharing the perceived environment of an ITS-S based on perception sensors, wherein an ITS-S broadcasts information about its current (driving) environment. CP is the concept of actively exchanging locally perceived objects between different ITS-Ss by means of a V2X RAT. CP decreases the ambient uncertainty of ITS-Ss by contributing information to their mutual FoVs.

The term "Collective Perception basic service", "CP service", or "CPS" at least in some examples refers to a facility at the ITS-S facilities layer to receive and process CPMs, and generate and transmit CPMs.

The term "Collective Perception Message" or "CPM" at least in some examples refers to a CP basic service PDU.

The term "Collective Perception data" or "CPM data" refers to a partial or complete CPM payload.

The term "Collective Perception protocol" or "CPM protocol" at least in some examples refers to an ITS facilities layer protocol for the operation of the CPM generation, transmission, and reception.

The term "CP object" or "CPM object" at least in some examples refers to aggregated and interpreted abstract information gathered by perception sensors about other traffic participants and obstacles. A "CP object" or "CPM object" at least in some examples can be represented mathematically by a set of variables describing, amongst other, their dynamic state and geometric dimension. The state variables associated to an object are interpreted as an observation for a certain point in time and are therefore always accompanied by a time reference. Additionally or alternatively, the term "CP object" or "CPM object" at least in some examples refers to the state space representation of a physically detected object within a sensor's perception range.

The term "object list" at least in some examples refers to a collection of objects temporally aligned to the same timestamp.

The term "object confidence" at least in some examples refers to a quantification of the confidence that a detected object actually exists (e.g., that an object has been detected previously and/or has been continuously detected by a sensor).

The term "accuracy" at least in some examples refers to the closeness of one or more measurements to a specific value. Additionally or alternatively, the term "accuracy" at least in some examples refers to the closeness of agreement between a test result and an accepted reference value. In some examples, "accuracy" involves a combination of random components and a bias component.

The term "currentness" at least in some examples refers to the degree to which data has attributes that are of a right age.

The term "precision" at least in some examples refers to the closeness of agreement between independent test results obtained under stipulated conditions. In some examples, "precision" depends only on the distribution of random errors and does not relate to a true error.

The term "reliability" at least in some examples refers to the ability of a computer-related component (e.g., software, hardware, or network element/entity) to consistently perform a desired function and/or operate according to a specification. Reliability in the context of network communications (e.g., "network reliability") at least in some embodiments refers to the ability of a network to carry out communication. The term "network reliability" at least in some embodiments refers to a probability or measure of delivering a specified amount of data from a source to a destination (or sink).

The term "trueness" at least in some examples refers to the closeness of agreement between an average value obtained from a relatively large series of test results and an accepted reference value.

The term "Environment Model" at least in some examples refers to a current representation of the immediate environment of an ITS-S, including all perceived objects perceived by either local perception sensors or received by V2X.

The term "ITS station" or "ITS-S" at least in some examples refers to a functional entity specified by the ITS-S reference architecture. The term "ITS sub-system" at least in some examples refers to a sub-system of an ITS-S with ITSC components for a specific context.

The term "ITS Central System" at least in some examples refers to an ITS system in the backend, for example, traffic control center, traffic management center, or cloud system from road authorities, ITS application suppliers or automotive OEMs.

The term "personal ITS-S" at least in some examples refers to an ITS-S in a nomadic ITS sub-system in the context of a portable device (e.g., a mobile device of a pedestrian).

The term "Cooperative-ITS Credential Management System" or "CCMS" at least in some examples refers to Public Key Infrastructure (PKI) in a C-ITS trust system.

The term "vehicle" at least in some examples refers to a road vehicle designed to carry people or cargo on public roads and highways such as AVs, busses, cars, trucks, vans, motor homes, motorcycles, and the like; by water such as boats, ships, and the like; or in the air such as airplanes, helicopters, UAVs, satellites, and the like.

The term "sensor measurement" at least in some examples refers to abstract object descriptions generated or provided by feature extraction algorithm(s), which may be based on the measurement principle of a local perception sensor mounted to an ITS-S. The feature extraction algorithm processes a sensor's raw data (e.g., reflection images, camera images, etc.) to generate an object description. The term "State Space Representation" is a mathematical description of a detected object, which includes state variables such as distance, speed, object dimensions, and the like. The state variables associated with/to an object are interpreted as an observation for a certain point in time, and therefore, are accompanied by a time reference.

The term "misbehavior" or "misbehavior" at least in some examples refers to an act by an ITS-S of transmitting false or misleading information, or information that was not authorized by the local policy, either purposefully or unintendedly. This includes suspicious behaviors as in wrong message types, contents or frequencies, unauthorized access, or incorrect signed or encrypted messages, etc.

The term "misbehaving entity" at least in some examples refers to an ITS-S that is sending false or misleading messages using valid certificates. A misbehaving entity can include both faulty ITS stations and malicious entities (attackers) that own certificates.

The term "misbehavior report", "misbehavior report message", or "MR message" at least in some examples refers to a message created and sent by an ITS-S willing to report misbehaviors.

The term "evidence" at least in some examples refers to information which is used, either by itself or in conjunction with other information, to establish proof about an event, action, or object. Evidence does not necessarily prove the truth or existence of something, but can contribute to the establishment of such a proof.

The term "non-repudiation" at least in some examples refers to an ability to prove the occurrence of a claimed event or action and its originating entities (see e.g., ISO/IEC 27000).

The term "reporting ITS station" or "reporting ITS-S" at least in some examples refers to an ITS-S sending an MR message or some other ITS message such as CAMs, DENMs, CPMs, and the like.

The term "reported ITS station" or "reported ITS-S" at least in some examples refers to an ITS-S that is subject to creation of an MR, and/or is the subject of a created MR.

The term "certificate revocation list" or "CRL" at least in some examples refers to signed list indicating a set of certificates that are no longer considered valid by a certificate issuer.

The term "certificate revocation list for authorities" or "CRL CA" at least in some examples refers to certificate revocation list issued by a Root CA which contains revoked certificates of the subordinate CAs within the hierarchical trust domain managed by the Root CA or its own Root CA certificates.

The term "certificate trust list" at least in some examples refers to a signed list indicating a set of trusted services of a PKI hierarchy controlled by a Root CA or a set of trusted Root CAs within the C-ITS Trust Domain controlled by a top-level authority (Trust List Manager).

The term "security management" at least in some examples refers to operations that support acquiring or establishing the validity of certificates for cooperative ITS communications.

The term "union" at least in some examples refers to a collection of sets and/or a set of all elements in a collection of sets. Additionally or alternatively, the term "union" at least in some examples refers to a one or more operations through which two or more sets can be combined and/or related to each other. In some examples, the term "union" can be denoted by the symbol "∪". Additionally or alternatively, the term "union" at least in some examples refers to a value that may have any of several representations or formats within the same position in a memory, and includes a variable that may hold such a data structure. For purposes of the present disclosure, the term "union" can refer to any type of union data type such as, for example, an untagged union, a tagged union, a discriminated union, a disjoint union, a sum type, a coproduct, transparent union, anonymous union, and/or any combination thereof, unless the context dictates otherwise.

Additionally or alternatively, the term "union" at least in some examples refers to a result of a data fusion algorithm. Additionally or alternatively, the term "union" at least in some examples refers to a geometric union of the smaller shapes combined into one or more larger shapes that covers all of the smaller shapes.

The term "set" at least in some examples refers to a mathematical model for a collection of different elements or members, which can include, for example, numbers, symbols, points in space, lines, data points, geometrical shapes, variables, other sets, and/or any other type of object.

The term "consistency check" at least in some examples refers to a test or assessment performed to determine if data has any internal conflicts, conflicts with other data, and/or whether any contradictions exist. In some examples, a "consistency check" may operate according to a "consistency model", which at least in some examples refers to a set of operations for performing a consistency check and/or rules or policies used to determine if data is consistent (or predictable) or not.

The term "plausibility check" at least in some examples refers to a test or assessment performed to determine whether data is, or can be, plausible. The term "plausible" at least in some examples refers to an amount or quality of being acceptable, reasonable, comprehensible, and/or probable.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and the like). Furthermore, various standards (e.g., 3GPP, ETSI, and the like) may define various message formats, PDUs, containers, frames, and/or other data structures, as comprising a sequence of optional or mandatory data elements (DEs), data frames (DFs), information elements (IEs), and/or the like. However, the requirements of any particular standard should not limit the scope of the present disclosure, and as such, any combination of containers, frames, DFs, DEs, IEs, values, components, fields, actions, features, and/or data structures are possible, including any combination of containers, frames, DFs, DEs, IEs, values, components, fields, actions, features, and/or data structures that are strictly required to be followed in order to conform to such standards or any combination of containers, frames, DFs, DEs, IEs, values, components, fields, actions, features, and/or data structures strongly recommended and/or used with or in the presence/absence of optional elements.

The present disclosure includes the aforementioned description and the accompanying drawings. The present disclosure shows and described, by way of examples and not of limitation, specific implementations in which the subject matter may be practiced. The present disclosure shows and describes the inventive aspects in sufficient detail to enable those skilled in the art to practice the teachings disclosed herein. Although the present disclosure shows and describes specific example implementations, various modifications and changes may be made to these implementations without departing from the broader scope of the present disclosure. Other aspects may be utilized and derived from the implementations discussed herein, such that structural and logical substitutions and changes may be made without departing from the scope of the present disclosure. The present disclosure is not to be taken in a limiting sense, and the scope of various aspects is defined by the appended claims, along with the full range of equivalents to which such claims are entitled.

The invention claimed is:

1. An apparatus, comprising:
  memory circuitry to store instructions for operating a detection system of a misbehavior detection service; and
  processor circuitry connected to the memory circuitry, wherein the processor circuitry is to execute the instructions to:
    receive a Collective Perception Message (CPM) from a source node, wherein the CPM includes a set of perceived objects and one or more free spaces detected by the source node;
    determine, based on the received CPM, a source sensor field of view union of the source node ("SFoV union") and a free space union of the source node ("SFS union");
    perform a first cross check on each perceived object in the set of perceived objects against the SFoV union;
    perform a second cross check on the free space included in the received CPM against the SFoV union;
    perform a third cross check on each perceived object against the SFS union;
    generate a misbehavior report (MR) message including a potential misbehavior of the source node when an inconsistency is declared as a result of at least one cross check including the first cross check, the second cross check, and the third cross check; and
    send the MR message to a misbehavior authority.

2. The apparatus of claim 1, wherein, to perform the first cross check, the processor circuitry is to execute the instructions to:
  declare a consistency when an individual perceived object of the set of perceived objects is inside the SFOV union; and
  declare the inconsistency when the individual perceived object is outside of the SFoV union.

3. The apparatus of claim 1, wherein, to perform the second cross check, the processor circuitry is to execute the instructions to:
  determine a free space polygon for each source node sensor indicated by the received CPM;
  determine whether the free space polygon of each source node sensor is inside the SFOV union;
  declare a consistency when a free space polygon of an individual source node sensor is within the SFoV union; and
  declare the inconsistency when the free space polygon of the individual source node sensor is outside of the SFoV union.

4. The apparatus of claim 1, wherein, to perform the third cross check, the processor circuitry is to execute the instructions to:
  determine whether each perceived object is outside of the SFS union;
  declare a consistency when an individual perceived object of the set of perceived objects is outside the SFS union; and
  declare the inconsistency when the individual perceived object is inside of the SFS union.

5. The apparatus of claim 1, wherein the CPM is a first CPM, and the processor circuitry is to execute the instructions to:
  perform a fourth cross check on a speed and an acceleration of a perceived object in the set of perceived objects that is a subject of a second CPM sent by the source node and received before the first CPM; and
  declare, based on the fourth cross check, the inconsistency when the speed or the acceleration over a period of time is outside a standard deviation for a corresponding change in position or speed over the period of time.

6. The apparatus of claim 1, wherein the CPM is a first CPM, and the processor circuitry is to execute the instructions to:
  perform a fifth cross check across multiple CPMs received from multiple different source nodes, wherein, to perform the fifth cross check, the processor circuitry is to execute the instructions to:
    determine a receiver node (Rx) sensor field of view union ("RxS-FoV union"), wherein the RxS-FoV union is a union of respective FoVs of a set of local sensors at the Rx;
    generate or updating an Rx sensor-based environmental map ("RxS-map") based on the RxS-FoV union such that objects included in the RxS-FoV union are indicated in the RxS-map;
    determine, at each time instance when a new CPM is received, where a perceived object included in the new CPM is disposed in the RxS-map; and
    declare the inconsistency when the perceived object included in the new CPM is disposed in an area of the RxS-map indicated as being unoccupied.

7. The apparatus of claim 6, wherein, to perform the fifth cross check, the processor circuitry is to execute the instructions to:

generate or update an Rx CPM-based environmental map ("Rx-CPM-map") based on data obtained from at least two data sources; and declare the inconsistency when a first data source indicates that a portion of the Rx-CPM-map is unoccupied and a second data source indicates that the portion of the Rx-CPM-map is occupied.

8. The apparatus of claim 7, wherein, to generate or update the Rx-CPM-map, the processor circuitry is to execute the instructions to:

label the portion of the Rx-CPM-map as unoccupied when one data source of the at least two data sources indicates the portion is unoccupied and another data source of the at least two data sources indicates that the portion is unknown, wherein the at least two data sources include a set of local sensors of the Rx and individual CPMs of the multiple CPMs;

label the portion of the Rx-CPM-map as occupied when one data source of the at least two data sources indicates the portion is unknown and another data source of the at least two data sources indicates that the portion is occupied; and generate the Rx-CPM-map using a data fusion algorithm to fuse sensor data obtained from each local sensor of the set of local sensors at the Rx and perceived objects included in the multiple CPMs, and fuse free space indicators included in the multiple CPMs together.

9. The apparatus of claim 8, wherein the data fusion algorithm is a first data fusion algorithm, and the processor circuitry is to execute the instructions to:

generate the RxS-FoV union using a second data fusion algorithm to only fuse sensor data obtained from each local sensor of the set of local sensors at the Rx together, wherein the first data fusion algorithm is same as the second data fusion algorithm or different than the second data fusion algorithm;

generate the SFoV union using a third data fusion algorithm to fuse sensor data of the source node indicated by the received CPM, wherein the second data fusion algorithm is same as the third data fusion algorithm or different than the third data fusion algorithm; and generate the SFS union using a fourth data fusion algorithm to fuse free space indications included in the received CPM, wherein the third data fusion algorithm is same as the fourth data fusion algorithm or different than the fourth data fusion algorithm.

10. The apparatus of claim 1, wherein the apparatus is or includes a robotic system or an Intelligent Transportation System Station (ITS-S), wherein the ITS-S is a vehicle ITS-S (V-ITS-S), a roadside ITS-S(R-ITS-S), or a vulnerable road user (VRU) ITS-S; and the apparatus further comprises: interface circuitry to communicatively couple the apparatus with one or more sensors.

11. A non-transitory computer-readable medium (NTCRM) comprising instructions, wherein execution of the instructions by one or more processors is to cause a a detection system of a misbehavior detection service to:

receive a Collective Perception Message (CPM) from a source node, wherein the CPM includes a set of perceived objects and one or more free spaces detected by the source node;

determine, based on the received CPM, a source sensor field of view union of the source node ("SFoV union") and a free space union of the source node ("SFS union");

perform a first cross check on each perceived object in the set of perceived objects against the SFoV union;

perform a second cross check on the free space included in the received CPM against the SFoV union;

perform a third cross check on each perceived object against the SFS union;

generate a misbehavior report (MR) message including a potential misbehavior of the source node when an inconsistency is declared as a result of at least one cross check including the first cross check, the second cross check, and the third cross check; and send the MR message to a misbehavior authority.

12. The NTCRM of claim 11, wherein, to perform the first cross check, execution of the instructions is to cause the detection system to:

declare a consistency when an individual perceived object of the set of perceived objects is inside the SFOV union; and declare the inconsistency when the individual perceived object is outside of the SFOV union.

13. The NTCRM of claim 11, wherein, to perform the second cross check, execution of the instructions is to cause the detection system to:

determine a free space polygon for each source node sensor indicated by the received CPM;

determine whether the free space polygon of each source node sensor is inside the SFOV union;

declare a consistency when a free space polygon of an individual source node sensor is within the SFOV union; and declare the inconsistency when the free space polygon of the individual source node sensor is outside of the SFOV union.

14. The NTCRM of claim 11, wherein, to perform the third cross check, execution of the instructions is to cause the detection system to:

determine whether each perceived object is outside of the SFS union;

declare a consistency when an individual perceived object of the set of perceived objects is outside the SFS union; and declare the inconsistency when the individual perceived object is inside of the SFS union.

15. The NTCRM of claim 11, wherein the CPM is a first CPM, and execution of the instructions is to cause the detection system to:

perform a fourth cross check on a speed and an acceleration of a perceived object in the set of perceived objects that is a subject of a second CPM sent by the source node and received before the first CPM; and declare, based on the fourth cross check, the inconsistency when the speed or the acceleration over a period of time is outside a standard deviation for a corresponding change in position or speed over the period of time.

16. The NTCRM of claim 11, wherein the CPM is a first CPM, and execution of the instructions is to cause the detection system to:

perform a fifth cross check across multiple CPMs received from multiple different source nodes, wherein, to perform the fifth cross check, the processor circuitry is to execute the program code to:

determine a receiver node (Rx) sensor field of view union ("RxS-FoV union"), wherein the RxS-FoV union is a union of respective FoVs of a set of local sensors at the Rx;

generate or updating an Rx sensor-based environmental map ("RxS-map") based on the RxS-FoV union such that objects included in the RxS-FoV union are indicated in the RxS-map;

determine, at each time instance when a new CPM is received, where a perceived object included in the new CPM is disposed in the RxS-map; and declare the inconsistency when the perceived object included in the new CPM is disposed in an area of the RxS-map indicated as being unoccupied.

17. The NTCRM of claim 16, wherein, to perform the fifth cross check, execution of the instructions is to cause the detection system to:

generate or update an Rx CPM-based environmental map ("Rx-CPM-map") based on data obtained from at least two data sources; and declare the inconsistency when a first data source indicates that a portion of the Rx-CPM-map is unoccupied and a second data source indicates that the portion of the Rx-CPM-map is occupied.

18. The NTCRM of claim 17, wherein, to generate or update the Rx-CPM-map, execution of the instructions is to cause the detection system to:

label the portion of the Rx-CPM-map as unoccupied when one data source of the at least two data sources indicates the portion is unoccupied and another data source of the at least two data sources indicates that the portion is unknown, wherein the at least two data sources include a set of local sensors of the Rx and individual CPMs of the multiple CPMs;

label the portion of the Rx-CPM-map as occupied when one data source of the at least two data sources indicates the portion is unknown and another data source of the at least two data sources indicates that the portion is occupied; and generate the Rx-CPM-map using a data fusion algorithm to fuse sensor data obtained from each local sensor of the set of local sensors at the Rx and perceived objects included in the multiple CPMs, and fuse free space indicators included in the multiple CPMs together.

19. The NTCRM of claim 18, wherein the data fusion algorithm is a first data fusion algorithm, and execution of the instructions is to cause the detection system to:

generate the RxS-FoV union using a second data fusion algorithm to only fuse sensor data obtained from each local sensor of the set of local sensors at the Rx together, wherein the first data fusion algorithm is same as the second data fusion algorithm or different than the second data fusion algorithm;

generate the SFoV union using a third data fusion algorithm to fuse sensor data of the source node indicated by the received CPM, wherein the second data fusion algorithm is same as the third data fusion algorithm or different than the third data fusion algorithm; and generate the SFS union using a fourth data fusion algorithm to fuse free space indications included in the received CPM, wherein the third data fusion algorithm is same as the fourth data fusion algorithm or different than the fourth data fusion algorithm.

20. The NTCRM of claim 11, wherein the detection system is implemented by a robotic system or an Intelligent Transportation System Station (ITS-S), wherein the ITS-S is a vehicle ITS-S (V-ITS-S), a roadside ITS-S (R-ITS-S), or a vulnerable road user (VRU) ITS-S.

* * * * *